United States Patent
Canoy et al.

(10) Patent No.: US 9,679,491 B2
(45) Date of Patent: Jun. 13, 2017

(54) SIGNALING DEVICE FOR TEACHING LEARNING DEVICES

(71) Applicant: QUALCOMM Incorporated, San Diego, CA (US)

(72) Inventors: Michael-David Nakayoshi Canoy, San Diego, CA (US); Anne Katrin Konertz, Encinitas, CA (US); Kiet Tuan Chau, San Diego, CA (US); Siddharth Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 14/286,602

(22) Filed: May 23, 2014

(65) Prior Publication Data

US 2014/0349269 A1 Nov. 27, 2014

Related U.S. Application Data

(60) Provisional application No. 61/827,141, filed on May 24, 2013.

(51) Int. Cl.
 *G06F 15/18* (2006.01)
 *G09B 5/00* (2006.01)
 *G06N 99/00* (2010.01)

(52) U.S. Cl.
 CPC ............ *G09B 5/00* (2013.01); *G06N 99/005* (2013.01)

(58) Field of Classification Search
 None
 See application file for complete search history.

(56) References Cited

U.S. PATENT DOCUMENTS

| 4,750,118 A | 6/1988 | Heitschel et al. |
| 5,398,302 A | 3/1995 | Thrift |

(Continued)

FOREIGN PATENT DOCUMENTS

| CN | 102665335 A | 9/2012 |
| CN | 102890465 A | 1/2013 |

(Continued)

OTHER PUBLICATIONS

Cook et al., "CASAS: A Smarrt Home in a Box", Sep. 26, 2012, NIH Public Access, pp. 62-69.*

(Continued)

*Primary Examiner* — Paulinho E Smith
(74) *Attorney, Agent, or Firm* — The Marbury Law Group, PLLC

(57) ABSTRACT

Various embodiments for conducting proxy teaching for learning devices within a decentralized system, including an embodiment method with operations for obtaining, by a teacher signaling device, objectives data related to activities of one or more of the learning devices, generating, by the teacher signaling device, teaching routines based on the obtained objectives data, and broadcasting, by the teacher signaling device, teaching signals configured to teach one or more of the learning devices based on the generated teaching routines. Other embodiments may obtain objectives data by requesting reflex information from the learning devices or intercepting event report messages transmitted by the learning devices. Other embodiments may include broadcasting discovery signals to identify nearby learning devices and modifying teaching routines when objectives of the generated teaching routines cannot be achieved. Other embodiments may include transmitting an authorization request to a user device to determine whether to broadcast teaching signals.

30 Claims, 34 Drawing Sheets

(56) References Cited

U.S. PATENT DOCUMENTS

| | | | |
|---|---|---|---|
| 5,925,115 A | 7/1999 | Ponte | |
| 6,192,230 B1 | 2/2001 | Van Bokhorst et al. | |
| 6,400,996 B1 | 6/2002 | Hoffberg et al. | |
| 6,453,687 B2 | 9/2002 | Sharood et al. | |
| 6,834,208 B2* | 12/2004 | Gonzales | H04L 12/2803 |
| | | | 315/291 |
| 6,957,544 B2 | 10/2005 | Dobbs et al. | |
| 7,050,794 B2* | 5/2006 | Chuey | G08C 17/02 |
| | | | 340/5.23 |
| 7,113,773 B2* | 9/2006 | Quick, Jr. | H04L 1/1867 |
| | | | 370/349 |
| 7,133,729 B1 | 11/2006 | Wang et al. | |
| 7,301,474 B2 | 11/2007 | Zimmerman | |
| 7,446,671 B2* | 11/2008 | Giannopoulos | H05B 37/02 |
| | | | 340/12.24 |
| 7,496,545 B2 | 2/2009 | Chung | |
| 7,644,145 B2* | 1/2010 | Rockwell | G06Q 10/0875 |
| | | | 358/1.15 |
| 7,673,244 B2 | 3/2010 | Zukowski et al. | |
| 7,765,033 B2 | 7/2010 | Perry | |
| 8,136,738 B1 | 3/2012 | Kopp | |
| 8,156,500 B2* | 4/2012 | Helander | G06F 9/4887 |
| | | | 703/22 |
| 8,284,989 B2* | 10/2012 | Scholl | G08C 17/00 |
| | | | 345/6 |
| 8,417,481 B2* | 4/2013 | Cook | G05B 15/02 |
| | | | 702/181 |
| 8,577,392 B1 | 11/2013 | Pai et al. | |
| 8,620,841 B1* | 12/2013 | Filson | H04L 12/1895 |
| | | | 706/12 |
| 8,622,314 B2* | 1/2014 | Fisher | F24F 11/0034 |
| | | | 1/34 |
| 8,630,740 B2* | 1/2014 | Matsuoka | H04L 12/2825 |
| | | | 700/12 |
| 9,084,263 B2* | 7/2015 | Yu | H04W 8/186 |
| 9,106,348 B2 | 8/2015 | Thomson et al. | |
| 9,143,402 B2* | 9/2015 | Tinnakornsrisuphap | |
| | | | H04L 41/0809 |
| 9,247,549 B2* | 1/2016 | Bang | H04W 40/22 |
| 9,251,463 B2* | 2/2016 | Cook | G06N 5/02 |
| 9,313,320 B2* | 4/2016 | Zeilingold | H04M 1/72572 |
| 9,313,863 B2* | 4/2016 | Hershberg | H05B 37/0272 |
| 9,357,385 B2* | 5/2016 | Benoit | H04L 12/2809 |
| 9,377,525 B1* | 6/2016 | Pon | G01S 5/06 |
| 9,438,440 B2* | 9/2016 | Burns | H04W 84/00 |
| 9,473,321 B1* | 10/2016 | Bazar | H04L 12/2829 |
| 9,473,514 B1* | 10/2016 | Chou | H04L 63/123 |
| 9,501,061 B2* | 11/2016 | Chen | G05D 1/0816 |
| 9,509,763 B2* | 11/2016 | Canoy | H04L 67/10 |
| 2002/0047628 A1 | 4/2002 | Morgan et al. | |
| 2003/0216139 A1 | 11/2003 | Olson et al. | |
| 2004/0215816 A1 | 10/2004 | Hayes et al. | |
| 2005/0024228 A1 | 2/2005 | Vignon et al. | |
| 2005/0026602 A1 | 2/2005 | Chuey et al. | |
| 2006/0049935 A1 | 3/2006 | Giannopoulos et al. | |
| 2006/0198523 A1 | 9/2006 | Shearer | |
| 2006/0229739 A1 | 10/2006 | Morikawa | |
| 2010/0063774 A1 | 3/2010 | Cook et al. | |
| 2010/0094786 A1 | 4/2010 | Gupta et al. | |
| 2010/0114807 A1* | 5/2010 | Ueda | G06N 99/005 |
| | | | 706/25 |
| 2011/0046805 A1 | 2/2011 | Bedros et al. | |
| 2011/0118857 A1 | 5/2011 | Bodnar | |
| 2011/0148685 A1 | 6/2011 | Welten | |
| 2011/0149919 A1* | 6/2011 | Kapoor | H04L 1/1812 |
| | | | 370/336 |
| 2011/0190953 A1 | 8/2011 | Park et al. | |
| 2012/0209796 A1 | 8/2012 | Vashist et al. | |
| 2012/0239963 A1 | 9/2012 | Smith | |
| 2012/0265717 A1 | 10/2012 | Narayanan et al. | |
| 2013/0006906 A1 | 1/2013 | Cook | |
| 2013/0098596 A1 | 4/2013 | Fisher et al. | |
| 2014/0028714 A1 | 1/2014 | Keating et al. | |
| 2014/0349269 A1* | 11/2014 | Canoy | G06N 99/005 |
| | | | 434/322 |
| 2014/0351180 A1* | 11/2014 | Canoy | G06N 99/005 |
| | | | 706/12 |
| 2014/0351181 A1* | 11/2014 | Canoy | G06N 5/04 |
| | | | 706/12 |
| 2014/0351182 A1 | 11/2014 | Canoy et al. | |
| 2014/0351374 A1* | 11/2014 | Canoy | G06N 99/005 |
| | | | 709/217 |
| 2016/0121487 A1* | 5/2016 | Mohan | B25J 13/006 |
| | | | 700/248 |

FOREIGN PATENT DOCUMENTS

| | | | | |
|---|---|---|---|---|
| WO | 0150684 A1 | 7/2001 | | |
| WO | 03077610 A1 | 9/2003 | | |
| WO | 2014027275 A1 | 2/2014 | | |
| WO | WO 2014190338 A2 * | 11/2014 | | G09B 5/00 |
| WO | WO 2014190338 A3 * | 4/2015 | | G09B 5/00 |

OTHER PUBLICATIONS

Rashidi et al., "Keeping the Resident in the Loop: Adapting the Smart Home to the User", Sep. 2009, IEEE Transactions on Systems, Man, and Cybernetics—Part A: System and Humans, vol. 39, No. 5, pp. 949-959.*

Balko S: "Understanding Intermediate Events, Asynchronous Message Receipt and Correlation in NetWeaver BPM 7.20", SAP Community Network, Jan. 1, 2010 (Jan. 1, 2010), pp. 1-20, XP055166477, Retrieved from the Internet: URL:http://www.sdn.sap.com/irj/scn/go/portal/prtroot/docs/library/uuid/f0369539-e876-2d10-ef93-8f30e112ee6d?Quicklink=index&overridelayout=true&50680614450635 [retrieved on Feb. 2, 2015] p. 1-p. 18.

Obermaisser R., et al., "Detection of Out-of-Norm Behaviors in Event-Triggered Virtual Networks", Industrial Informatics, 2007 5th IEEE International Conference On, IEEE, PI, Jul. 1, 2007 (Jul. 1, 2007), pp. 971-976, XP031161917, ISBN: 978-1-4244-0850-4 p. 971-p. 976, left-hand column.

Rashidi P., et al., "Keeping the Resident in the Loop: Adapting the Smart Home to the User", IEEE Transactions on Systems, Man and Cybernetics. Part A: Systems and Humans, IEEE Service Center, Piscataway, NJ, US, vol. 39, No. 5, Sep. 1, 2009 (Sep. 1, 2009), pp. 949-959, XP011344768, ISSN: 1083-4427, DOI: 10.1189/TSMCA.2009.2025137 p. 949-p. 959, left-hand column, paragraph 2.

Sandhu J S, et al., "Wireless Sensor Networks for Commercial Lighting Control: Decision Making with Multi-agent Systems", Jan. 1, 2004 (Jan. 1, 2004), pp. 1-5, XP055166479, Retrieved from the Internet: URL: http://best.berkeley.edu/research/smartLighting/support/AAAI_04_SN_J_Sandhu.pdf [retrieved on Feb. 2, 2015] p. 1-p. 5, left-hand column, paragraph 1.

Wang; X. et al., "Wang X., et al., "Decentralized Event-Triggered Broadcasts over Networked Control Systems", Apr. 22, 2008 (Apr. 22, 2008), Hybrid Systems: Computation and Control; [Lecture Notes in Computer Science], Springer Berlin Heidelberg, Berlin, Heidelberg, pp. 674-677, XP019101749, ISBN: 978-3-540-78928-4 p. 674-p. 677, paragraph 4", 2008, 674-677.

Casambi Technologies Ltd., "Casambi for Hue," Casambi for Hue on the App Store on iTunes, 2014, Retrieved from the Internet < URL: https://itunes.apple.com/app/casambi-for-hue/id731859317 >, [Retrieved on Mar. 31, 2014], 4 pages.

Cook D.J., et al., "Ambient Intelligence: Technologies, Applications, and Opportunities," 2007, pp. 1-38.

Cook D.J., "How Smart Is Your Home?," Science, Mar. 30, 2012, vol. 335, pp. 1579-1581.

Khalili A., et al., "Autonomous Learning of User's Preference of Music and Light Services in Smart Home Applications," 2009, 12 pages.

Pathen A.S.K., et al., "Smartening the Environment using Wireless Sensor Networks in a Developing Country," International Conference on Advanced Communication Technology, 2006, pp. 705-709.

Sato K., et al., "CyPhy-UI: Cyber-Physical User Interaction Paradigm to Control Networked Appliances with Augmented Reality,"

(56) References Cited

OTHER PUBLICATIONS

ACHI 2013: The Sixth International Conference on Advances in Computer-Human Interactions, 2013, pp. 215-221.
CNET Ed., "Nest Learning Thermostat review: Second-gen Nest zeroes in on perfection," Retrieved on Jul. 1, 2014, Retrieved from the Internet < URL: http://reviews.cnet.com/smart-home/nest-learning-thermostat/4505-9788_7-35179222.html >, 10 Pages.
Mozer M.C., "The Adaptive House", University of Colorado at Boulder, Retrieved on May 21, 2014, pp. 3, URL: http://www.cs.colorado.edu/~mozer/index.php?dir=/Research/Projects/Adaptive%20house/.
Cook D., et al., "CASAS: A Smart Home in a BOX," Published online Sep. 26, 2012.
El-Zabadani H., et al., "The Gator Tech Smart House: A Programmable Pervasive Space," Computer, Mar. 1, 2005, vol. 38 (3), pp. 50-60, XP011129155, ISSN: 0018-9162, DOI: 10.1109/MC.2005.107 p. 52, left-hand column Section "Sensor Platform"; p. 55.
Helal S., et al., "The Gator Tech Smart House: Enabling Technologies and Lessons Learned," ICREAT, Apr. 2009.
Breuer H, et al., "Mobile Learning with Patterns", Advanced Learning Technologies, 2008. ICALT '08. Eighth IEEE International Conference On, IEEE, Piscataway, NJ, USA, Jul. 1, 2008 (Jul. 1, 2008), pp. 626-638, XP031284609, ISBN: 978-8-7695-3167-8 p. 626-p. 638, left-hand column, paragraph 4.
Cook D.J., et al., "Learning to Control a Smart Home Environment Continental Automated Buildings Association Information Series", Continental Automated Building Association Information Series IS 2004-52, Learning to Control a Smart Home Environment, Dec. 1, 2004 (Dec. 1, 2004), pp. 1-28, XP055170496, Retrieved from the Internet: URL:http://www.caba.org/resources/Documents/is-2004-52.pdf [retrieved on Feb. 18, 2015].
Galindo C, et al., "Towards the Automatic Learning of Reflex Modulation for Mobile Robot Navigation", Jun. 18, 2007 (Jun. 18, 2007), Nature Inspired Problem-Solving Methods in Knowledge Engineering; [Lecture Notes in Computer Science;;LNCS], Springer Berlin Heidelberg, Berlin, Heidelberg, pp. 347-356, XP019095500, ISBN: 978-3-540-73054-5 p. 347-p. 355.
International Search Report and Written Opinion—PCT/US2014/039467—ISA/EPO—Feb. 23, 2015.
Joya G, et al., A neural paradigm for controlling autonomous systems with reflex behaviour and learning capability, Jun. 7, 1995 (Jun. 7, 1995), From Natural to Artificial Neural Computation, Springer Berlin Heidelberg, Berlin, Heidelberg, pp. 283-290, XP019186930, ISBN: 978-3-540-59497-0 p. 283-p. 289.

* cited by examiner

Learning Rates

Different Gain Sets for Critical and Steady State Periods

| Critical Learning Period<br>801 | Steady State Learning Period<br>802 |
|---|---|
| Gain Set 1<br>Trigger, Action, Reward, Correction | Gain Set 2<br>Trigger, Action, Reward, Correction |

FIG. 8

SIGNALING DEVICE FOR TEACHING LEARNING DEVICES

RELATED APPLICATIONS

The present application claims the benefit of priority to U.S. Provisional Application No. 61/827,141, entitled "A Method and Apparatus for Continuous Configuration of a Device" filed May 24, 2013, the entire contents of which are hereby incorporated by reference for all purposes.

The present application is also related to U.S. patent application Ser. No. 14/286,244 entitled "Learning Device With Continuous Configuration Capability", which is filed concurrently herewith, the entire contents of which are incorporated by reference for further details regarding learning devices.

BACKGROUND

Computer programmers must typically reprogram a programmable device (i.e., a smart device) each time the device needs to perform a new behavior. Programmable devices typically require programmers (or users) to use a specialized programmer interface that interfaces with the device to teach it a new task. However, even with the programmer interface, the reconfiguring and reprogramming of programmable devices may require expertise in writing arduous computer code associated with the programmer interface to teach the device new behaviors. Scheduling an expert to write code means reprogramming is rarely accomplished immediately, and may be costly because it may require keeping such an expert on staff or hiring a consultant to make the appropriate changes. Thus, programming a new behavior on a programmable device is not a simple and efficient endeavor. A simple and quick mechanism is needed to teach learning devices new behaviors without the need of an expert.

SUMMARY

The various embodiments provide systems, devices, non-transitory processor-readable storage media, and methods for a teacher signaling device to conduct proxy teaching for learning devices within a decentralized system. An embodiment method that may be performed by a processor of a teacher signaling device may include obtaining objectives data related to activities of one or more of the learning devices, generating teaching routines based on the obtained objectives data, and broadcasting teaching signals configured to teach one or more of the learning devices based on the generated teaching routines. In some embodiments, obtaining objectives data related to activities of one or more of the learning devices may include broadcasting signals requesting reflex information from the learning devices, receiving response messages including the reflex information from the learning devices, and obtaining the objectives data from the reflex information from the received response messages. In some embodiments, obtaining objectives data related to activities of one or more of the learning devices may include intercepting event report messages transmitted by the learning devices, and obtaining the objectives data based on the intercepted event report messages.

In some embodiments, the method may further include broadcasting discovery signals requesting identifying responses from the learning devices that indicate at least a device type for each of the learning devices, receiving the identifying responses from the learning devices in response to the broadcast discovery signals, determining whether objectives of the generated teaching routines can be achieved based on the received identifying responses, and modifying the generated teaching routines in response to determining that the objectives of the generated teaching routines can be achieved based on the received identifying responses. In some embodiments, the method may further include transmitting an authorization request to a user device, and determining whether an authorization is received from the user device in response to the transmitted authorization request, in which broadcasting the teaching signals configured to teach one or more of the learning devices based on the generated teaching routines may include broadcasting the teaching signals configured to teach the one or more of the learning devices based on the generated teaching routines in response to determining that the authorization is received from the user device.

In some embodiments, the method may further include broadcasting a first signal that causes the learning devices to enter a learning mode, and broadcasting a second signal that causes the learning devices to exit the learning mode. In some embodiments, the method may further include broadcasting a signal that causes one or more of the learning devices to reset a trigger weight for a reflex. In some embodiments, the method may further include intercepting event report messages transmitted by one or more of the learning devices in response to the broadcast teaching signals, updating stored data indicating historical information associated with the generated teaching routines based on the intercepted event report messages and the broadcast teaching signals, and displaying the updated stored data.

In some embodiments, the method may further include intercepting event report messages transmitted by the learning devices, obtaining an image of at least a portion of an environment including the learning devices, correlating the learning devices to segments of the obtained image, identifying a relationship between the learning devices based on the intercepted event report messages, displaying graphical user interface elements indicating the identified relationship on the obtained image, and broadcasting an event report message in response to receiving a first user input on a graphical user interface element related to the identified relationship. In some embodiments, the method may further include receiving a second user input that adjusts the graphical user interface element related to the identified relationship, in which broadcasting the teaching signals configured to teach the one or more of the learning devices based on the generated teaching routines includes broadcasting the teaching signals configured to teach the one or more of the learning devices based on the received second user input adjusting the graphical user interface element.

Various embodiments may include a computing device configured with processor-executable instructions to perform operations of the methods described above. Various embodiments may include a computing device having means for performing functions of the operations of the methods described above. Various embodiments may include non-transitory processor-readable storage media on which are stored processor-executable instructions configured to cause a processor of a computing device to perform operations of the methods described above. Various embodiments may include a system that may include one or more devices configured to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 8 is a diagram of two exemplary learning rates for a learning device suitable for use in various embodiments.

DETAILED DESCRIPTION

Figure 1A:
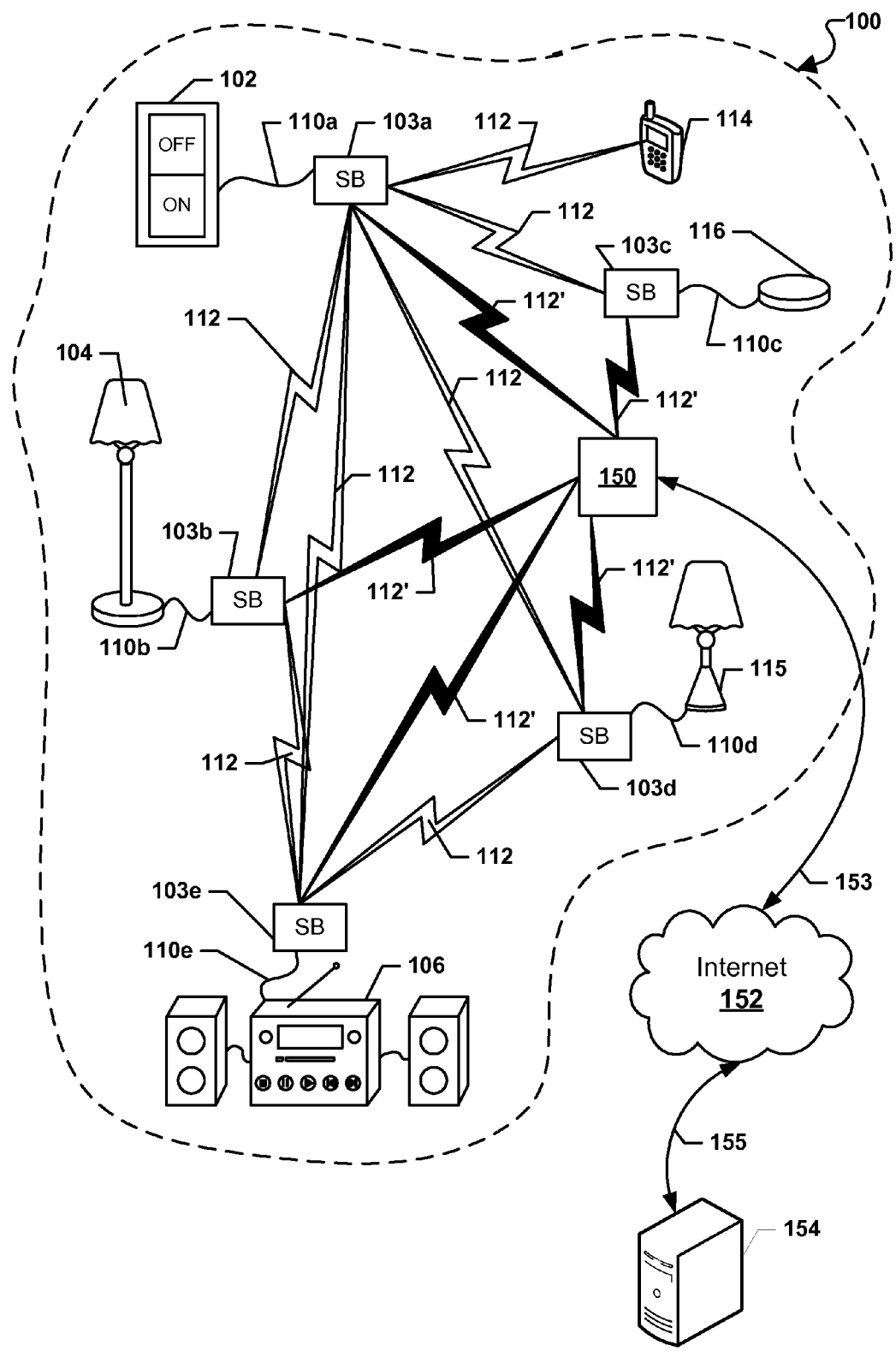
FIGS. 1A-1B are system block diagrams illustrating exemplary systems implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "learning device(s)," "smart device(s)," and "smart box(es)" are used herein to refer to computing devices capable of learning behaviors from observed information by correlating predefined actions with information related to triggers, such as data indicating user inputs, detected changes in states, received signals or transmissions, and other information that may be obtained at the devices. Learning devices may be configured to store new relationships or correlations between triggers and predefined actions over time. In response to detecting a trigger already correlated to a predefined action, a learning device may perform the predefined action or alternatively perform operations to cause other associated devices to perform correlated actions. Throughout the disclosure, the modifier "smart" may be used to indicate an appliance (e.g., a lamp) is a learning device. For example, the term "smart lamp" refers to a lamp that is configured to be a learning device, is coupled to and controlled by a learning device, or otherwise includes components of a learning device.

The term "event" is used herein to refer to data (e.g., an object or other data structure) that represents an action, condition, and/or situation that has been detected or generated by one or more learning devices. Events may be generated (or otherwise obtained) and stored locally on learning devices in response to obtaining information (referred to herein as "occurrence data") indicating the occurrence of an action or condition. Occurrence data may include various data describing an action or condition, as well as identifying the device that performed or detected the action or condition, such as device identifiers, timestamps, priority information, gain information, state identifiers, etc. Occurrence data may be received or obtained by a learning device from signals or other information from devices connected to the learning devices (e.g., a sensor directly coupled to a processor or core of a learning device, etc.) or otherwise controlled by the learning device (e.g., a non-programmable lamp, etc.). Occurrence data may also be received or obtained by learning devices from broadcast messages (referred to herein as "event report messages") received from other nearby devices. For example, after generating a first event based on locally encountered sensor data, a first learning device may broadcast an event report message with occurrence data indicating that the first event has occurred so that a second learning device may be enabled to also generate the first event based on the data within the event report message.

The term "reflex" is used herein to refer to stored information within a learning device that indicates at least a correlation or relationship between a trigger and an action the learning device is configured to perform. The stored information of a reflex may include patterns that may be matched to events generated within a predetermined time window to cause the learning device to perform the action of the reflex and/or adjust persistent data stored in relation to the reflex (e.g., trigger weights). Events may be considered the building blocks of the patterns within a reflex. For example, a trigger pattern stored within a reflex may be comprised of one or more events.

Learning devices may be configured to experience continued configuration through machine learning processes. Such learning processes may emulate biological systems to enable learning devices to be easily configured by a user through intuitive training methods. Learning devices may be easily configured to react in a desired manner in response to events, which may be generated as a result of user actions, changes in state of other learning devices, etc. Through simple repetition, a variety of behaviors can be learned by and thus implemented in a decentralized system of a plurality of learning devices without the need for preconditioning or a programmer interface. Using repeated rewarding training inputs, a user may easily train the learning device to automatically perform predefined tasks in response to various triggers. In a similar manner, a user may easily train the learning devices to stop automatically performing a particular task in response to other triggers by using repeated correcting inputs. Such training is beneficial as it avoids complicated or tedious setup or programming.

However, the user may only train the smart devices when present and also aware of the ways such devices may be trained/programmed (e.g., via expert settings or options). On occasion users may be unavailable to interact with learning devices for teaching purposes, such as when they are at work or on vacation. For example, a user who often travels for work may not be around his house regularly enough to teach smart blinds to shut in response to certain outside temperatures and/or times of the day. Without direct interactions over time, achieving desired behaviors of learning devices in a location may be difficult.

Various embodiments provide devices, methods, protocols, systems, and non-transitory processor-readable storage media that enable proxy teaching of learning devices in a decentralized system. A teacher signaling device may teach the various learning devices in a location to associate various triggers with their predefined functionalities without direct interactions from the user. For example, a user may teach smart blinds by opening or closing them based on his/her preference for light and shade inside a house; however, when the user activates a teacher signaling device, the teacher signaling device teacher may take over teaching the smart blinds how to behave in a manner that is similar to how the user did (e.g., shut the blinds as soon as sunlight is detected in the room, etc.). Such an indirect (or proxy) teaching scheme may be beneficial when a user is not available to interact with learning devices, such as when he/she is out of the house, uninterested in hands-on teaching of devices, and/or lacks the specific expertise needed to tune the learning devices of a system.

By transmitting signals that emulate physical occurrences (e.g., user interactions) and/or conditions within a system (e.g., time, sensor information, etc.), a teacher signaling device may provide inputs that cause learning devices to learn reflexes or actions to take when the actual physical occurrences and/or conditions are detected in the future. In particular, the teacher signaling device may broadcast "teaching signals" that are structured to include information in a manner that is consistent with event report messages that may be transmitted by other learning devices as described throughout this disclosure. For example, the teacher signaling device may transmit a teaching signal that includes data similar to the occurrence data within an event report message that is transmitted by a smart wall switch after being flipped 'on' by the user. Thus, even though the user was not present to flip the smart wall switch, other learning devices within communication range of the teacher signaling device will receive an event report message as if the user had flipped the switch. In some instances, the teacher may be a robot, in which case the robot may turn the switch on or off as a human user would.

By formatting teaching signals and including information consistent with normal event report messages, the teacher signaling device transmits signals that may be received and processed by learning devices as if occurrences (e.g., switch flipped, light state change, etc.) have actually occurred. Thus, the teacher signaling device may cause learning devices to artificially receive information of events in a pattern and timing consistent with what the learning devices would observe in response to the user actually performing teaching actions. In some embodiments, teaching signals may include commands that directly affect learning devices. For example, a teaching signal may include a command instructing a smart lamp to turn on its light source or a smart blind to open/close itself. In some embodiments, a teaching signal may include information (e.g., header information) indicating it is a teaching signal and not an actual event report message. Further, teaching signals may correspond to trigger patterns, action patterns, reward patterns, and/or correction patterns used by learning devices to learn new associations as well as to adjust trigger weights.

Learning devices may process, record, and otherwise utilize the data included within received teaching signals to generate events and/or patterns. In other words, learning devices may respond to the receipt of teaching signals in a manner that is similar to how the learning devices respond to the receipt of an event report message. For example, based on a received teaching signal, a smart lamp learning device may generate an "on" event related to a smart wall switch. Further, learning devices may utilize data from received teaching signals in addition to other data encountered by the learning devices (e.g., internal events generated in response to command signals, sensor data, internal clocks, triggered actions, etc.) to generate events and patterns. For example, data from both a teaching signal and an event report message received within a predetermined time window may be used to generate events that relate to a trigger pattern for a smart lamp.

Teaching signals may be transmitted by the teacher signaling device based on teaching routines generated by the teacher signaling device. Teaching routines may be schedules, instructions, and/or other guides for the type(s) of teaching signals to be transmitted, data to be included within the teaching signals, as well as the manner in which the teaching signals are transmitted by the teacher signaling device. For example, a teaching routine may indicate the time(s) of day, the duration, the number of iterations, the included occurrence data, and other specific transmission information for the teacher signaling device to broadcast a particular teaching signal designed to teach a smart lamp.

Teaching routines may be generated by the teacher signaling device based on data that defines how the user desires a system to behave (referred to herein as "objectives data"), which may be obtained in a variety of ways. Objectives data may include predefined programs, scripts, expert guides/specifications, instruction sets, occurrence data, user preference data, reflexes, and other data obtained by the teacher signaling device. For example, objectives data may include a script or data file that indicates the user desires to have a room stay at a certain temperature, or blinds shut at a certain time of day for security purposes. As another example, objectives data may include downloaded expert information indicating good lighting settings for certain occasions (e.g., relaxing colors for certain times, etc.). Based on the objectives data and/or an analysis of objectives data, the teacher signaling device may identify the learning devices (or classes of learning devices) it should communicate with, as well as the schedule for various teaching signals that should be transmitted to teach the identified learning devices to accomplish the user's objectives.

In some embodiments, the teacher signaling device may obtain objectives data used to generate teaching routines by intercepting or observing and recording event report messages or other signals transmitted by learning devices in response to user interactions. The teacher signaling device may listen for event report messages from learning devices to detect conditions in a location, such as actions that have been performed by a user as well as reactions by learning devices to those performed actions. In this manner, the teacher signaling device can learn to emulate the user's own interactions with learning devices in order to generate new teaching routines and update generated teaching routines so that the teacher signaling device can continue to train the learning devices when the user is away. For example, the teacher signaling device may receive signals broadcast from smart blinds during a period to identify patterns of when and under what conditions the user shuts or opens the blinds. Further, the teacher signaling device may receive data signals from other devices or sensors that provide environmental sensor data (e.g., time of day, air pressure, light levels, temperature, etc.) that may be used in addition to other received data to generate teaching routines related to maintaining certain environmental conditions or user preferences. For example, the teacher signaling device may intercept event report messages indicating a series of events (e.g., a door opening, a clock time, a light switch being turned on, a temperature reading, a light sensor reading, etc.) that may be analyzed to detect a pattern which may be repeated with teaching signals. In this way, the teacher signaling device may "see-and-repeat" user interactions with learning devices to obtain data for later teaching operations when the user is not involved. In some embodiments, the teacher signaling device may generate teaching routines based on a first observed occurrence of signals in a location, or alternatively may generate a teaching routine only when an occurrence (or set of occurrences) is indicated more than once in data from intercepted signals. In other embodiments, the teacher signaling device may be configured with logic to remove redundant objectives data from intercepted signals, such as a filter that removes data of signals received more than once within a certain time period (e.g., every few seconds, etc.).

In some embodiments, objectives data may be obtained by a teacher signaling by downloading or otherwise receiving data from a data store (e.g., a flash drive) or remote data sources, such as servers that store expert information. In particular, such objectives data may be scripts, programs, or other algorithmic information that may be loaded onto the teacher signaling device and used to generate related teaching routines. For example, a user may download scripts to the teacher signaling device that describe how to teach smart light devices (e.g., Christmas lights, mood lights, overhead lights, lamps, etc.) in a smart home to change their intensity in response to various factors (e.g., time of day, occupants present, etc.). As another example, a user may download to the teacher signaling device a set of specifications data that the teacher signaling device may use to generate a schedule for transmitting signals that teach smart blinds to keep a certain room temperature or provide security (e.g., smart blind is taught to associate a time or available light amount with its actions, etc.). Such downloaded objectives data may include applications (or "apps") for teaching learning devices to behave in energy efficient modes (e.g., "eco" teaching), comfort modes (e.g., turn AC units on a certain number of minutes before a user returns home, etc.), mood modes (e.g., change light, music, and wall art based on a mood or horoscope, etc.), and expert lighting configurations (e.g., industrial design expertise to display the best possible light). In some embodiments, objectives data that may be downloaded from remote data sources may include pre-generated teaching routines for a particular system of learning devices.

In some embodiments, objectives data may be obtained by a teacher signaling device via user inputs that may directly program the teacher signaling device with selected objectives data, such as a time or temperature the user would like his/her smart blinds to be lowered. Such objectives data may be inputted via peripherals attached to the teacher signaling device and/or on interfaces coupled to the device, such as a touch screen. In some embodiments, such user-defined objectives data may be downloaded or otherwise transferred to the teacher signaling device via a communication link (e.g., WiFi communications, Bluetooth, etc.).

In some embodiments, objectives data may be obtained by a teacher signaling device by requesting reflex data from nearby learning devices in order to benefit from learned behaviors within a distributed learning system. In other words, the teacher signaling device may download or otherwise receive pre-existing associations between triggers and actions of learning devices based on stored information already utilized at those learning devices. In this embodiment, the teacher signaling device may obtain data structures from learning device that include or encode trigger patterns, action patterns, correction patterns, and reward patterns that have been learned and stored in the learning devices. Such previously learned pattern and reflex data may be used by the teacher signaling device to generate teaching routines that may be used in different locations. In this manner a teacher signaling device can be introduced into a distributed learning system in order to obtain and store the behaviors and reflexes learned by a user, and then moved to a new distributed learning system where it can teach other learning devices the user's preferences. For example, the teacher signaling device may obtain trigger patterns, action patterns, correction patterns, and reward patterns from a distributed system of learning devices in first room, and generate a teaching routine for use in teaching learning devices in a second room so that the smart appliances behave in the same way in both rooms without the need for the user to repeat the training process in the second room. As another example, after obtaining the reflexes from the learning devices in a user's house, the teacher signaling device may be used in a hotel room in order to teach the hotel's learning devices to conform to the behaviors the user was happy with at home. Thus, with such a reflex copying functionality, the teacher signaling device can be moved to other locations to perform teaching operations that are based on pre-existing learning device behaviors. To enable such embodiments, learning devices may be configured to quickly learn event-action associations from teacher signaling devices, but then revert to a previous or preferred set of event-action associations when signals from a teacher signaling device has not been received within a predetermined amount of time. In this manner, learning devices in a hotel room may return to an initial or default configuration after a user with a teacher signaling device checks out.

In some embodiments, prior to or in conjunction with transmitting teaching signals the teacher signaling device may transmit a signal that causes learning devices to enter a "learning mode". In some embodiments, the teacher signaling device may transmit a "reset" signal to learning devices that causes the learning devices to remove or nullify some learned information. For example, in response to receiving a reset signal from the teacher signaling device, a smart lamp learning device may modify a trigger weight or otherwise change a gain associated with a stored reflex. Such a reset signal may cause changes to learned information at a learning device over a certain period (e.g., the last day's teaching, etc.), or alternatively all experienced learning.

In some embodiments, the teacher signaling device may detect/discover the learning devices in a location (e.g., house, office, room, etc.) or within the reception range of event signaling messages, such as by receiving their wireless signals and identifying each learning device from identification information in the signals. Alternatively, the teacher signaling device may transmit a query or device discovery signal that requests learning devices receiving the signal to respond by transmitting identifying messages. For example, based on responses to discovery signals or merely based on intercepted signals, the teacher signaling device may discover a smart switch, a smart lamp, smart blinds, and a smart washing machine in a user's home. Based on identifying data that may be included within event signaling messages or response signals the teacher signaling device may determine the type, class, firmware version, brand, and/or function of discovered (or detected) learning devices. For example, class or device ID information may be included in a header of event signaling messages or response signals. In some embodiments, the teacher signaling device may be configured to identify various learning devices and/or their functionalities and change, translate, or otherwise adjust teaching routines in order to accommodate different operations, functionalities, reflexes, message formats, signaling protocols or data structures of different types of learning devices. For example, when a smart blind is not discovered within a room but a smart sky light cover is discovered, the teacher signaling device may be configured to update a teaching routine to include the transmission of teaching signals for closing the smart sky light cover in order to dim the ambient light of a room.

In some embodiments, the teacher signaling device may request confirmation from a user prior to transmitting teaching signals. For example, the teacher signaling device may transmit a query to the smartphone of the user that indicates "About to begin teaching the home devices. Is that OK?" In response to a confirmation reply, the teacher signaling device may or may not proceed to transmit teaching signals according to a generated teaching routine.

Although the teacher signaling device may be configured to emit signals to teach nearby learning devices, user interactions with the learning devices may supersede any such teaching by the teacher signaling device. For example, the teacher signaling device may transmit teaching signals that teach a smart floor lamp to turn on in response to a certain condition (e.g., time of day, event occurred in relation to another smart device, etc.). However, based on subsequent actions or inputs by the user (e.g., pressing a correct button, turning off the device, etc.), the smart floor lamp may adjust trigger weights of related reflexes so that the floor lamp does not turn on in response to the certain condition. In this way, the user may overwrite or adjust the teaching that may be provided by the teacher signaling device.

Further, the teacher signaling device may learn the user's preferences for subsequent teaching based on the user's interactions with learning devices affected by teaching signals. In particular, the teacher signaling device may adjust teaching routines in response to intercepting event report messages that indicate states (or state changes) of learning devices that are contradictory to the teaching routines. As an example, the user may be at home when the teacher signaling device begins training nearby smart blinds to close under certain conditions (e.g., time of day, temperature outside, etc.). During the course of the teacher signaling device sending teaching signals, the user may observe a behavior he/she wishes to correct or customize (i.e., the blinds being closed), and may manually provide inputs to the smart blinds to open the blinds and thus adjust their learning. The teacher signaling device may receive event report messages from the blinds indicating they have been opened based on the user's actions. The teacher signaling device may evaluate the received event report messages and determine that the device state of the smart blinds is different from its teaching instructions. Such a difference may be interpreted as counter-teaching activities by the user, and so the teacher signaling device may update its teaching routines to align with the user's intentions. Accordingly, the teacher signaling device may not subsequently transmit teaching signals to teach the smart blinds to close in the same context.

In some embodiments, the teacher signaling device may be configured to operate in a mode that may or may not automatically adjust teaching routines based on received signals. For example, the user may press a button on the teacher signaling device enabling the teacher signaling device to adjust its teaching routines based on corrections or counter-teaching performed by the user shortly after teaching signals were transmitted.

In some embodiments, the teacher signaling device may be configured to teach nearby learning devices to associate certain predefined actions with alert conditions and/or messages from devices. For example, the teacher signaling device may transmit teaching signals that teach a smart fan to activate in response to an alert message that a smart oven is configured to transmit in response to detecting burning food. The behaviors that may be taught by the teacher signaling device in association with such alert conditions and/or messages may vary. For example, smart windows may be taught to open in response to a burning food alert from a smart oven, but may be taught to close in response to an intruder alert message from a motion detector. In some embodiments, the teacher signaling device may teach smart devices to reschedule activities (e.g., actions triggered based on time of day, etc.) and/or enter an alert configuration mode/operating state in response to receiving alert messages. For example, the user may set up his smart washer or dryer to run in the morning after he leaves the house. If a flex alert is in effect, the teacher signaling device may modify the setting so the appliances run after 6 PM.

In various embodiments, the teacher signaling device may be a robot or software executing on a computing device. For example, the teacher signaling device may be a smartphone, laptop, desktop, or other personal computer with a wireless transmitter/receiver for receiving event report messages and transmitting teaching signals for receipt by nearby learning devices.

In a further embodiment, teacher signaling devices may be used in industrial settings, such as to teach learning devices (e.g., smart appliances) in a manufacturing or testing facility to learn an initial configuration or event-action association. In this manner, smart appliances may be configured with an initial or default functionality using the learning processes.

In a further embodiment, a teacher signaling device may be equipped with a microphone with its processor configured with voice recognition software to receive voice instructions from a user. In such embodiments, a user may voice instructions to a teacher signaling device that may be converted into code to train devices. For example, the user could tell the teacher signaling device "please train my blinds to close whenever the light shines in," and the teacher signaling device may translate such verbal commands into a teaching routine of event signaling messages.

In some embodiments, the teacher signaling device may be configured with a graphical user interface (GUI) that users may manipulate to recreate or adjust causal relationships between learning devices in an environment. In other words, a selection of a GUI element by a user (e.g., by the user touching the element displayed on a touchscreen interface) may cause the teacher signaling device to broadcast wireless waveforms (e.g., event report messages) that include codes or other information similar or identical to data previously transmitted by a first learning device and identified as a trigger to an action of a second learning device. Such broadcasting (or re-broadcasting) of event report messages by the teacher signaling device may be done without a dedicated channel between learning devices and the teacher signaling device, and further may be done without the awareness of the learning devices that originally transmitted the event report messages.

In such embodiments, the teacher signaling device may be configured to decode and store intercepted event report messages received from nearby learning devices. The signals may be correlated with segments of an image that represent the learning devices transmitting and receiving the intercepted event report messages. Such an image may be a digital photo or video imagery obtained by a camera coupled to the teacher signaling device. Interactive graphical elements indicating the relationships between the learning devices may be rendered on the teacher signaling device, such as line or arrow graphical elements that connect a representation of a first learning device (e.g., a smart wall switch) to a representation of a second learning device (e.g., a smart floor lamp). For example, the teacher signaling device may render via the GUI an arrow that runs from a first block of an image representing the first learning device to a second block of the image representing the second learning device to indicate that an event report message from the first learning device (e.g., an 'on' smart wall switch event report message) has been identified as a trigger for an action by the second learning device (e.g., the smart floor lamp may turn on). Users may activate, press, or otherwise interact with GUI elements in order to cause the teacher signaling device to replicate or re-broadcast intercepted event report messages associated with identified causal relationships of the learning devices. For example, in response to a user pressing a soft GUI button associated with or indicating a relationship between a first learning device and a second learning device displayed on the GUI display, the teacher signaling device may broadcast an event report message that is consistent with the message normally transmitted by the first learning device that causes the second learning device to perform an action.

In some embodiments, the graphical elements of the GUI may be adjusted by users in order to cause the teacher signaling device to broadcast teaching signals that change the learned behaviors of learning devices. For example, a user may disconnect a graphical arrow element in between image segments associated with a first and second learning device, causing the teacher signaling device to transmit teaching signals to "correct" (or unlearn) a related reflex trigger weight at the second learning device so that the second learning device no longer performs a particular action in response to receiving an event report message from the first learning device. As another example, the user may re-connect the graphical arrow element in between the first learning device and a third learning device, causing the teacher signaling device to transmit teaching signals to "reward" a related reflex trigger weight at the third learning device so that the third learning device learns to perform an action in response to receiving the event report message from the first learning device.

In some embodiments, the teacher signaling device may be a mobile device (e.g., smartphone, tablet, etc.) configured with processor-executable instructions to operate as a teacher signaling device, such as via execution of a teacher smartphone application (or "app"). Further, the teacher signaling device may or may not require a connection to the Internet. In some embodiments, in addition to associating event report messages to segments of images, the teacher signaling device may be configured to obtain, store, and associate local sensor data (e.g., light sensor data, location data or GPS coordinates, accelerometer data, gyroscope data, magnetometer data, etc.) with segments of the image. Such sensor data may enable the teacher signaling device to compare the past conditions under which event report messages were intercepted from learning devices to current conditions in order to discover actions (e.g., a light turning on or off) linked to certain event report messages and/or in order to ensure re-broadcasts of event report messages are only performed in similar conditions.

Unlike conventional automation systems and devices, embodiment teacher signaling devices broadcast signals that emulate user interactions with learning devices in a decentralized system. Embodiment devices may not perform operations to optimize, change, or otherwise interpret better conditions in such decentralized systems, but instead may only serve as proxies that mimic the intent of the user with teaching routines based on objectives that are already experienced or pre-programmed. In other words, the embodiment techniques relate to a particular type of teaching in which learning devices are taught how to behave with emulated signals in lieu of the user actually performing training interactions with the learning devices. Further, embodiment systems and devices may not rely on occupancy sensors or motion detectors to determine when users are absent and thus initiate operations. Instead, embodiment teacher signaling devices may be explicitly activated by user inputs or other received inputs (e.g., GPS signals, user button prompts, etc.).

In the following descriptions, learning devices may be referred to as a smart box or smart boxes, which are particular embodiments of learning devices having the components described below with reference to FIGS. 1C and 2. However, it should be appreciated that other learning devices or smart devices having similar components and functionalities may also be configured to utilize various embodiments as described in this disclosure.

FIG. 1A illustrates an embodiment system 100 in which various devices 102, 104, 106, 114, 115, 116 may be controlled by smart boxes 103a-103e that send and receive signals to each other. The signals communicated between the smart boxes 103a-103e may include data or other information that enables each smart box to recognize a signal as being related to the occurrence of a particular action or condition within the system 100. In particular, the smart boxes 103a-103e may broadcast, via radio frequency (RF) transmissions 112 or wireless communication links, event report messages that include occurrence data as described below with reference to FIG. 3A. The smart boxes 103a-103e may alternatively or additionally communicate with each other via wire connections, light, sound, or combinations of such media.

As an example, a system 100 enabled by various embodiments may include a wall switch 102 connected to a smart box 103a that transmit signals which enable the wall switch 102 to control responses by other devices (e.g., to turn on a floor lamp 104). The wall switch 102 may be connected to the smart box 103a by a wired connection 110, or the smart box 103a and the wall switch 102 may be combined into a single unit. When the wall switch 102 is toggled, its associated smart box 103a may detect this change in state and emit an event report message via an RF transmission 112, which may be received by any of the other smart boxes 103b-103e within a radius of the transmitting smart box 103a. One such receiving smart box 103b may be connected to the floor lamp 104 via wired connection 110b. By way of example, the floor lamp smart box 103b may be trained to respond to an event report message corresponding to the wall switch 102 being moved to the 'on' position by generating an event that causes the floor lamp 104 to be turned on. When the floor lamp 104 is turned on, its smart box 103b may broadcast event report messages that include occurrence data indicating the event and that may be received by other nearby smart boxes 103c-103e as well as the smart box 103a connected to the wall switch 102. Alternatively or in addition, the smart boxes 103a, 103c-103e may include a light sensor that may sense the light from the floor lamp 104 so that turning on of the lamp may be treated as a signal indicating an occurrence/condition/action.

As illustrated in FIG. 1A, a variety of devices may be coupled to the smart boxes, such as a desk lamp 115, a stereo 106, a mobile phone 114, and a sensor 116. Although the smart boxes 103a-103e are shown to be separate from the individual devices 102, 104, 115, 116, each device may include an internal smart box, and a smart box within one device may be coupled to a separate device. For ease of description, any reference to the floor lamp 104, the wall switch 102, the desk lamp 115, the sensor 116, and the stereo 106 may also refer to its corresponding smart box unless otherwise stated.

Although not shown in FIG. 1A, non-learning devices may be included in the system 100 to transmit signals (i.e., event report messages) that may be received and processed by the other learning devices or smart boxes throughout the system. For example, the wall switch 102 may have a transmitter in lieu of the shown smart box 103a. When toggled on, the wall switch may send an encoded 'on' signal (e.g., a one-bit event report message) and when the wall switch is toggled off, it may send a different encoded 'off' signal (e.g., a two-bit event report message). Another smart box in the system (e.g., smart box 103b connected to the floor lamp 104) may receive either signal and convert this to an event, which may correspond to an associated action of a stored reflex.

A smart box may typically be configured to broadcast or otherwise transmit event report messages indicating events at the smart box, such as actions performed at or by the smart box and/or conditions detected at the smart box (e.g., sensor data). For example, a smart box or a transmitter (a "reporter") wirelessly connected to the smart box may broadcast a signal including data that indicates that a garage door has been opened. It should appreciated that a smart box may not typically be configured to directly engage with other smart boxes in a location, but instead may merely report occurrence data without soliciting responses and/or without consideration of the operations of other devices. However, in some embodiments, smart boxes may directly communicate with each other via such transmissions 112. For example, a new smart box placed within a location (e.g., a home, office, etc.) may transmit signals to other learning devices within the location to ask for data indicating their favorite (or most frequently encountered) events, and in response to receiving response signals from the other devices, the new smart box may be configured to set a bias.

The system 100 may further include a teacher signaling device 150 that is capable of exchanging wired or wireless signals with the various smart boxes 103a-e within the system 100. In particular, the teacher signaling device 150 may receive communications, such as event report messages and data packets, from the smart boxes 103a-103e via wireless transmissions 112', such as Bluetooth LE, WiFi Direct, RF, etc. For example, the teacher signaling device 150 may be configured to intercept event report messages transmitted by the first smart box 103a in response to the wall switch 102 being turned on. The teacher signaling device 150 may further include a network interface configured to provide a connection to the Internet 152 via the wireless or wired link 153. For example, the network interface may be a transceiver (e.g., WiFi radio, cellular network radio, etc.) capable of communicating with a wide area network (WAN). Based on the connection to the Internet 152, the teacher signaling device 150 may communicate with various devices and data sources via Internet protocols, such as a remote server 154 connected to the Internet 152 via a connection 155. The remote server 154 may be a web server, cloud computing server, or other server device associated with a third-party. For example, the remote server 154 may be a server associated with a store, library, or other data source that distributes programs, apps (or applications), scripts, routines, or other information that may be downloaded and used on the teacher signaling device 150. In some embodiments, the remote server 154 may store data that may be used to generate teaching routines for teaching learning devices how to operate in energy efficient manners, to function harmoniously with certain conditions (e.g., horoscope), and to provide improved lighting displays designed by experts.

Figure 1B:
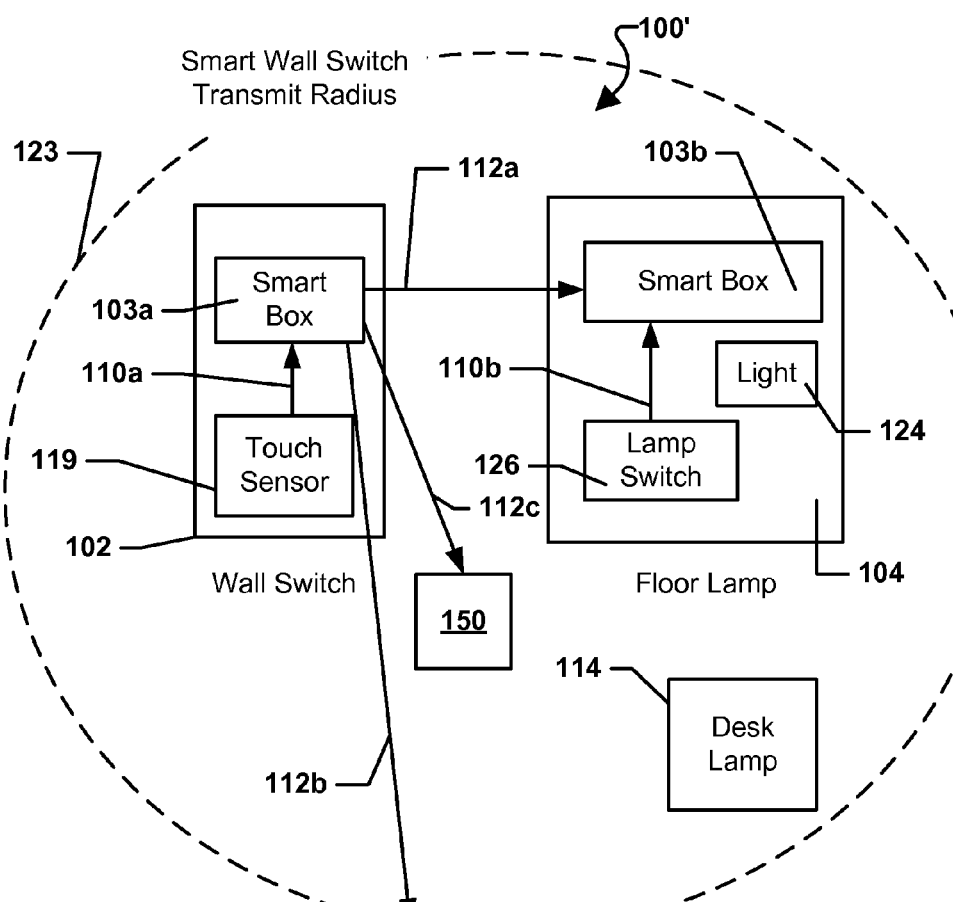

FIG. 1B illustrates that a wall switch 102 in a system 100' may be connected to a smart box 103*a*, either internally or by another connection such as a wired connection 110*a*. The wall switch 102 may have a touch sensor 119 or toggle. When the touch sensor 119 is touched or toggled (e.g., the wall switch 102 is turned on), a state change may be communicated as occurrence data to the smart box 103*a* via the wired connection 110*a*. The smart box 103*a* may interpret the state change indicated by the occurrence data as an event and wirelessly transmit an event report message associated with the event, such as by RF transmissions 112*a*, 112*b*. The event report message may be received by any smart box within the reception range 123 of the wall switch 102. In some embodiments, the floor lamp 104 may include or be coupled to a smart box 103*b* that receives the RF transmission 112*a*. Sometime after receiving the event report message via the RF transmission 112*a*, the lamp switch 126 on the floor lamp 104 may be switched on by a user, thus turning on the light 124. The floor lamp 104 may signal to its smart box 103*b* that it is now in the 'on' state, and the smart box 103*b* may interpret this signal as occurrence data. This signal may be transmitted by a wired connection 110*b* between the lamp switch 126 and the smart box 103*b*, or wirelessly (e.g., via a Bluetooth® data link). When the smart box 103*b* includes a switch that energizes the lamp, this signaling may be the actuation of this switch.

In various embodiments, the smart box 103*b* associated with the floor lamp 104 may be trained to energize or cause the floor lamp 104 to turn on in response to receiving a toggle signal (i.e., an event report message including occurrence data indicating the toggle action) from the wall switch smart box 103*a* by the user manually turning on the floor lamp 104 just before or soon after toggling the wall switch 102 (e.g., within 5-10 seconds). To accomplish such learning, the smart box 103*b* may recognize when the events related to the wall switch toggle (as reported in the event report message) and the activation of the floor lamp 104 (as reported via occurrence data obtained from the floor lamp 104) occur within a predetermined window of time. This may be accomplished at least in part by buffering events generated from obtained occurrence data for the predetermined window of time, processing and correlating events stored in the buffer, and deleting events from the buffer after that time. For example, the smart box 103*b* connected to the floor lamp 104 may associate the 'on' event of the wall switch 102 with the 'on' event of the lamp switch 126 of the floor lamp 104 when the two events are generated or occur within the predetermined window of time, in effect learning that future wall switch 102 'on' events should trigger the activation of the floor lamp 104. In some embodiments, the order of events may be significant, while in some embodiments, the order of events may not matter, and so the order of events may be reversed so long as the events occur (or are generated) within the predetermined window of time. For example, the smart box 103*a* connected to the wall switch 102 may associate the 'on' event of lamp switch 126 of the floor lamp 104 with the subsequent 'on' event of the wall switch 102 (e.g., a touch to the touch sensor 119), in effect still learning that future wall switch 102 'on' events should trigger the activation of the floor lamp 104. As described in more detail below, such training may require some repetition to avoid inadvertent learning of undesired behaviors.

Further, the event report message may be received by a nearby teacher signaling device 150 via the transmission 112*c*, such as via a Bluetooth broadcast signal. As described below, occurrence data within event report messages received at the teacher signaling device 150 may be used by the teacher signaling device 150 to generate new teaching routines, update pre-existing teaching routines, and/or generate informative information, such as statistics corresponding to the actions and learning behaviors of smart boxes.

Figure 1C:
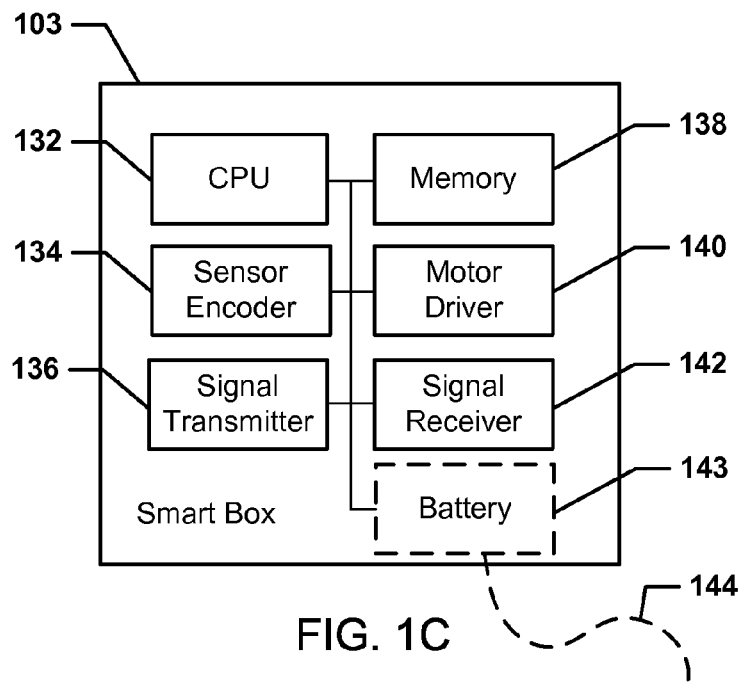
FIG. 1C is a component block diagram of a learning device suitable for use in various embodiments.

As illustrated in FIG. 1C, an embodiment smart box 103 may include a processor 132 (referred to in FIG. 1C as a central processor unit (CPU)) configured to process event report messages received from a signal receiver 142. The smart box 103 may include a signal transmitter 136 configured to transmit occurrence data in event report messages via RF signals that may be received by nearby devices, such as other learning devices or smart boxes and/or teacher signaling devices. As described above, the occurrence data within such event report messages may define or characterize an encountered condition or performed action at the smart box 103 (i.e., event report messages may characterize the events generated at the smart box 103). Further, via its signal receiver 142, the smart box 103 may receive event report messages via similar transmitted RF signals from other devices, and may save received occurrence data from received signals as events in a buffer in memory 138 using a data structure as described below. In some embodiments, the memory 138 may include an amount (e.g., 32 Kilobytes (KB), 64 KB, etc.) of storage (e.g., random access memory (RAM), flash, etc.) for storing reflexes having associated patterns as described throughout this disclosure. The embodiment smart box 103 may include a sensor encoder 134 to obtain occurrence data indicating changes in states detected by the smart box 103. For example, if the smart box 103 is connected to a floor lamp and the floor lamp is turned on, a sensor encoder 134 in the connected smart box 103 may generate occurrence data to digitally identify or map the change in state. This occurrence data may be stored in memory 138 of the smart box 103 and broadcast within event report messages for other learning devices (e.g., smart boxes) within its broadcast range. Other learning devices may receive event report messages including occurrence data through their signal receivers, and eventually process related events by various learning algorithms described herein. In some embodiments, the memory 138 may include volatile random access memory (RAM) unit(s) and non-volatile flash memory unit(s). In such embodiments, the RAM units may be used to operate the various functions of the smart box 103 and the flash units may be used to store persistent data (e.g., reflexes, etc.) and log data (e.g., obtained events, signals, etc.). In some embodiments, reflexes (as described below) may not be stored in flash memory but instead may be stored in volatile RAM in order to promote efficient and easy resetting of learned behaviors (e.g., reset to an untrained state by turning off power and erase all reflexes in RAM). In some embodiments, the flash memory may vary in size and otherwise may be optional. For example, the flash memory may be a 64 MB storage unit equal to a 64 MB RAM unit, both included within the memory 138 as represented in FIG. 1C.

Additionally, the smart box 103 may include a motor driver 140 to perform physical actions on a connected device as a learned reflex action in response to a correlated trigger. For example, if the smart box 103 is connected to a floor lamp and determines based on an event generated in response to a received event report message that the floor lamp should turn on, the processor 132 of the smart box 103 may signal the motor driver 140 to actuate a power switch on the floor lamp. Instead of (or in addition to) a motor driver 140, the smart box 103 may include a relay configured to connect an appliance to an external power supply (e.g., 120 V AC power) as a learned reflex action in response to a correlated trigger.

In some embodiments, the smart box 103 may include a battery 143 (e.g., a rechargeable lithium-ion battery, etc.) coupled to components of the smart box 103. In some embodiments, the smart box 103 may additionally include a wire or other interface 144 (e.g., plugs or prongs for connecting to an alternating current (AC) power outlet, etc.) for receiving electrical current for charging the rechargeable battery 143 or otherwise providing power to the various components of the smart box 103.

Figure 1D:
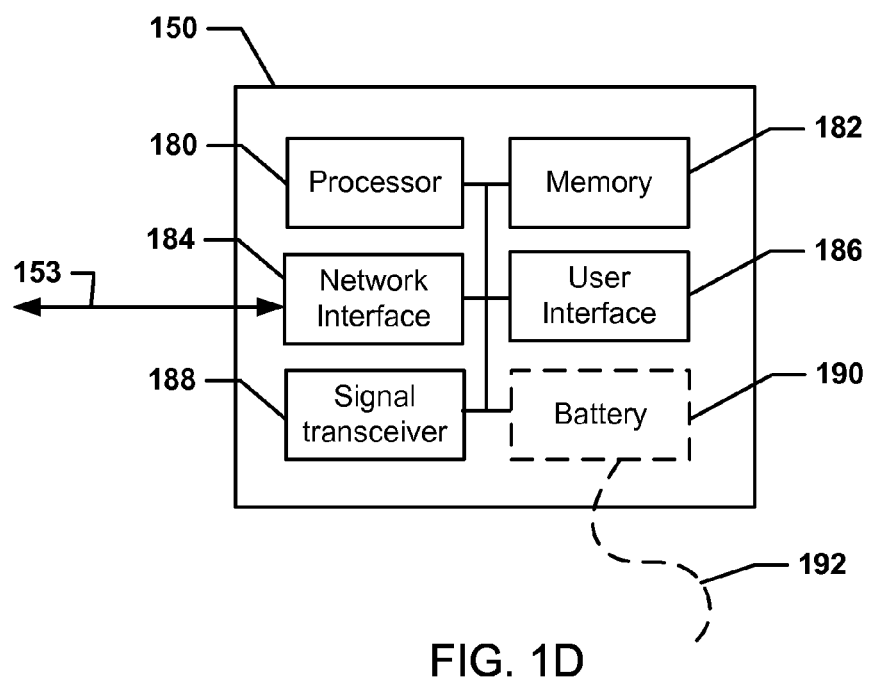
FIG. 1D is a component block diagram of a teacher signaling device suitable for use in various embodiments.

As illustrated in FIG. 1D, an embodiment teacher signaling device 150 may include a processor 180 configured to process various data, such as downloaded information from a remote server, occurrence data from received event report messages, and user inputs. The teacher signaling device 150 may include a signal transceiver 188 that is configured to exchange short-range signals, such as Bluetooth advertisement packets. For example, the teacher signaling device 150 may include a Bluetooth or WiFi radio for broadcasting data or receiving event report messages from nearby smart boxes. The teacher signaling device 150 may also include a network interface 184 for communicating with various communication networks. For example, the network interface 184 may be a wide area network transceiver, an Ethernet interface, a cellular network chip, and/or other components capable of enabling the teacher signaling device 150 to exchange messaging via Internet protocols. The teacher signaling device 150 may include a user interface component 186, such as a touch screen configured to receive user inputs, a screen capable of displaying information, and/or peripherals for users to control or change the teaching operations of the teacher signaling device 150. Further, the teacher signaling device 150 may save data (e.g., received flexes from nearby smart boxes, user input data, data downloaded from a remote server, etc.) in a buffer in memory 182. For example, the teacher signaling device 150 may store event data structures in the memory 182.

In some embodiments, the teacher signaling device 150 may include a battery 190 (e.g., a rechargeable lithium-ion battery, etc.) coupled to components of the teacher signaling device 150. In other embodiments, the teacher signaling device 150 may additionally include a wire or other interface 192 (e.g., plugs or prongs for connecting to an alternating current (AC) power outlet, etc.) for receiving electrical current for charging the rechargeable battery 190 or otherwise providing power to the various components of the teacher signaling device 150.

Figure 2:
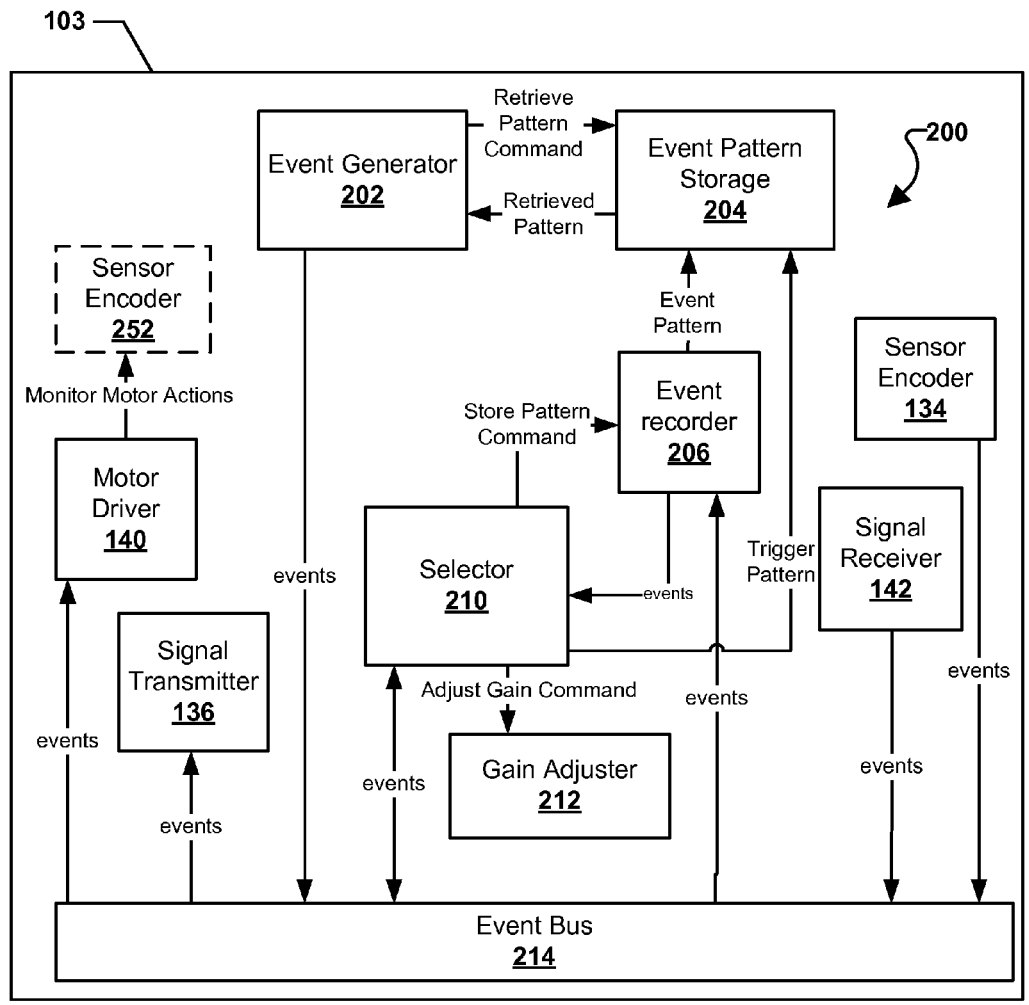
FIG. 2 is a component block diagram of a learning device suitable for use in various embodiments.

FIG. 2 illustrates an embodiment architecture 200 of a smart box 103 showing an example of how the various functional components may be coupled together or communicate in order to learn new behaviors from events and perform learned behaviors in response to subsequent events. A smart box 103 may include an event generator 202, a sensor encoder 134, and a signal receiver 142. The event generator 202 may generate an event or a sequence of one or more events in response to receiving data indicating a known event pattern (e.g., a previously learned or a preprogrammed pattern). For example, if a pattern of events is associated with a predefined action of turning on a floor lamp connected to the smart box 103, then the event generator 202 may generate a "lamp-on" event in response to matching an event generated from occurrence data received within a signal with a pattern stored in an event pattern storage 204. The generated event is then communicated via the event bus 214 to the motor driver 140 to turn on the light of the floor lamp connected to the smart box 103.

The smart box 103 may also receive occurrence data within signals (e.g., event report messages) from another smart box via a signal receiver 142. Data from signals received by the signal receiver 142 may be transported as events to other device components via the event bus 214, such as to the event recorder 206.

A smart box 103 may also recognize an event from the sensor encoder 134, which may communicate the event to other components via the event bus 214. For example, if a user manually turns on a floor lamp connected to the smart box 103, occurrence data indicating that change in state (e.g., turning the light from 'off' to 'on') may be digitally encoded by the sensor encoder 134 converting the change in state to an event.

A signal transmitter 136 may subsequently transmit occurrence data based on an event received via the event bus 214 so that the occurrence data may also be received by another smart box via event report messages. This may allow the transfer of information about events from one smart box 103 to another, allowing smart boxes to learn from each other and create complex system behaviors based upon behaviors learned by each respective smart box. The retransmission or broadcasting of data related to events (i.e., occurrence data in event report messages) may allow the smart boxes to be daisy-chained together extending the signal range of a given smart box.

The event recorder 206 may receive an event from the event bus 214 and save the event in event pattern storage 204. In some embodiments, the event recorder 206 may receive occurrence data and create an event based on the received data for storage in the event pattern storage 204. An event selector 210 may receive one or more events from the event recorder 206. In response to receiving a particular combination of events, the selector 210 may generate a store pattern command and send the store pattern command to the event recorder 206 instructing it to store the combination of events as a pattern in the event pattern storage 204. In some embodiments, the event selector 210 may receive events directly from the event bus 214.

The operations and interactions of the components with a smart box 103 are illustrated in the following example. A smart box 103 connected to a floor lamp may receive occurrence data indicating a change in state via an event report message from a wall switch, received at the smart box 103 through the signal receiver 142. The smart box 103 via the signal receiver 142 may communicate an event related to the wall switch change in state via the event bus 214 to the event recorder 206. Shortly thereafter, a user may manually turn on the light 124 of the floor lamp connected to the smart box 103, and in response the sensor encoder 134 may convert this change in state to an event and communicate the event via the event bus 214 to the event recorder 206. The event recorder 206 may send the events to the selector 210 as they are received. The selector 210 may process the pattern of events, generated based on the wall switch toggle and the floor lamp's manual on-light occurrence data, with a learning algorithm. After processing the events, the selector 210 may instruct the event recorder 206 to store the pattern of events in the event pattern storage 204 through a store pattern command. The event pattern storage 204 may store the learned association between events as a reflex with a particular weight association. In some embodiments, the event pattern storage 204 may store predetermined patterns and/or events as well, such as patterns or events used to generate correction patterns, reward patterns, trigger patterns, and action patterns.

Depending on the associations between observed events and actions, the selector 210 may work with a gain adjuster 212 to change the weight of an event (e.g., increase the trigger weight of the trigger event) associated with an observed action pattern (e.g., an observation that the user has turned on the floor lamp) and/or other properties related to the equations and/or calculations of weights (i.e., bias, scale, etc.) as described below.

Optionally, the sensor encoder 252 may provide additional events based on the commencement of an instructed action. These additional events may be a confirmation that an instructed event actually occurred (e.g., a light actually came on in response to an 'on' action being performed, etc.) and may be processed as reward events (or patterns) to help the smart box 103 learn associations between events and actions.

Figure 3A:
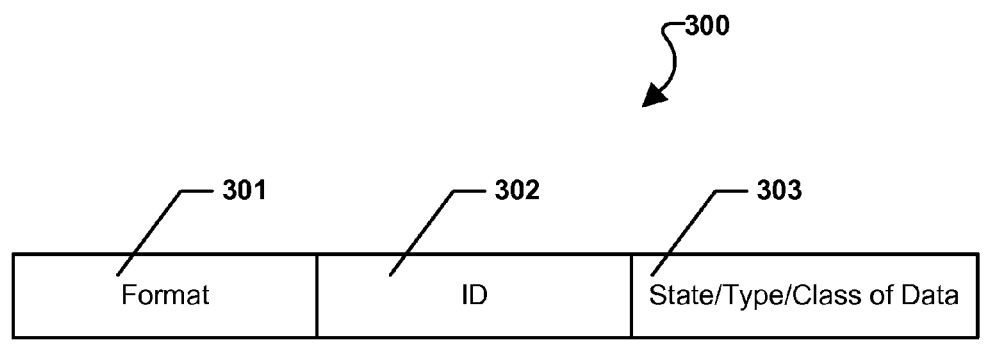
FIG. 3A is a component block diagram of an embodiment event report message structure with three components.

FIG. 3A illustrates a data structure 300 that may be used to characterize occurrence data. Occurrence data may be reflected in a data record to include a format component 301, an identification component 302, and a state component 303. The processor 132 (or CPU) of a smart box (e.g., as shown in FIG. 1C) may record decoding information as the format component 301. This may include a protocol version, an encryption type, a sequence number, a transaction identifier (e.g., information that may be used to differentiate between various occurrence data from the next without indication a direction, order, or sequence), a record time, a transmit time, etc. However, record time and transmit time may be optional fields in the format component 301. In some embodiments, transaction identifiers (or IDs) may not be contiguous in value or otherwise indicate an order numbers (e.g., increasing or decreasing in a sequence). As described above, a smart box may be configured to transmit signals (i.e., event report messages) that at least include the data structure 300, and other learning devices may be configured to receive such signals and use this format component 301 to read the rest of the occurrence data in the data structure 300. The identification component 302 may indicate a device that originated the occurrence data, and the state component 303 may correspond to the state or change in state that the occurrence data represents. In some embodiments, the state component 303 may include analog state data, such as volts (e.g., 0.02) in addition to operational states of devices (e.g., 'on', 'off', etc.).

For example, a data structure 300 for occurrence data may include a format component 301 of "V2.1", an identification component 302 of "WALLSWITCH102," and a state component 303 of "ON." This may represent a data format version of 2.1 on a smart box connected to the wall switch and may represent that the wall switch was toggled from 'off' to 'on.' Continuing this example, the occurrence data and an associated event may be generated at the wall switch (shown in FIG. 1A). Once generated, the occurrence data may be broadcast in an event report message from the smart box associated with the wall switch so that it may be received by all smart boxes within its broadcast range. A nearby smart box associated with the floor lamp may receive and process the broadcasted occurrence data. Since occurrence data may have similar data components as later described event data structure 350 (in FIG. 3B), a receiving smart box may utilize the occurrence data to generate and decode events. This may help facilitate event filtering and pattern generation.

Figure 3B:
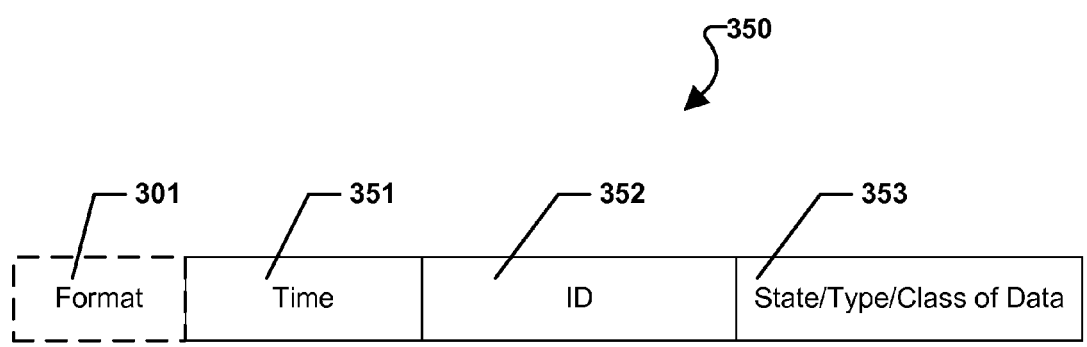
FIG. 3B is a component block diagram of an embodiment event data structure with various components.

FIG. 3B illustrates a data structure 350 that may be used to record or characterize an event. The data structure 350 may optionally include the format component 301 as described above. An event may be reflected in a data record to include a time component 351, an identification component 352, and a state component 353. Event data structures 350 are similar to the data structure 300 as described above in FIG. 3A with regards to occurrence data, and events may be generated at the same time as the occurrence data. The data structure 300 (i.e., occurrence data) may be used by smart boxes to generate the data structure 350 (i.e., events) and vice versa. When a smart box receives occurrence data for an event through any event-originating source (e.g., a signal receiver 142) it may store data characterizing the event in the event recorder 206, which may record the time component 351 associated with the event. The time component 351 may be the time that the event was created or observed by the receiving smart box. Alternatively, the time component 351 may indicate a time assigned by an originating smart box prior to transmitting the occurrence data of the event (i.e., the time an action was performed or a condition was observed, etc.). The identification component 352 may indicate a device that originated the occurrence data of the event, and the state component 353 may correspond to the state or change in state that the event represents.

For example, an event may include a time component 351 of 17:12:02, an identification component 352 of "WALLSWITCH102," and a state component of "ON." This may represent an event created at 17:12:02 on the smart box connected to the wall switch and may represent that the wall switch was toggled from 'off' to 'on.' Continuing this illustration, occurrence data describing such an event may be broadcast in an event report message from the smart box associated with the wall switch to any smart box within its broadcast range. The smart box associated with the floor lamp may receive the broadcasted event report message and process the included occurrence data to generate an event for processing with a learning algorithm as described below.

An event pattern may include one or more events obtained, generated, or otherwise encountered in a time window or sequence. For example, a particular event pattern may include a first event generated internally by a learning device (e.g., a smart floor lamp, etc.) and a second event obtained by the learning device in response to receiving a signal received from another device (e.g., a smart wall switch, etc.). As later described, event patterns may be trigger patterns, action patterns, correction patterns, or reward patterns. Regardless of which type, event patterns may be order-dependent, such that the order in which particular events are received constitutes a pattern. Alternatively, event patterns may be order-independent where the pattern is independent of the processing order for the events. For example, a first event (referred to as event A) may be obtained (e.g., generated based on received occurrence data) at time 0 and second and third events (referred to as event B and event C respectively) may be obtained simultaneously at a later time 1 (denoted as A:0, B:1, C:1). In an order-dependent pattern, the learning device may only recognize the pattern if event A is obtained first and events B and C are simultaneously obtained after event A (denoted as A:0, B:1, C:1). However, if event C is obtained at time 2 instead of time 1, then the pattern (A:0, B:1, C:2) may not equal the pattern A:0, B:1, C:1 because the event C was obtained at time 2 instead of time 1. Thus, the first pattern created by obtaining event C at time 1 (A:0, B:1, C:1) and the second pattern created by obtaining event C at time 2 (A:0, B:1, C:2) are different because the times for obtaining event C are different. In an order-independent pattern, the learning device may treat obtained events A:0, B:1, C:1 the same as obtained events A:0, B:1, C:2 because the time of C is not important so long as event C is obtained within the same predetermined time window as event A and event B. In other words, for order-independence, the same events merely need to be obtained within a particular time window. Time windows observed by smart boxes or learning devices are further described below with reference to FIGS. 3C-3H.

In some embodiments, multiple smart boxes or learning devices may generate patterns (e.g., trigger patterns and action patterns) and conduct actions based on a single event. For example a user may toggle the wall switch from 'off' to 'on' causing the wall switch to generate a single first event. Upon generating the first event, the wall switch may broadcast a related event report message wirelessly to all nearby learning devices. A first nearby learning device may be the floor lamp, for example, which may generate the first event based on the received event report message and convert it to a trigger pattern. In response to the trigger pattern, the floor lamp may generate an action pattern and activate the light based on the action pattern. Simultaneously, a nearby stereo may receive the same event report message and similarly generate the first event based on the received event report message, convert it to a trigger pattern, generate a different associated action pattern than the floor lamp, and play music based the different action pattern. Thus, a single broadcasted event report message related to the first event in this example caused the floor lamp to activate its light and the stereo to play music.

In some embodiments, multiple smart boxes may generate action patterns and conduct corresponding actions based on receiving multiple event report messages related to multiple individual events. For example, a user may toggle the wall switch from FIG. 1A from 'off' to 'on' which generates the first event at the wall switch. The user may also toggle a lamp switch on the smart floor lamp from off to 'on' which causes the smart floor lamp to generate a second event at the smart floor lamp. Event report messages related to the first and second events (i.e., including occurrence data for the first and second events respectively) may be broadcast from their respective smart boxes within a 5-10 second time window. Still within the time window, a nearby smart stereo and a smart desk lamp may receive both event report messages related to the first and second events. The smart stereo may generate a trigger pattern and a corresponding action pattern based on receiving the event report messages related to the first and second events. The action pattern generation may cause the stereo to turn on and begin playing music, for example. Simultaneously, the smart desk lamp generates a trigger pattern and a different action pattern based on receiving the event report messages related to the same two events. Upon generating the action pattern, the smart desk lamp may turn on its light, for example.

FIGS. 3C-3H illustrate how various embodiment learning devices may use time window 362 that rolls over time to identify and/or correlate patterns of events. As described above, such a time window 362 may be a predetermined amount of time, such as a number of seconds (e.g., 5-10 seconds), that may provide a temporal limit on the events that may be eligible for being identified as patterns or parts of patterns at any given time. In other words, events occurring or obtained by the smart box within the time window 362 (e.g., events having a time component 351 as described above in FIG. 3B that falls within the time window 362), may be combined to generate patterns for use in triggering actions and/or adjusting trigger weights for reflexes as described below. In some embodiments, the smart box may be configured to remove obtained events from a memory, buffer, or other storage when such obtained events no longer fall within the predefined time window 362.

Figure 3C:
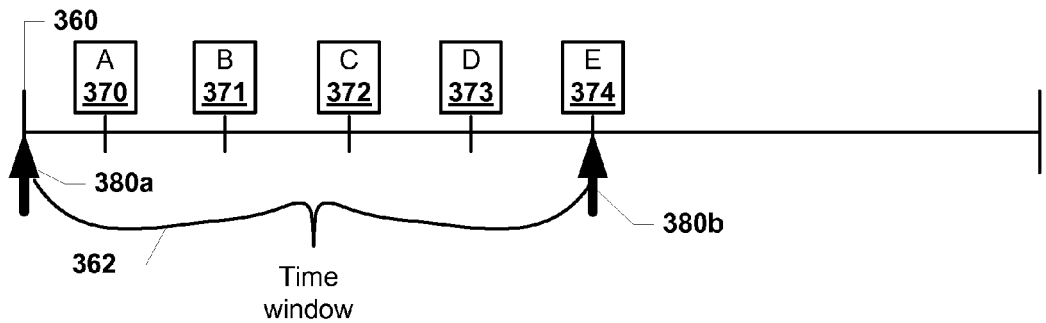
FIGS. 3C-3H are diagrams of exemplary time windows that may be utilized by a smart box (or learning device) to identify and/or correlate patterns of events suitable for use in various embodiments.

FIG. 3C shows the exemplary time window 362 against a timeline 360. Obtained or observed events 370-374 (referred to as events A-E in FIGS. 3C-3F) may have been encountered by the smart box within the time window 362 with reference to a first time 380*a* and a second time 380*b*. The length of the time window 362 may be the length of time between the first time 380*a* and the second time 380*b*. Thus, at the second time 380*b*, the smart box may use any of the obtained events 370-374 in any combination or order to generate patterns that may be matched to predefined patterns within stored reflexes. For example, the smart box may generate patterns using any combination and/or order of the events A-E, such as "A,B,C,D,E", "A,B,C,D," "A,B,C," "A,B" "A", "A,B,C,D,E", "A, C, E", "E,C,A", "A, E, C", etc.

Figure 3D:
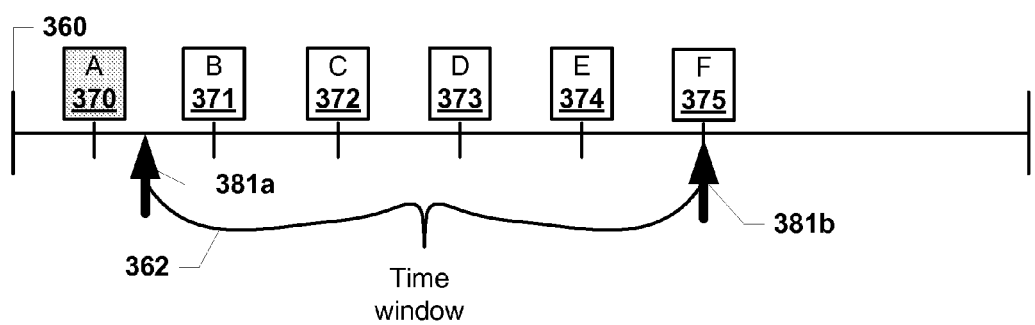

FIG. 3D illustrates the events 371-375 (referred to as events B-F in FIG. 3D) that are obtained in the time window 362 between a third time 381*a* and a fourth time 381*b*. For example, at the fourth time 381*b*, event 'A' 370 may no longer be within the time window 362 (i.e., event 'A' 370 may correspond to a time earlier than the third time 381*a*); however, any combination of the events B-F 371-375 may be combined to generate patterns that may match predefined information within reflexes stored on the smart box. In some embodiments, the event 'A' 370 may be deleted or otherwise removed from a memory, buffer, or other storage at the fourth time 381*b*.

Figure 3E:
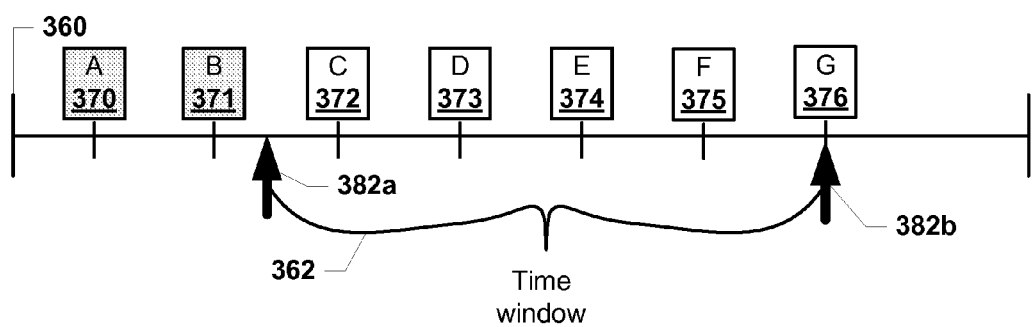

Similarly, FIG. 3E illustrates the events 372-376 (referred to as events C-G in FIG. 3E) that may be obtained by the smart box within the time window 362 between a fifth time 382*a* and a sixth time 382*b*. For example, at the sixth time 382*b*, event 'A' 370 and event 'B' 371 may no longer be within the time window 362; however, any combination of the events C-G 372-376 may be combined to generate patterns that may match predefined information within reflexes stored on the smart box. In some embodiments, the event 'B' 371 may be deleted or otherwise removed from a memory, buffer, or other storage at the sixth time 382 (i.e., when it falls outside the time window 362). The smart box may continue rolling (or progressing) the time window 362 in a similar fashion, continually evaluating events that fall within the time window 362 to determine whether they correspond to predefined patterns.

Figure 3F:
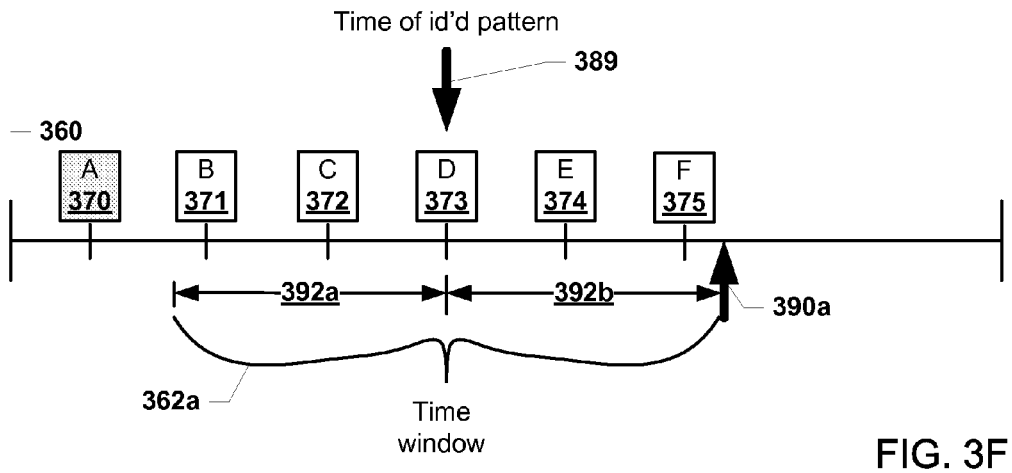
Figure 3G:
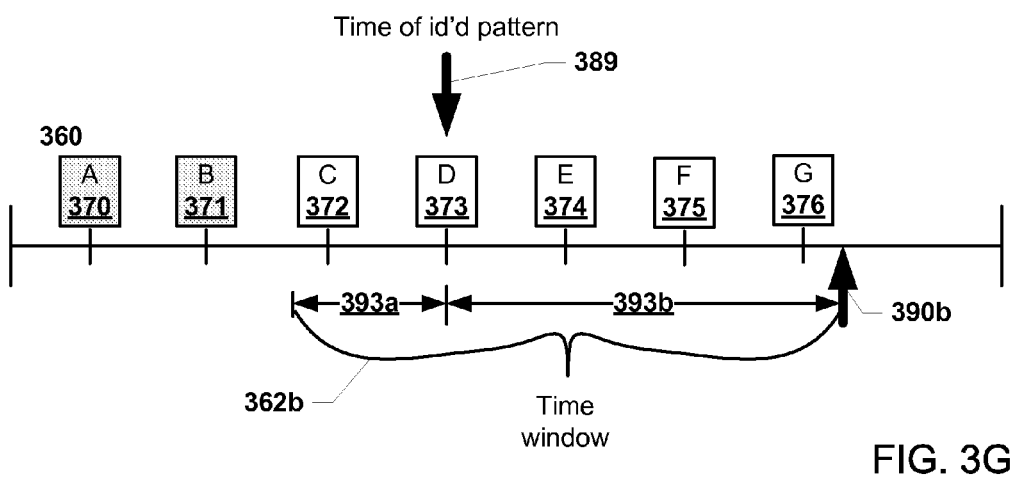
Figure 3H:
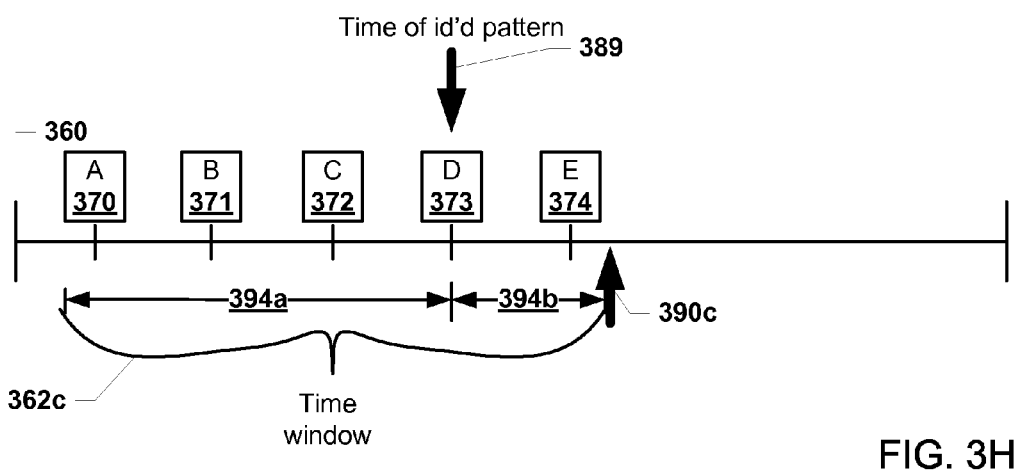

FIGS. 3F-3H illustrate various other exemplary time windows in relation to an identified pattern. As described herein, a smart box (or learning device) may correlate events, such as a floor lamp 'on' event or a wall switch 'on' event, to identified triggers or other patterns occurring within such predefined time windows. For example, in response to detecting the occurrence of a trigger pattern of a certain reflex (e.g., an obtained wall switch 'on' event), the smart box may determine whether a related reward pattern or correction pattern of the reflex also occurred within a time window of 5-10 seconds from the trigger pattern. The smart box may evaluate obtained events that are obtained before and/or after the identified pattern (e.g., trigger pattern) to determine whether a related pattern has also been encountered.

FIGS. 3F-3H illustrate various time windows 362*a*-362*c* relative to an identified pattern comprised of event 'D' 373 and a time 389 associated with the identified pattern (referred to as "Time of id'd pattern" in FIGS. 3F-3H). FIG. 3F illustrates a first time window 362*a* that is configured to include a first period 392*a* occurring before the time 389 associated with the identified pattern (i.e., event 'D' 373) and that is equal to a second period 392*b* occurring after the time 389 associated with the identified pattern. The smart box may be configured to obtain and buffer (or otherwise store) events that may be correlated to the identified pattern until a first end time 390*a* that occurs after the second period 392*b* has elapsed from the time 389 associated with the identified pattern. With the first period 392*a* and the second period 392*b* being of the same duration, an equal number of events may potentially be obtained within the periods 392*a*, 392*b* occurring before and after the time 389 associated with the identified pattern. In other words, with the first time window 362*a*, the smart box may be capable of correlating any or all of an event 'B' 371, an event 'C' 372, an event 'E' 374, and an event 'F' 375 with the identified pattern of event 'D' 373. As another example, the smart box may correlate the identified pattern of event 'D' 373 with a reward pattern that includes event 'B' 371 and event 'F' 375, etc.

FIG. 3G illustrates a second time window 362*b* that is configured to include a third period 393*a* occurring before the time 389 associated with the identified pattern (i.e., event 'D' 373) that is shorter (or smaller in time) than a fourth period 393*b* occurring after the time 389 associated with the identified pattern. The smart box may be configured to obtain and buffer (or otherwise store) events that may be correlated to the identified pattern until a second end time 390*b* that occurs after the fourth period 393*b* has elapsed from the time 389 associated with the identified pattern. Therefore, a greater number of events may potentially be obtained within the fourth period 393*b* occurring after the identified pattern. In other words, with the second time window 362*b*, the smart box may be capable of correlating any or all of the event 'C' 372, the event 'E' 374, the event 'F' 375, and an event 'G' 376 with the identified pattern of event 'D' 373. For example, the smart box may correlate the identified pattern of event 'D' 373 with a correction pattern that includes event 'C' 372, event 'E' 374, and event 'G' 376, etc.

FIG. 3H illustrates a third time window 362*c* that is configured to include a fifth period 394*a* occurring before the time 389 associated with the identified pattern (i.e., event 'D' 373) that is longer (or greater in time) than a sixth period 394*b* occurring after the time 389 associated with the identified pattern. The smart box may be configured to obtain and buffer (or otherwise store) events that may be correlated to the identified pattern until a third end time 390*c* that occurs after the sixth period 394*b* has elapsed from the time 389 associated with the identified pattern. Therefore, a greater number of events may potentially be obtained and buffered within the fifth period 394*a* occurring before the identified pattern. In other words, with the third time window 362*c*, the smart box may be capable of correlating any or all of the event 'A' 370, event 'B' 371, the event 'C' 372, and the event 'E' 374 with the identified pattern of event 'D' 373. For example, the smart box may correlate the identified pattern of event 'D' 373 with a correction pattern that includes the event 'C' 372 and the event 'E' 374, etc.

Figure 4:
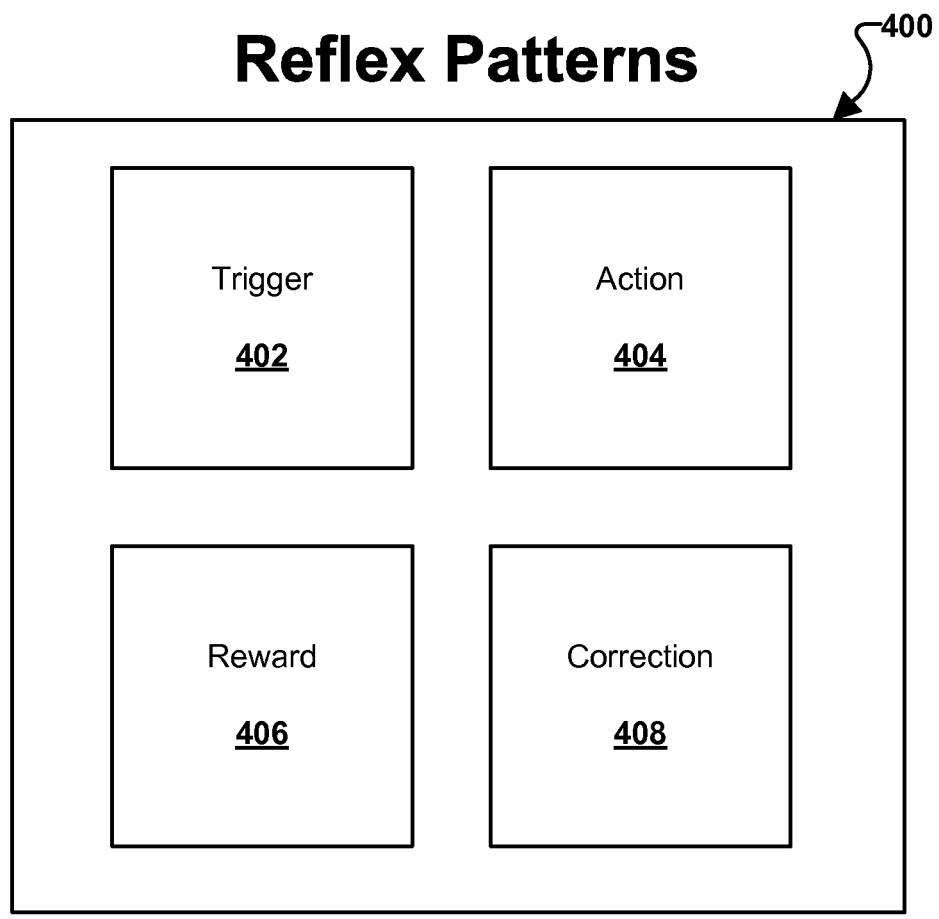
FIG. 4 is a component block diagram of an embodiment reflex that consists of four patterns suitable for use in various embodiments.

As described above, a reflex may be stored information that indicates a predefined action that a smart box may take or initiate in response to detecting an associated trigger. As illustrated in FIG. 4, four patterns may make up a reflex 400, specifically a trigger pattern 402, an action pattern 404, a reward pattern 406, and a correction pattern 408. Patterns may include one or more events and events may be associated with data. However, in some embodiments, a pattern may be related to a 1-bit signal (e.g., an interrupt line goes high). For example, a 1-bit signal may be a reward signal that may be converted to a reward pattern and put on a logical event bus of a smart box. Such a 1-bit signal reward pattern may take the sensor encoder path, as described above, as an interrupt sensor may be a type of sensor encoder. Other pattern types (e.g., action, trigger, etc.) may also be defined by simple signals (e.g., 1-bit signals or interrupts).

When a smart box obtains an event (or multiple events) matching a known trigger pattern of a known reflex, the smart box may generate the corresponding action pattern 404. A reflex may have a predetermined reward pattern and a predetermined correction pattern. If a smart box receives a reward pattern when it is allowed to learn, the smart box may increase a weighting (i.e., the trigger weight) on the association between the trigger pattern 402 and the action pattern 404. Once the association weighting exceeds a threshold amount, the smart box will may execute the action pattern in response to the trigger pattern. Similarly, a reflex 400 may have a predetermined correction pattern 408, and if a smart box receives a correction pattern when it is allowed to learn, the smart box may decrease the association weighting between the trigger pattern 402 and the action pattern 404. Processing of the correction pattern 408 may modify the association weighting enough times that the association weighting may drop below the threshold amount and the smart box will effectively learn not to perform the action pattern 404 in response to the trigger pattern 402. In this manner, the smart box may learn the association between a trigger pattern 402 and a corresponding action pattern 404, and unlearn undesired trigger/action associations. In various embodiments, the correction pattern 408 and/or the reward pattern 406 may be obtained based on data received by the smart box from another smart box device, such as a nearby device emitting event report messages in response to performing an action, receiving an input, etc.

In some embodiments, a method of enabling an "allowed to learn" state (or a learning mode) for the smart box may be used to associate a predefined action pattern 404 of a reflex 400 of the smart box with a trigger pattern. Such a learning mode may be an operational state of the smart box during which the smart box may be enabled to change trigger weights of the reflex 400. Once an obtained pattern is matched to a trigger pattern 402 of a known reflex 400, the reflex may enter the learning mode. In other embodiments, the smart box may enter the learning mode when the action pattern 404 is generated. In other embodiments, the smart box may enter a global learning mode or state, which may be independent of triggers (e.g., turning on a learning switch) and during which the smart box may change trigger weights for various reflexes or otherwise generate new reflexes based on obtained events. In various embodiments, a reflex 400 may include data indicating the status of its various modes, such as bits, flags, or other indicators indicating whether the reflex 400 is in an active monitoring mode, triggered mode, learning mode, etc.

A smart box may be configured with one or more reflexes with action patterns for predetermined, known capabilities of the smart box. Although the smart box may utilize multiple reflexes with different corresponding actions, in some embodiments, the smart box may not be configured to perform actions outside of the static set of known capabilities or actions of the smart box, such as action patterns indicated in data provided by a manufacturer. Thus, the smart box may be configured to generate new reflexes with unknown triggers correlated to known actions, but may not be configured to generate new reflexes with actions that are not predefined.

As an illustration, a stereo learning device (or a stereo coupled to a learning device or smart box) may be configured with predetermined actions for setting a volume level to any value in a finite range of volume level values (e.g., 0-10, etc.), activating a radio (or radio tuner) 'on', deactivating the radio (or radio tuner), setting a radio station to any value in a finite range of radio station values (e.g., 88.1-121.9, etc.), setting a frequency modulation (FM) configuration or an amplitude modulation (AM) configuration, etc. The stereo learning device may store reflexes for each of these predetermined actions with various trigger patterns. For example, the stereo learning device may store a first reflex with an action pattern that sets the radio station to a first value (e.g., 92.3 FM) and a trigger pattern of a lamp 'on' event, a second reflex with an action pattern that sets the radio station to a second value (e.g., 101.5 FM) and a trigger pattern of a wall switch 'on' event, a third reflex with an action pattern that sets the volume level to 8 and a trigger pattern of the lamp 'on' event, etc.

Patterns may be created from one or more events (e.g., time component, device component, etc.) obtained at a smart box, such as events generated based on occurrence data obtained by a sensor (e.g. a light sensor, a switch vision sensor, etc.) and/or one or more events generated based on occurrence data received by the signal receiver 142. Events may be stored in memory 138 and used by the event recorder 206 to create or recognize patterns. Prior to evaluating events to create or recognize patterns, a filter may be applied to events to reduce the set of events that may be considered. For example, a floor lamp smart box may ignore events related to event report messages from a stereo. As an alternate example, the stereo may ignore events obtained or generated after some time of day, such as 11:00 PM. Once a smart box generates a pattern of events, it may determine whether the pattern matches any known trigger patterns that correspond to a stored reflex.

If an identified pattern matches a stored trigger pattern in a reflex and the related trigger weight is equal to or above a particular threshold, its paired action pattern may be generated. A current trigger weight ($W^i$) for a certain reflex (Reflex$^i$) may be calculated based on the following equation:

$$W^i = (\Sigma_{k=0}^{n} m^{k,i} x^{k,i} s^{k,i}) + b^i;$$

where i is a reflex counter or identifier, n is the number of events associated with a trigger pattern of the reflex, k identifies a counter for individual events in the trigger pattern of the reflex, m is an event match indicator for an individual event in the trigger pattern of the reflex, x is a match weight associated with the individual event in the trigger pattern of the reflex, s is a scale factor applied to the individual event in the trigger pattern of the reflex, and b is a bias for an entire weight match applied to the individual event in the trigger pattern of the reflex. Thus, the current trigger weight, $W^i$, of a Reflex$^i$ equals the sum of the event match (m) multiplied by the match weight (x) and the scale factor (s) plus the bias b in the trigger pattern associated with Reflex$^i$. In some embodiments, match weights (x) may be adjusted by gains associated with their respective events, and as described in this disclosure, gains may be set based on whether a learning device is within a critical period or steady state period. In some embodiments, smart boxes may normalize values from 0.0 to 1.0. Further, in some embodiments, the event match indicator for an event (m) may be a floating value between 0.0 and 1.0 that may indicate whether the event was matched perfectly or not. (i.e., an event match value of 1.0 may represent a perfect match and an event match of 0.0 may indicate a complete mismatch).

As an illustration, if an identified pattern of a single event matches a known trigger pattern for a certain reflex (Reflex$^i$), then the event match indicator (m) for the single event may be set to 1. Assuming the match weight (x) for the single event is set to 1 based on an associated gain value, the scale factor (s) is also set to 1, and the bias (b) for Reflex$^i$ is set to 0, then the new or current trigger weight $W^i$ for the Reflex$^i$ may be equal to 1. If the same pattern is received again, then the match weight (x) may be adjusted by the current gain associated with the reflex, resulting in an increase in a subsequent, new trigger weight ($W^i$) that may be greater than the trigger weight threshold. Thus, the new trigger weight ($W^i$) may increase or decrease. For example, receiving the same trigger pattern a second time may increase the trigger weight ($W^i$) to 1.5 assuming that $m^{k,i}$ is set to 1, $x^{k,i}$ is adjusted to 1.5, $s^{k,i}$ is set to 1, and $b^i$ is set to 0. Under the same conditions, if the identified pattern does not match a known trigger pattern, then m may be equal to 0 resulting in a new trigger weight $W^i$ also equal to 0.

As an additional illustration, a stereo (e.g., stereo 106 as described above in FIG. 1A) may include or be coupled to a smart box capable of storing and utilizing various reflexes. In particular, the stereo (via its smart box) may store a first reflex ($R^i$) that has a trigger pattern including a first event related to an 'on' signal from a nearby ceiling light and a second event related to a signal from a presence sensor (e.g., pressure sensor, motion sensor, etc.) in a nearby recliner. For example, the first event may correspond to a signal transmitted by the ceiling light (or a smart box coupled to the ceiling light) when activated and the second event may correspond to a signal transmitted by the recliner (or a smart box coupled to the recliner) when a person sits in the recliner. The first reflex may also include an action pattern that may cause the stereo to turn on in response to the stereo detecting the occurrence of the trigger pattern (i.e., both the ceiling light and the recliner events). In other words, based on the first reflex, the stereo may activate its radio and play music in response to the ceiling light being turned on and someone sitting in the recliner within a predefined time window (e.g., 5-10 seconds, etc.).

The following tables illustrate exemplary properties of the equation with respect to the first reflex of the stereo (i.e., $R^i$). For the purpose of the following examples and tables, the action pattern (i.e., turning the stereo on and playing music) of the first reflex may be triggered when the trigger weight of the first reflex (i.e., $W^i$) is greater than or equal to a trigger threshold value of 1.5, a condition that may occur in response to the stereo receiving at least one of the first event and the second event. The first event may be event k=0 and the second event may be k=1. Further, except for the match indicator for various events ($m^{n,i}$), it should be appreciated that the various values in the following properties may be predefined, such as set by a manufacturer, developer, or user. For example, the match weight for an event may be set by a manufacturer or may be based on previous events encountered at a smart box.

TABLE A

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1 | 0 | 1.0 | 1.0 | 1.0 | 0.0 | 1.0 | 1.0 | 0.0 |

As shown in the exemplary properties of Table A above, in one scenario, only the first event (i.e., k=0) may be received by the stereo. Thus, the smart box of the stereo may set the event match indicator for the first event (m0,i) to 1.0 (i.e., there is a match for the first event) and the event match indicator for the second event (m1,i) to 0.0 (i.e., there is no match for the second event). The trigger weight of the first reflex may be computed by summing the sub-weight calculation for each event, such that the sub-weight of the first event computes to 1.0. In other words, (m0,i*x0,i*s0,i)+bi=(1.0*1.0*1.0)+0.0=1.0. As there is no second event, the event match indicator for the second event (m1,i) may be 0.0, and thus the sub-weight calculation for the second event may be 0.0. In other words, (m1,i*x1,i*s1,i)+bi=(0.0*1.0*1.0)+0.0=0.0. Accordingly, the total trigger weight of the first reflex (Wi) is 1.0 (i.e., 1.0+0.0), which is less than the trigger threshold value of 1.5. Thus, with only the first event received, the action pattern of the first reflex may not be triggered (e.g., the stereo may not activate its radio).

TABLE B

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.8 | 0,1 | 1.0 | 1.0 | 1.0 | 0.8 | 1.0 | 1.0 | 0.0 |

As shown in the exemplary properties of Table B above, in another scenario, both the first event (i.e., k=0) and the second event (i.e., k=1) may be received by the stereo. Thus, the smart box may set the event match indicator for the first event ($m^{0,i}$) to 1.0 (i.e., there is a match for the first event), and the event match indicator for the second event ($m^{1,i}$) to a non-zero value. However, in some cases, the second event may not be matched exactly, and thus the match indicator for the second event ($m^{1,i}$) may be set to 0.8 (i.e., there is at least a partial match for the second event). The value of 0.8 for the event match indicator for the second event ($m^{1,i}$) may indicate that the second event match was an imperfect match for a system that normalizes values from 0.0 to 1.0; where 1.0 represents a perfect match for the event match value.

As described above, the trigger weight ($W^i$) may be computed by summing the sub-weight calculation for each event, such that the sub-weight of the first event computes to 1.0. In other words, $(m^{0,i}*x^{0,i}*s^{0,i})+b^i=(1.0*1.0*1.0)+0.0=1.0$. Further, the sub-weight of the second event computes to 0.8. In other words, $(m^{1,i}*x^{1,i}*s^{1,i})+b^i=(0.8*1.0*1.0)+0.0=0.8$. Accordingly, the total trigger weight of the first reflex ($W^i$) may be 1.8 (i.e., 1.0+0.8), which is greater than the trigger threshold value of 1.5. Thus, with both the first event and the second event obtained at the smart box, the action pattern of the first reflex may be generated, causing an action to be performed (e.g., the stereo may activate its radio and play music, etc.). In some embodiments, the action pattern of the first reflex may be generated and cause an action to be performed in response to the calculation of any total trigger weight of the first reflex ($W^i$) that is greater than or equal to the trigger threshold value (e.g., 1.5).

TABLE C

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.6 | 1 | 0.0 | 1.0 | 1.0 | 0.8 | 2.0 | 1.0 | 0.0 |

In some embodiments, based on the match weights for various events, the smart box may be configured to perform actions in response to obtaining a single event. For example, the stereo smart box may be configured to activate its radio functionality in response to only receiving a signal indicating someone has sat in the recliner (i.e., the action pattern may be triggered by a presence sensor event associated with the recliner). As shown in the exemplary properties in Table C above, the first event may not be obtained (i.e., m0,i=0.0), the second event may be obtained (i.e., m1,i=0.8), and the match weight for the second event (x1,i) may be set to a value of 2.0. Due to the higher match weight for the second event, the radio of the stereo may be activated when only the second event is obtained at the stereo. In other words, the trigger weight for the first reflex may be greater than 1.5 based only on obtaining the second event (i.e., ((m0,i*x0,i*s0,i)+(m1,i*x1,i*s1,i))+bi=((0.0*1.0*1.0)+(0.8*2.0*1.0))+0.0=1.6.

TABLE D

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 2.6 | 0.1 | 0.7 | 1.0 | 2.0 | 0.6 | 1.0 | 2.0 | 0.0 |

In some embodiments, when imperfect event matching is likely, such as in a noisy RF environment, scale factors may be adjusted such that reflexes may be triggered even when matching may be low. For example, as shown in Table D above, the scale factor for the first event (s0,i) and the scale factor for the second event (s1,i) may be increased to a value of 2.0 in order to enable trigger weights above the 1.5 threshold value, even when matching indicators are less than ideal (e.g., less than 1.0, less than 0.8, etc.). In other words, the stereo may activate its radio to play music in response to receiving both the first event and the second event with less than ideal matching indicators (e.g., 0.7 and 0.6, respectively) and calculating a trigger weight of 2.6 for the first reflex (i.e., ((m0,i*x0,i*s0,i)+(m1,i*x1,i*s1,i))+bi=((0.7*1.0*2.0)+(0.6*1.0*2.0))+0.0=2.6.

TABLE E

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.8 | 1 | 0.0 | 1.0 | 1.0 | 0.8 | 1.0 | 1.0 | 1.0 |
| 1.9 | 0 | 0.9 | 1.0 | 1.0 | 0.0 | 1.0 | 1.0 | 1.0 |

In some embodiments, bias values for trigger weight calculations may be adjusted in order to cause action patterns to be triggered in response to a smart box obtaining a single event. For example, as shown in Table E above, the bias ($b^i$) may be set to 1.0, which allows either the first event or the second event to individually cause the stereo to activate its radio via the first reflex. In other words, the action pattern may be triggered when only the second event is obtained (i.e., $((m^{0,i}*x^{0,i}*s^{0,i})+(m^{1,i}*x^{1,i}*s^{1,i}))+b^i=((0.0*1.0*1.0)+(0.8*1.0*1.0))+1.0=1.8$) or when only the first event is obtained (i.e. $((m^{0,i}*x^{0,i}*s^{0,i})+(m^{1,i}*x^{1,i}*s^{1,i}))+b^i=((0.9*1.0*1.0)+(0.0*1.0*1.0))+1.0=1.9$).

Figure 5:
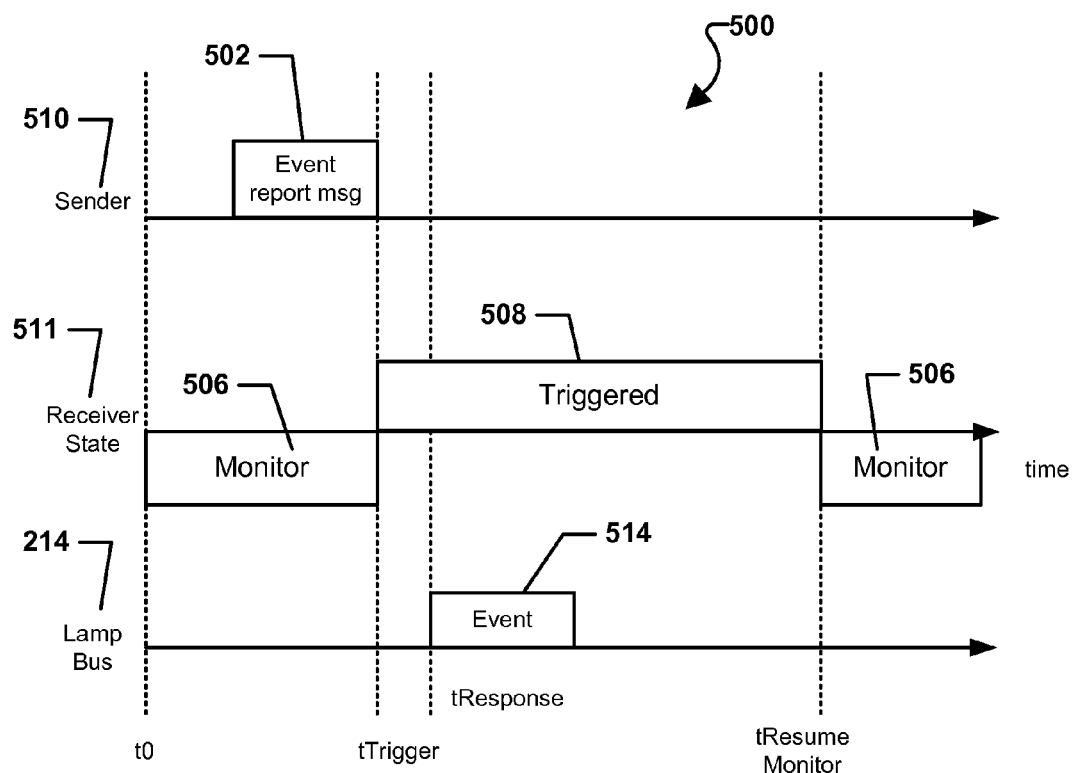
FIG. 5 is an exemplary timeline diagram of a reflex system changing states in response to generating events suitable for use in various embodiments.
Figure 6:
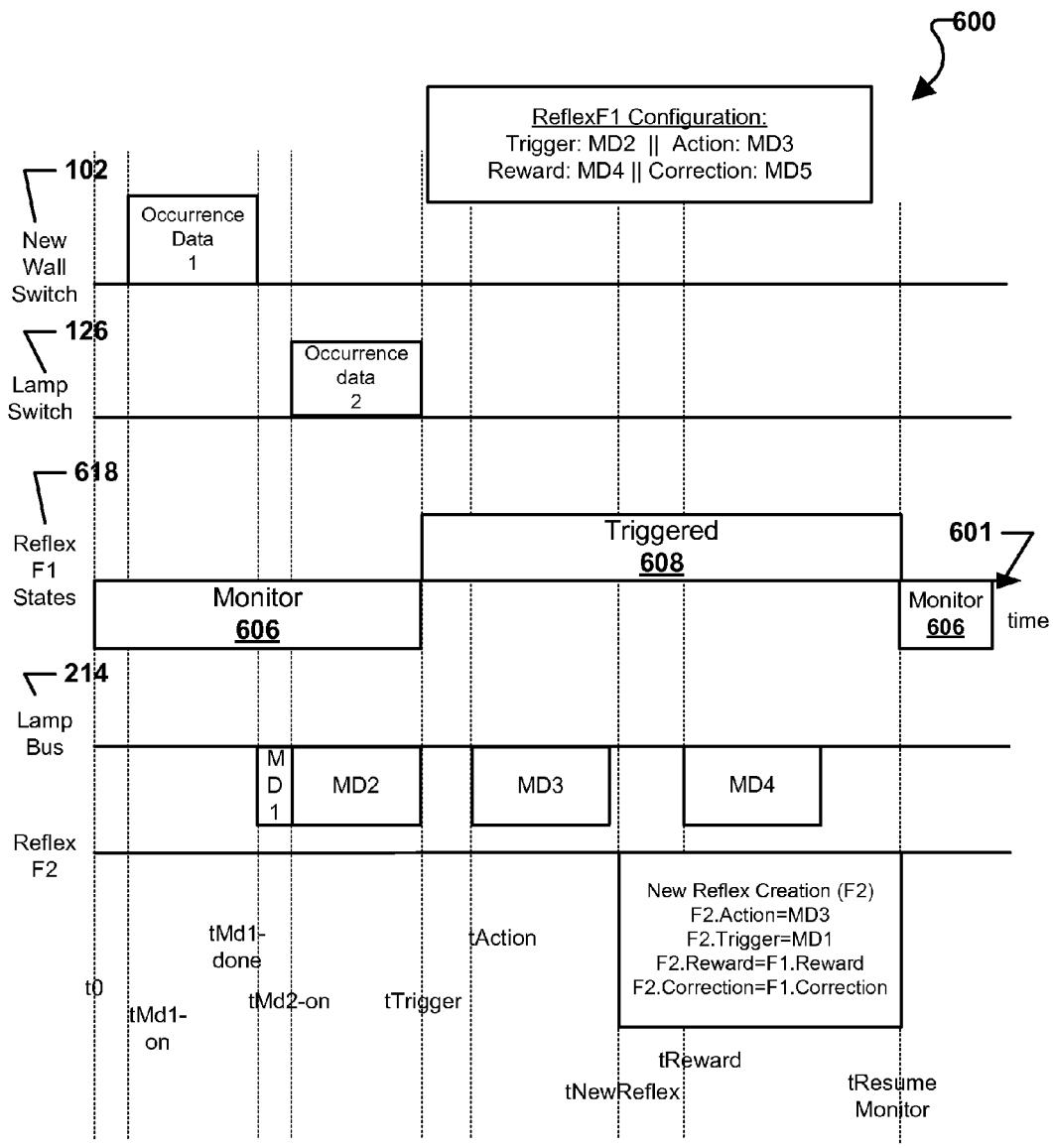
FIG. 6 is an exemplary timeline diagram illustrating the creation of a new reflex based on an existing reflex suitable for use in various embodiments.
Figure 7:
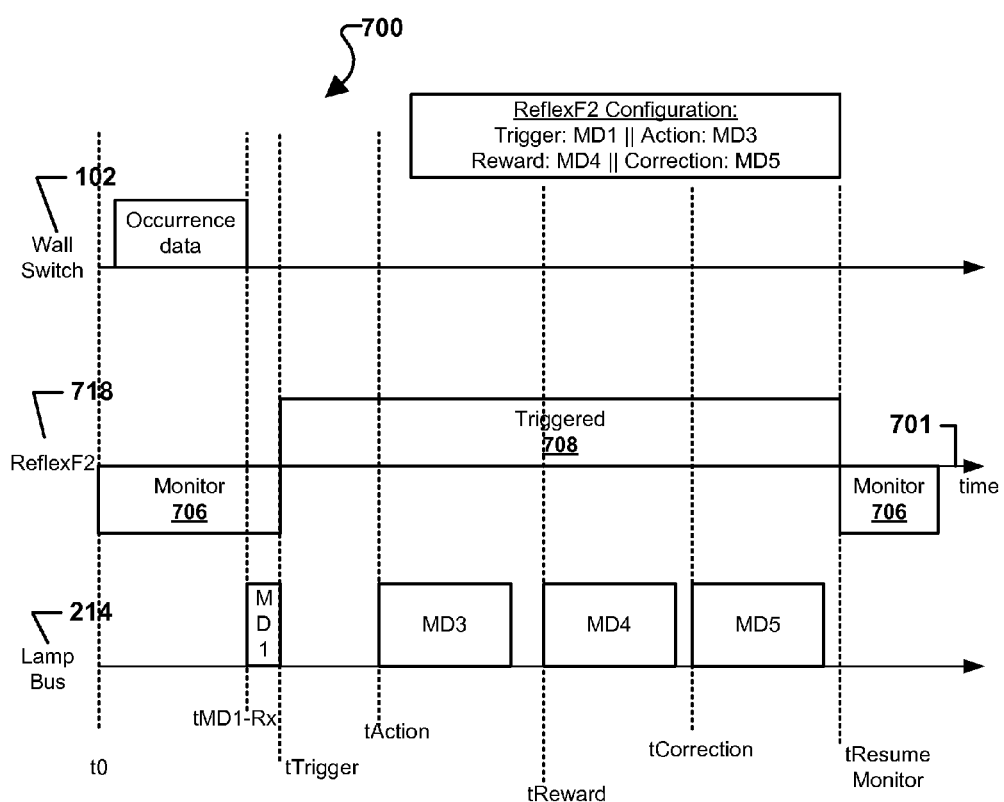
FIG. 7 is an exemplary timeline diagram illustrating the training of a newly created reflex suitable for use in various embodiments.

FIGS. 5-7 are timeline diagrams illustrating how events (including actions) may be recognized (or identified) as patterns in reflexes. In the descriptions of these timelines, references are made to a wall switch and a floor lamp as a short hand for the smart boxes associated with those devices. Further, the wall switch and the floor lamp are used as illustrative examples of the types of devices that may be coupled to a smart box. Thus, the references to the wall switch and floor lamp are not intended to limit the scope of the claims in any manner.

FIG. 5 is a timeline diagram 500 of event transmissions that correspond to a reflex that shows times of transmissions between a sender 510 (e.g., wall switch) and a receiver (e.g., lamp). These event transmissions (or event report messages) may include occurrence data that may help the receiver generate an event. The timeline diagram begins at time 0 (or t="t0" as shown in FIG. 5) with the receiver in a monitor mode 506, and ends when the receiver returns to the monitor mode 506 at time "tResumeMonitor" (or t="tResumeMonitor"). In some embodiments, the sender 510 in diagram 500 may be a wall switch broadcasting occurrence data of an event, which may be received by the floor lamp. The floor lamp may have a receiver state 511 associated with each stored reflex, which may be in either a monitor mode 506 or a triggered mode 508. The default state of each reflex associated with the floor lamp may be the monitor mode 506. The floor lamp may also have an event bus 214 (typically in its smart box), which may transfer events to other smart box components.

For the purposes of illustration, at time t=t0, the floor lamp may be considered to be in the monitor mode 506 with respect to all reflexes. The floor lamp may receive an event report message 502, such as via its signal receiver 142. For example, a user may toggle the wall switch from 'off' to 'on'. In response, the wall switch may record the toggle as an event with a sensor encoder 134 (shown in FIG. 2). The wall switch may transmit an event report message 502 having occurrence data related to the new event through the wall switch's signal transmitter 136. The event report message 502 may be received by other smart boxes, such as the floor lamp.

At t=tTrigger, the event report message 502 may be received by the floor lamp. The floor lamp may determine that an event generated based on the event report message 502 matches a trigger pattern of a reflex, and may enter the triggered mode 508 with respect to the matched reflex. During the triggered mode 508, the floor lamp may continue to search for other events to determine whether a reward and/or correction pattern is present to enable learning or unlearning, respectively.

At t=tResponse, the floor lamp may generate the event 514 associated with an action pattern of the matching reflex, which may activate a motor driver 140 to cause an action, such as turning on the light 124 of the floor lamp (shown in FIGS. 1B and 1C). The event 514 is placed on the event bus 214 of the floor lamp, which may be eventually converted to a pattern and stored in memory 138. In some embodiments, a generated action pattern may be a trigger pattern for additional action patterns. For example, turning on the floor lamp may be a trigger pattern for turning on the stereo. In other words, multiple learning devices may be daisy-chained together allowing trigger patterns and action patterns to be generated and transmitting corresponding data from device to device.

At t=tResume Monitor, the floor lamp may leave the triggered mode 508 and re-enter the monitor mode 506 in which the floor lamp may search for and receive new event report messages.

As FIG. 5 illustrates, the floor lamp may enter a single triggered mode with respect to a single reflex. In some embodiments, the floor lamp may have multiple reflexes stored in memory and may obtain (or generate) multiple events at overlapping intervals of time. Assuming the floor lamp obtains multiple events that result in multiple trigger patterns, the floor lamp may enter concurrent triggered modes. Each triggered mode may correspond to different reflexes. For example, the floor lamp may simultaneously receive an event report message related to an EventA from a wall switch and an event report message related to an Event B from a stereo. EventA may correspond to a trigger pattern from a first reflex stored in memory of the floor lamp. In response, the floor lamp may enter a triggered mode with respect to the first reflex, ReflexA. EventB may correspond to a different trigger pattern of a different reflex, ReflexB. Thus, the floor lamp may concurrently enter a second triggered mode with respect to ReflexB. Each triggered mode may be represented as illustrated in FIG. 5; however, the floor lamp may process each event, reflex, and triggered mode independently.

The floor lamp may generate events of trigger patterns for different reflexes at different times, which may cause the floor lamp to enter triggered mode with respect to one reflex at a different time than the other triggered mode for the other reflex. Assuming the triggered modes of each reflex overlap the same time period (e.g., 5 seconds), the floor lamp may exit the triggered mode with respect to the first reflex but remain in the triggered mode with respect to the second reflex. Eventually, the floor lamp may exit the triggered mode with respect to each reflex and return to the monitor mode with respect to each reflex.

FIG. 6 is a timeline diagram 600 illustrating a learning timeline to create a new reflex. The diagram 600 illustrates how a known reflex (referred to as "ReflexF1" or 'F1") may be used to create a new reflex (referred to as "ReflexF2" or "F2"). Diagram 600 includes a new wall switch, a lamp switch, and a floor lamp. The floor lamp has a known ReflexF1, which has states 618 including the monitor mode 606 and the triggered mode 608. ReflexF2 is not known and will be eventually created on this timeline 601. Timeline 601 begins at time 0 ("t=t0") and ends at time "ResumeMonitor" (t="tResumeMonitor").

At t=t0, the floor lamp may start in the monitor mode 606 with respect to ReflexF1. ReflexF1 may include a trigger pattern (referred to as MD2), an action pattern (referred to as MD3), a reward pattern (referred to as MD4), and a correction pattern (referred to as MD5). The floor lamp may monitor generated events for patterns that match the trigger pattern of ReflexF1 (MD2).

At t=tMd1-on, the new wall switch may be switched from 'off' to 'on' generating an event and causing related occurrence data (referred to as "occurrence data 1") to be broadcast by the wall switch in an event report message received by the floor lamp. The occurrence data from the event report message from the new wall switch may be used by the floor lamp to generate an event that may be combined with one or more events or may individually be used to create a pattern ("MD1").

At t=tMd1-done, the floor lamp may receive the event report message with "occurrence data 1," generate a related event, and convert it (and possible other events stored in a buffer) into a pattern known as pattern "MD1". At this time, the floor lamp may place pattern MD1 on the event bus for further processing or temporary storage in memory. The floor lamp may determine that pattern MD1 does not match any known trigger patterns of known reflexes of the floor lamp and thus may continue to operate in the monitor mode 606.

At t=tMd2-on, the lamp switch may be turned from 'off' to 'on' and, in response, the floor lamp may generate an event based on occurrence data related to the state change (referred to as "occurrence data 2"). Simultaneously, the floor lamp may combine the event generated from the "occurrence data 2" with other events collectively processed as a pattern MD2 and place the pattern MD2 on the event bus for temporary storage in memory.

At t=tTrigger, the floor lamp may match the pattern MD2 to the trigger pattern of ReflexF1. The floor lamp may then enter the triggered mode 608 for ReflexF1 because pattern MD2 matches the trigger pattern of ReflexF1. In some embodiments, the floor lamp may complete an internal transmission and convert the event generated from the "occurrence data 2" into the pattern MD2 at t=tTrigger.

At t=tAction, the floor lamp may generate the action pattern for ReflexF1 (MD3) associated with the known trigger pattern for ReflexF1 (MD2) that is located on event bus or stored in the floor lamp's memory. The generation of the pattern MD3 may cause a motor driver connected to the floor lamp to turn on a light.

Figure 11:
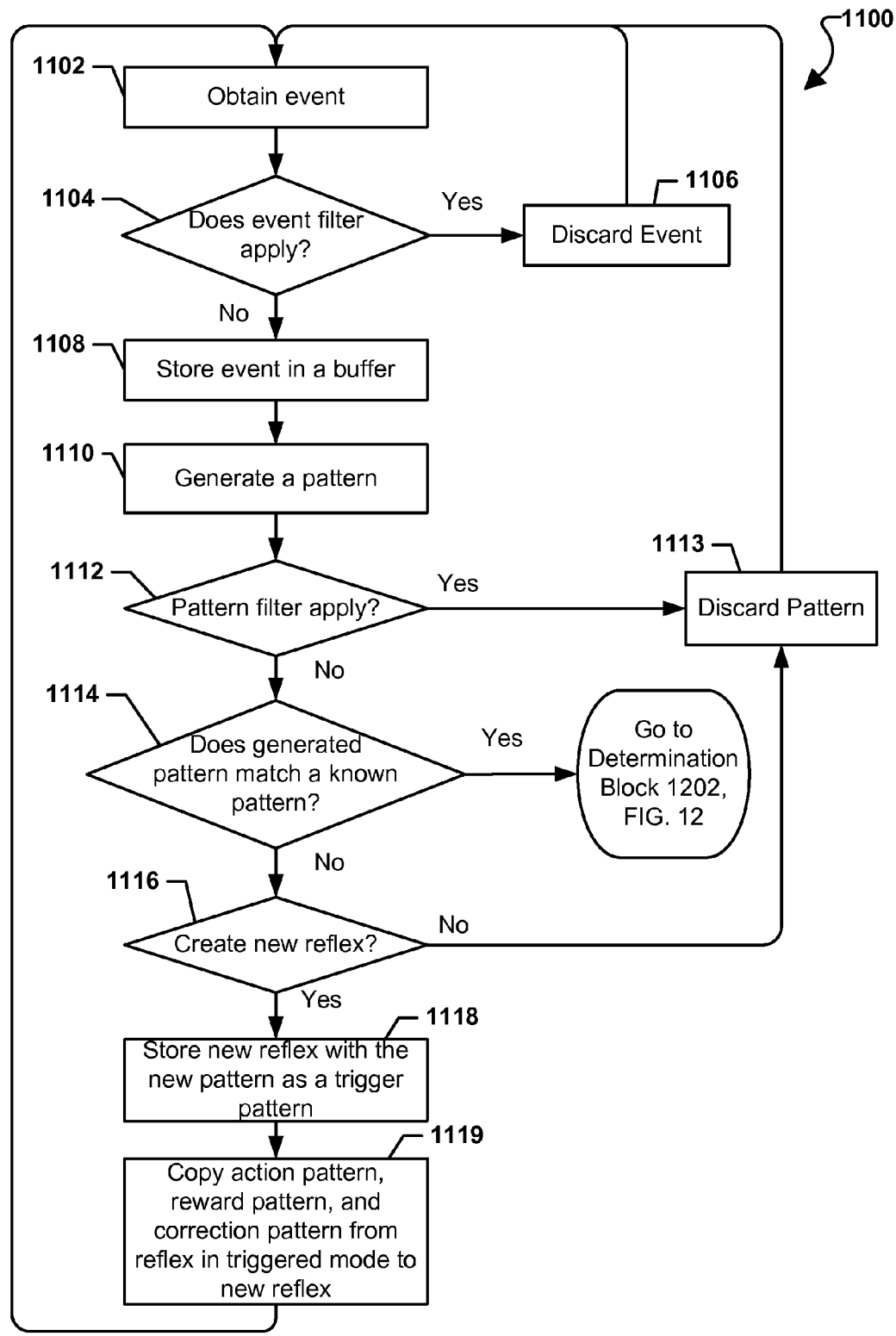
FIG. 11 is a process flow diagram illustrating an embodiment method of generating and processing events to perform actions or associate actions with triggers.

At t=tNewReflex, a new reflex (referred to as "ReflexF2" or "F2") is created because there is no existing reflex with a trigger pattern matching the pattern MD1. The only known trigger pattern is MD2 associated with ReflexF1. In creating ReflexF2, the floor lamp may copy the action pattern, the reward pattern, and the correction pattern associated with the ReflexF1 into the new reflex, and may assign the pattern (MD1) received on the timeline 601 to the new reflex as its trigger pattern. The weights associated with the copied patterns may be adjusted when copied to the new reflex. Thus, the new reflex (ReflexF2) may have a trigger pattern equal to pattern MD1 and related to the occurrence data received from the new wall switch ("occurrence data 1"), an action pattern equal to pattern MD3 associated with turning the floor lamp on, a reward pattern equal to pattern MD4, and a correction pattern equal to pattern MD5. In some embodiments, when the floor lamp may be configured to perform more than one action (e.g., turn on, turn off, etc.) and thus utilize at least two reflexes (i.e., at least one reflex per action), then new reflexes created in response to detecting unknown patterns may be copied from an existing reflex in its triggered mode. In other words, in order to determine which existing reflex to copy from when creating a new reflex, the floor lamp may perform operations to correlate events (or patterns of events) with known actions of reflexes in their triggered mode (i.e., patterns for a new reflex may be copied from a pre-existing reflex whose action pattern is encountered within a time window of the unknown pattern/event). FIG. 11 illustrates an embodiment method that includes operations for a smart box to add a new reflex.

At t=tReward another component may generate events that match a reward pattern, such as pattern MD4 known as the reward pattern for ReflexF1. For example, a motor driver may generate an event equal to pattern MD4 when the light of the floor lamp turns on (shown in FIGS. 1B-1C). The motor driver may send pattern MD4 to the event recorder. Since pattern MD4 matches the reward pattern of ReflexF1 (and newly created ReflexF2), the trigger weight associated with ReflexF1 may be increased as ReflexF1 is in its triggered mode 608. In some embodiments, the reward pattern may be a self-generating pattern such that as long as the light of the floor lamp turns on a reward pattern equal to pattern MD4 is always generated and the trigger weight may increase.

While in a learning-enabled mode, if a reward pattern (MD4) is matched, then reward gains may be applied (e.g., increasing the trigger weight, etc.). In some embodiments, although the match weight (x as described above) is typically modified while in a learning-enabled mode, any parameter or value in the equation may be adjusted while in a learning-enabled mode. In other words, increasing or decreasing the trigger weight of a reflex may include adjusting any parameter in the trigger weight equation.

However, if the correction pattern (MD5) is matched, then the correction gains may be applied (e.g., decreasing the trigger weight). In some embodiments, the reward pattern or the correction pattern may be generated by an additional occurrence, such as an input or a button that the user may activate in order to provide feedback that the response was as desired (or not desired). For example, after the floor lamp turns its light on, a user may press a button on the floor lamp, which generates a reward pattern. Based on the reward pattern, the floor lamp may increase the trigger weight of the related reflex.

At t=tResume Monitor, the floor lamp ends its triggered mode 608 for ReflexF1 and returns to the monitor mode 606. In some embodiments, the floor lamp may subsequently receive pattern MD1, which may cause the floor lamp to activate its light based on a triggered action of ReflexF2.

In some embodiments, a new reflex may be generated regardless of the order in which various occurrence data is received or obtained by the floor lamp. In other words, an unknown trigger pattern (e.g., MD1) could be received and used before, during, and after a trigger window and thus cause the creation of a reflex independent of the order of receiving occurrence data. For example, if the "occurrence data 1" is received and used to generate the pattern MD1 after the floor lamp has entered its triggered mode 608 for ReflexF1 (i.e., after "occurrence data 2" is received and MD2 has been obtained), the floor lamp may still create ReflexF2, as the MD1 may still have occurred within a time window relative to the triggered mode 608.

FIG. 7 illustrates how the newly created reflex, ReflexF2, from FIG. 6 may be rewarded and/or corrected to increase/decrease its association with an action along a timeline 701. Depending on the state 718 of ReflexF2, the floor lamp may be in monitor mode 706 or triggered mode 708 with respect to ReflexF2. In monitor mode 706, the floor lamp is looking for trigger pattern that matches with respect to a reflex. If the floor lamp generates a pattern of events that matches a known trigger pattern of a stored reflex, the floor lamp may enter the triggered mode of the reflex containing the matching trigger pattern. In diagram 700, ReflexF2 may have a trigger pattern equal to pattern MD1, an action pattern equal to pattern MD3, a reward pattern equal to pattern MD4, and a correction pattern equal to pattern MD5.

At t=t0, the wall switch may generate an event and broadcast an event report message with occurrence data related to the event. The floor lamp, in the monitor mode 706, may receive the event report message by t=tMD1-Rx.

At t=tMD1-Rx, the floor lamp receives the entire event report message with the occurrence data, generate an event in response, and transfers it to the event recorder, which may convert the event into pattern MD1 and place it on a event bus (as shown in FIG. 2). The floor lamp may transfer pattern MD1 from the event bus to a temporary storage in memory (e.g., event pattern storage 204 in FIG. 2).

At t=tTrigger, the floor lamp may process pattern MD1 and determine that it matches a known trigger pattern associated with ReflexF2. Thus, the floor lamp may enter the triggered mode 708 with respect to ReflexF2 where floor lamp may learn or unlearn with respect to ReflexF2.

At t=tAction, the floor lamp may generate the action pattern (MD3) associated with ReflexF2, which is put on the event bus. The motor driver may retrieve the action pattern (MD3) from the event bus and conduct an action associated with the generated action pattern (e.g., turn on the light of floor lamp).

At t=tReward, a reward pattern (MD4) associated with ReflexF2 may be generated from another component. For example, the generated action pattern (MD3) may cause a motor driver to turn on the floor lamp. When the floor lamp turns on, the motor driver may receive feedback or a sensor encoder may sense a change in state on the lamp, thus generating pattern MD4. Pattern MD4 may be subsequently stored in event pattern storage. Pattern MD4 may match the reward pattern of ReflexF2, and as a result the weights associated with the ReflexF2 trigger pattern (MD1) may be increased.

In some embodiments, once the trigger weight of a reflex reaches a maximum level, the trigger weight may not be further adjusted, allowing system resources to be used elsewhere. Such a maximum level may be utilized to limit the dynamic range of the weight calculations or to reduce the amount of RAM included within learning devices. For example, when a less dynamic range of trigger weights are used for a reflex (e.g., a smaller range in between a minimum and maximum trigger weight), less RAM may be used in learning devices (e.g., 8-bits instead of 16-bits).

In some embodiments, the memory of the floor lamp may be of a size such that it may only store a limited number of patterns and/or reflexes. In such a case, if a trigger weight of a stored reflex reaches a minimum weight value (e.g., a 'discard threshold'), the trigger weight may be considered so low that it may likely never trigger a reflex. In such a case, the floor lamp may re-use (or reclaim) the memory allocated to that reflex for new reflexes. Thus, setting a lower limit for correcting a reflex with a low trigger weight may allow the memory to devote storage for other patterns and/or reflexes. In other embodiments, when there are limited resources for storing new reflexes, the floor lamp may reallocate memory from the most infrequently used or lowest likely to be used (via weight properties) to new reflexes without using a minimum or "discard" threshold (i.e., the floor lamp may simply replace the most useless reflexes).

At t=tCorrection, a different component may generate a correction pattern (MD5). For example, if the floor lamp is turned off within the triggered mode 708, a sensor encoder may convert this change in state to an event, which may be passed to the event recorder to create a correction pattern MD5. Pattern MD5 may be matched to the correction pattern of ReflexF2 (which is in the triggered mode 708), and as a result the trigger weights may be reduced to weaken the association between the trigger pattern (MD1) and the action pattern (MD3) of ReflexF2.

At t=tResume Monitor, the floor lamp may exit the triggered mode 708 associated with ReflexF2, and return to the monitor mode 706. The triggered mode 708 may end simply because it has been timed out. For example, a triggered mode 708 may only last for ten seconds, so after operating in the triggered mode 708 for ten seconds, the floor lamp may exit the triggered mode 708 with respect to ReflexF2 and may enter a corresponding monitor mode 706.

FIG. 8 illustrates different types of learning rates for reflexes of a learning device, such as the floor lamp. Each device may have a critical learning period 801 and a steady state learning period 802 of learning. In other words, the critical learning period 801 and steady state learning period 802 may correspond to different learning states or learning conditions of a learning device. For example, the critical learning period 801 may correspond to a fast learning state and the steady state learning period 802 may correspond to a slow or normal learning state. Different sets of gains may be applied to triggers weights when in each of these periods.

Although FIG. 8 shows two learning periods 801, 802, it should be appreciated that reflexes may utilize more than two learning periods.

The critical learning period 801 may be typically associated with the initial state of the learning device. This may be a time in which training the initial behavior of the learning device would be more beneficial to the user. Initial dynamic reflexes are likely to be created in this state; meaning that various gain values associated with the critical learning period 801 (referred to as "Gain Set 1" in FIG. 8) may be high (i.e., a high gain set) and the smart box is more likely to learn and unlearn. For example, manufacturers may set the floor lamp to a critical learning period 801 with initially high gains to enable it to quickly associate with a wall switch or any other device. Once the first trigger-action association has occurred, the floor lamp may change to a steady state learning period 802.

The steady state learning period 802 may occur when a particular device has been initially trained, and additional training is allowed but is intended to be more difficult. Gains associated with the steady state learning period 802 (referred to as "Gain Set 2" in FIG. 8) may have low gains (i.e., a low gain set) to make learning more difficult. For example, if the floor lamp has an 'on' event association with an 'on' event related to the wall switch, the floor lamp may be in a steady state learning period 802. While in the steady state learning period 802, the floor lamp may learn additional associations, such as activating in response to received occurrence data from the stereo. However, instead of instantly learning an association between the stereo and the floor lamp, the floor lamp may have to encounter a trigger pattern (e.g., a stereo 'on' event based on occurrence data received from the stereo), an action pattern (e.g., a floor lamp 'on' event based on occurrence data indicating the lamp has been turned on), and a reward pattern (e.g., based on receiving a "reward" signal or occurrence data from a user input button on the lamp) multiple times before the floor lamp learns to turn on when the stereo turns on.

The relation of the gains associated with the critical learning period 801 ("Gain Set 1"), and the gains associated with the steady state learning period 802 ("Gain Set 2") may be illustrated with the following equation:

$$\text{Gain Set 1} \geq \text{Gain Set 2}$$

In other words, a learning device using the above equation may learn more quickly with Gain Set 1 than Gain Set 2.

In some embodiments, each gain set may have individual gains or weights associated with the trigger, reward, and correction pattern of a reflex at different stages of operation. Two or more gain levels may be used to adjust the gains closer to a critical period and a steady state period. For example, there may be a third gain set, which may be a hybrid between the critical period and the steady state period (e.g., less repetition is needed to learn). As the gains are adjusted, the weights associated with a particular pattern may be adjusted to determine matches within the system.

Whether a particular reflex is dynamic or static may affect the gains and learning associated with the learning device. A particular learning device may have a built-in static reflex, which may not be adjusted. For example, the floor lamp may have a built-in reflex incapable of being re-weighted regardless of encountering related reward patterns or correction patterns. In other words, learning devices may not nullify (or "forget") static reflexes through the use of weight adjustments (e.g., correcting). However, in contrast, dynamic reflexes may be created spontaneously and may be adjusted over time. For example, the floor lamp may adjust the weights of a dynamic reflex (e.g., ReflexF2 as illustrated above) over time such that no action of the floor lamp may be performed corresponding to a trigger pattern associated with the wall switch. In other words, a learning device may lower the trigger weight of a reflex related to the association between a trigger pattern (e.g., occurrence at a wall switch) and an action pattern (e.g., turning on the floor lamp) such that the trigger weight is below a threshold and thus the action may not be performed. However, in some embodiments, dynamic reflexes may be converted to static reflexes such that the association may not be forgotten. In some embodiments, dynamic reflexes may be given a rigid state such that it is difficult to change the trigger weight of a reflex having an association between an action and a trigger, thus making such dynamic reflexes more persistent.

Figure 9:
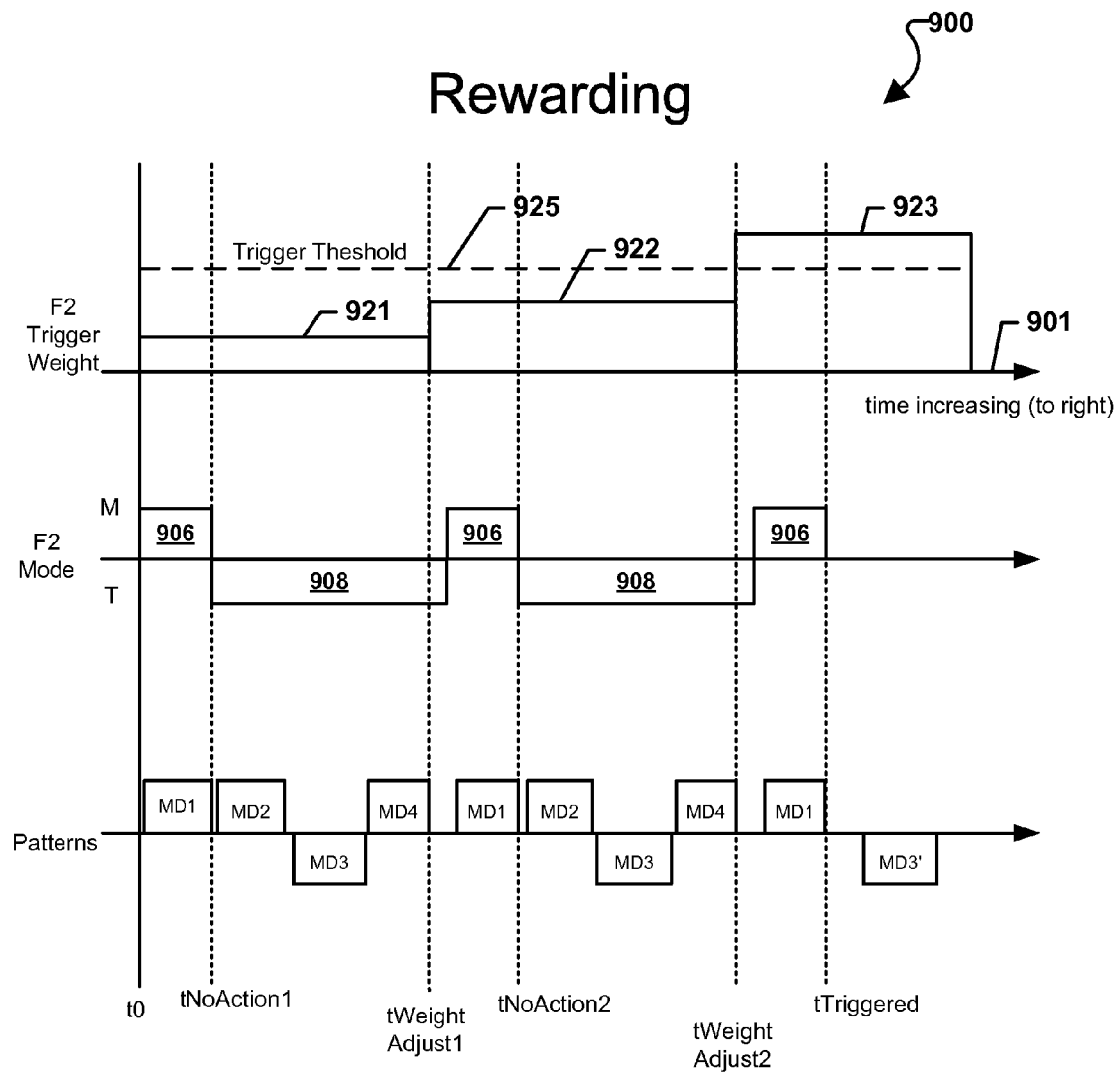
FIG. 9 is an exemplary timeline illustrating reward signals for training a learning device by increasing the trigger weight of a known reflex through repetition suitable for use in various embodiments.
Figure 10:
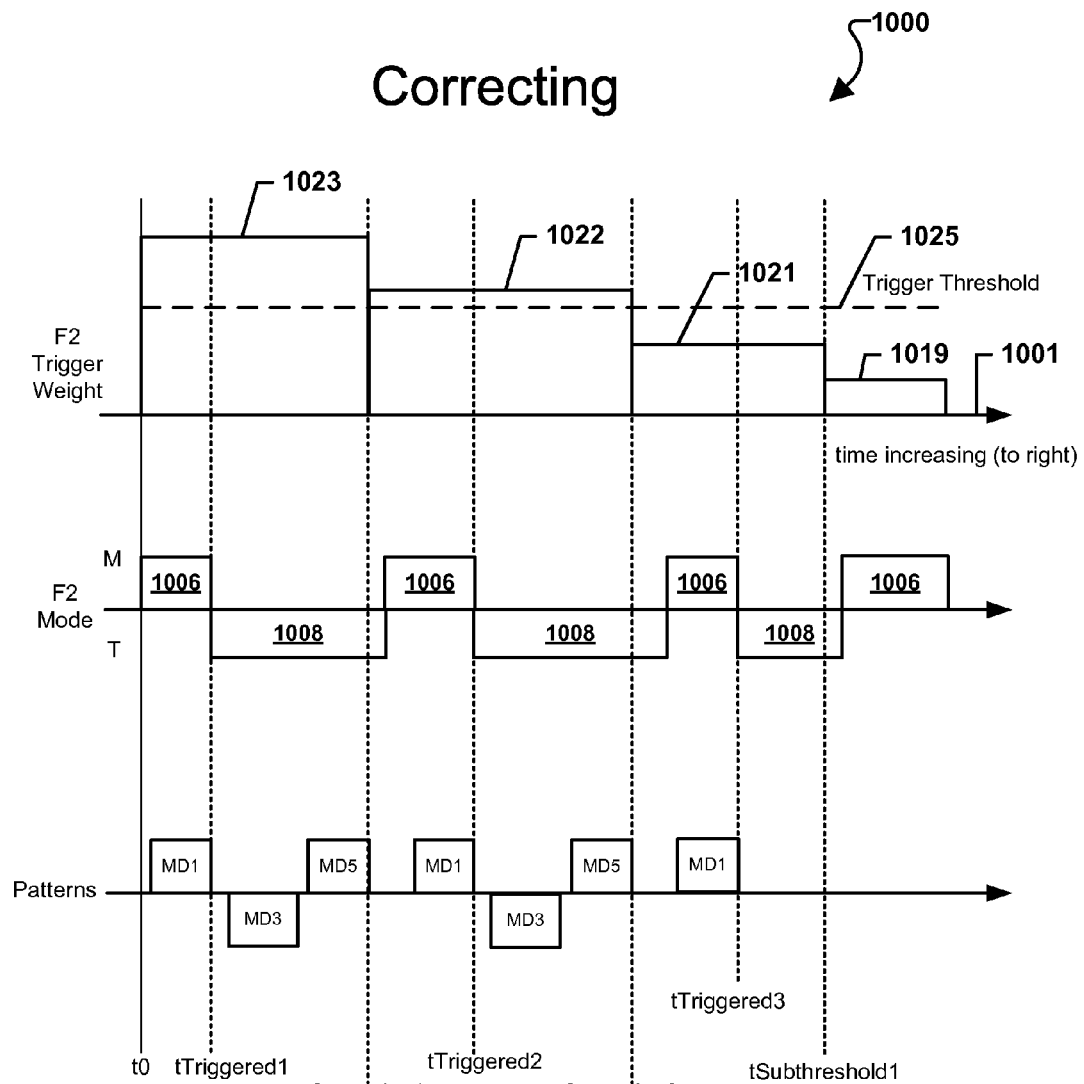
FIG. 10 is an exemplary timeline diagram illustrating correction signals for training a learning device by decreasing trigger weights of a known reflex through repetition suitable for use in various embodiments.

FIGS. 9 and 10 illustrate examples of learning and unlearning of a dynamic reflex in a steady state learning period 802 as shown in FIG. 8. The same principles illustrated in FIGS. 9 and 10 hold true for a dynamic reflex in a critical learning period 801.

FIG. 9 is a timeline diagram 900 that shows how rewarding a trigger-action association may change the weights of a trigger pattern until the trigger pattern has a weight equal to or above a trigger weight threshold 925. Diagram 900 includes two known reflexes ReflexF1 and ReflexF2. ReflexF1 has a trigger pattern (referred to as "MD2"), and a first trigger weight above its trigger threshold (not shown). ReflexF1 also has an action pattern (referred to as "MD3"), a reward pattern (referred to as "MD4"), and a correction pattern (referred to as "MD5"). ReflexF2 is the same as ReflexF1 except that ReflexF2 has a different trigger pattern (referred to as "MD1"), and may have a second trigger weight initially below the trigger weight threshold 925. Diagram 900 shows a timeline 901 of events and reactions, which may alter the trigger weight of ReflexF2.

At time t=t0, the floor lamp may be in the monitor mode 906 with respect to ReflexF2. In the monitor mode 906, the floor lamp may monitor for incoming signals related to events matching the trigger pattern ReflexF2. During the monitor mode 906, the floor lamp may encounter or obtain an event corresponding to trigger pattern MD1. For example, a new wall switch, which may be identical to the first wall switch, may send an event report message with occurrence data to the floor lamp when the new wall switch toggles from 'off' to 'on', and the floor lamp may then generate a trigger pattern MD1 based on the received event report message and occurrence data.

At time t=tNoAction1, the floor lamp may process the trigger pattern MD1 for ReflexF1 and ReflexF2. As previously discussed, MD1 may only be associated with ReflexF2, thus floor lamp may enter the triggered mode 908 with respect to ReflexF2. Since ReflexF2 has a current trigger weight at a first trigger weight level 921 that is below the trigger weight threshold 925 at t=tNoAction1, the floor lamp may not generate the action pattern for ReflexF2 (e.g., MD3). However, shortly thereafter, the floor lamp may generate trigger pattern MD2 after receiving another event report message with occurrence data corresponding to the new wall switch. For example, the new wall switch may toggle from 'off' to 'on' and send a related event report message to the floor lamp, causing the floor lamp to generate the trigger pattern MD2 based on the event report message. As trigger pattern MD2 corresponds to ReflexF1 and the trigger weight is above its trigger threshold, the floor lamp may generate action pattern MD3. The floor lamp may subsequently generate a corresponding action event that results in the lamp turning on its light. Once the light turns on, the change in state may be recorded by a sensor encoder, which creates an associated event and generates the reward pattern MD4.

At time t=tWeightAdjust1, reward pattern MD4 may be processed to adjust the trigger weights for both ReflexF1 and ReflexF2. While in triggered mode 908 with respect to ReflexF2, the floor lamp may determine that pattern MD4 matches the reward pattern of ReflexF2, and may increase the trigger weight of MD1 and ReflexF2. The new trigger weight is at a second trigger weight level 922, which is still below the trigger weight threshold 925. After the triggered mode 908 times out, the floor lamp may enter the monitor mode 906 again.

The process of encountering events and generating their corresponding patterns MD1, MD2, MD3 (or MD3'), and MD4 may repeat resulting in adjusting the trigger weight of ReflexF2 to increase above the trigger weight threshold 925 to a third trigger weight level 923 at t=tWeightAdjust2.

At any time after adjusting the trigger weight of ReflexF2 above the trigger weight threshold 925, the floor lamp may encounter an event corresponding to the pattern MD1, which may result in the generation of action pattern MD3' without the need of encountering pattern MD2 to trigger ReflexF1. For example, before the floor lamp may have only turned on when it generated pattern MD2 corresponding to an 'on' event of the new wall switch. Now the wall switch may send an event report message including occurrence data that may result in the generation of an event corresponding to pattern MD1 to the floor lamp and thus in the floor lamp being triggered to turn on its light via ReflexF2.

FIG. 10 is a timeline diagram 1000 that illustrates correcting a trigger-action association by adjusting the trigger weight until it is below the trigger weight threshold 1025. Diagram 1000 is similar to diagram 900 except that a correction event is encountered by the floor lamp and the floor lamp subsequently generates a correction pattern. This correction pattern decreases the trigger weight of a reflex. Unlike diagram 900, a correction process in diagram 1000 may involve only one reflex. Here, only ReflexF2 is involved and includes the same trigger pattern, MD1, action pattern, MD3, reward pattern, MD4, and correction pattern, MD5, as in diagram 900. Also unlike diagram 900, ReflexF2 in diagram 1000 may begin with an initial trigger weight of 1023 above its trigger weight threshold 1025. Thus, upon generating trigger pattern MD1, the floor lamp may generate a corresponding action pattern and associated action.

At time t=t0, the floor lamp may monitor for events in a monitor mode 1006. During the monitor mode 1006, the floor lamp may encounter a trigger event corresponding to trigger pattern MD1. For example, a new wall switch may broadcast an event report message with occurrence data related to an 'on' event and corresponding to pattern MD1 because the new wall switch was toggled from 'off' to 'on'. As the event is received, the floor lamp may generate the corresponding trigger pattern.

At time t=tTriggered1, the floor lamp may receive the event report message related to the on-event and generate the pattern MD1. The floor lamp may determine that the pattern MD1 is a known trigger pattern corresponding to ReflexF2 and thus may enter the triggered mode 1008 with respect to ReflexF2. Shortly thereafter, the floor lamp may determine that the first trigger weight level 1023 for ReflexF2 is above trigger weight threshold 1025 and may generate an action pattern MD3, which results in an action event and a physical action of the floor lamp turning on its light. The floor lamp may also encounter an event corresponding to a correction pattern MD5 while in the triggered mode 1008. For example, the floor lamp may generate a correction pattern MD5 upon encountering an event when a user presses a separate correction button on the floor lamp (e.g., a button labeled "Correction"). A user may press this button to send a correction event to the floor lamp and in response the floor lamp may generate the correction pattern MD5. In an alternative example, the floor lamp may generate a correction pattern when a user manually turns off the floor lamp within a brief time window of a previous trigger pattern. The opposite input of a previous trigger pattern may correspond to a correction pattern and the floor lamp may learn to disassociate trigger patterns and action patterns.

At time t=tCorrection1, the floor lamp may determine that the correction pattern MD5 matches the correction pattern of ReflexF2. Thus, the floor lamp may reduce the trigger weight associated with ReflexF2 to a second trigger weight level 1022. The second trigger weight level 1022 is still above the trigger weight threshold 1025, thus the floor lamp may still activate its light. Eventually, the triggered mode 1008 ends due to time constraints and the floor lamp may enter the monitor mode 1006 again.

While in the monitor mode 1006, the floor lamp may encounter a second trigger event and generate a second trigger pattern MD1. For example, the new wall switch may again be toggled from 'off' to 'on'. At time t=tTriggered2, the floor lamp may determine that the second pattern MD1 matches the known trigger pattern of ReflexF2 and may enter triggered mode 1008 with respect to ReflexF2. Since ReflexF2 currently has a second trigger weight level 1022 above trigger weight threshold 1025, the floor lamp may generate action pattern MD3 and the associated mechanical action (e.g., turn on the light). While the floor lamp is in the triggered mode 1008 with ReflexF2, the floor lamp may again encounter a correction event from the correction button and generate the correction pattern MD5. Since pattern MD5 corresponds to ReflexF2, at time t=tCorrection2, the trigger weight is reduced to a third trigger weight level 1021, which is below the trigger weight threshold 1025. Thus, if the floor lamp encounters another trigger event and generates another trigger pattern MD1 at time t=tTriggered3, the floor lamp may not generate a corresponding action pattern MD3 in a triggered mode 1008. In other words, the floor lamp may have effectively forgotten the trigger action association of ReflexF2 and may not activate its light upon generating trigger pattern MD1 in the future (or at least until retrained to respond to that manner to the trigger pattern).

In some embodiments, trigger weights below their association trigger weight threshold may continually lowered in response to the floor lamp entering its trigger mode without encountering a reward pattern. For example, in FIG. 10, at time tTriggered3, the floor lamp may detect a trigger pattern MD1 without a subsequent reward pattern, and as a result, the floor lamp may continue to decrease the trigger weight for ReflexF2 to a fourth trigger weight level 1019 as shown at time t=tSubthreshold1. In some embodiments, the trigger weight of a reflex may be periodically decreased (or decayed) over time once the trigger weight is below its associated trigger weight threshold and no reward pattern is encountered.

In some embodiments, the floor lamp may remove ReflexF2 immediately or at some time after its trigger weight is below the trigger weight threshold 1025 and there is a memory shortage. Thus, if the floor lamp detects the trigger pattern (MD1) of ReflexF2 after ReflexF2 has been deleted, the floor lamp may create a new reflex with pattern MD1 as its trigger pattern assuming the other conditions are met (e.g., having a reward present during the triggered mode). In some embodiments, the floor lamp may remove a reflex that has a trigger weight above its associated threshold due to memory shortages (e.g., reaching a memory limit for stored reflexes). For example, when the floor lamp encounters a new trigger pattern within a triggered mode but has no available storage in local memory, the floor lamp may remove a stored reflex that has a trigger weight above a trigger threshold but that is not often used, least likely to be used, and/or has the lowest trigger weight of all reflexes with trigger weights exceeding their respective trigger weight thresholds.

FIG. 11 illustrates an embodiment method 1100 that may be implemented in a smart box for learning actions associated with events. Although the embodiment method 1100 may be used with any smart box, for ease of description, the method 1100 is described with reference to the example of smart box connected to the floor lamp receiving an event report message from a smart box connected to the wall switch. Additionally, any reference to the floor lamp, the wall switch, or the stereo, also encompasses their corresponding smart boxes respectively. For example, operations described as being performed by the floor lamp may be performed by the processor of the smart box associated with the floor lamp. These smart boxes actually perform the operations of exchanging occurrence data within event report messages, and processing events and/or patterns.

In block 1102 the floor lamp may obtain an event. For example, the floor lamp may receive an event report message including occurrence data over a RF transmission from the wall switch and, based on the data in the event report message, the floor lamp may generate the event as a data structure as described above with reference to FIG. 3B. In such an example, the event report message may be transmitted by the wall switch when a user toggles the wall switch from 'off' to 'on'. As described above, the floor lamp may alternatively obtain an event based on a sensor (e.g., light sensor, etc.) coupled to the floor lamp, and/or in response to performing an action. Over time and in subsequent iterations of the operations of the methods 1100 and 1200, the floor lamp may obtain additional elements that may or may not be related to the obtained event. For example, after activating a triggered mode based on the obtained event, the floor lamp may obtain additional events by retrieving prior events obtained and buffered in the memory, such as events generated in response to received event report messages and/or actions performed by the floor lamp.

In determination block 1104, the floor lamp may determine whether an event filter applies. Event filters may include time filters, type filters, device event filters, etc. In response to determining that an event filter applies (i.e., determination block 1104="Yes"), the floor lamp, may discard the event from further processing in block 1106, and continue to monitor for new incoming signals in block 1102. In some embodiments, if the event filter is a time-based filter, there may be a preset schedule to discard events during the day. For example, the stereo may have a time filter that it will ignore obtained events from the hours of midnight to 10 AM. In another example, an event filter at the floor lamp may simply ignore all obtained events from the stereo. In a further example, the stereo may ignore obtained events associated with a particular user. In some embodiments, a wall switch may receive a User ID input (e.g., fingerprint data, a pass code, nearby mobile device data from Bluetooth or Near Field Communication (NFC), etc.) and include that User ID in the occurrence data within an event report message. A father who owns a stereo may not want anyone other than him to turn on his stereo with wall switch. Thus, the stereo may discard all obtained events if they do not contain the father's user ID, thereby preventing others from turning on the stereo with the wall switch. However, if an event filter does not apply (i.e., determination block 1104="No"), the floor lamp may store the event in a buffer located in memory 138 (shown in FIG. 1C).

Assuming an event filter does not apply, the floor lamp may store the event in the buffer located in memory 138 in block 1108. The event may be stored in a buffer to facilitate generating a pattern at event recorder 206 while the floor lamp is in monitor mode. In other words, the floor lamp may perform buffering of events while in monitor mode. Although not shown, the floor lamp may buffer events in memory for a particular period of time (e.g., 5-10 seconds) and then discard the events to make room for new events.

In block 1110, the floor lamp may generate a pattern based on the event residing in the buffer. In some embodiments, the floor lamp may generate a pattern based on multiple events residing in the buffer, such as by retrieving and combining various events buffered in memory. For example, the floor lamp may have generated a pattern based on two events generated based on event report messages received when two different wall switches are turned to the 'on' position. Patterns may be generated by one of four ways: (1) based on the time-ordered sequence of events; (2) reducing multiple events to a singlet; (3) heuristics; and (4) removing time from events in pattern generation.

When generating a pattern based on a time-ordered sequence of events, the time the event is generated or otherwise obtained may matter. Thus, if an event is not created within a certain time window, the floor lamp may not generate a pattern based on the event. For example, the floor lamp may have a trigger pattern equivalent to an 'on' event related to the wall switch and an 'on' event related to the stereo. If the floor lamp obtains the 'on' event related to the wall switch within the time window but the 'on' event related to the stereo is obtained outside of the time window, then the floor lamp may not recognize the trigger event. In some embodiments, a pattern may only be generated if an event A is obtained before event B. For example, if the floor lamp obtains the stereo 'on' event prior to the wall switch 'on' event, the floor lamp may not recognize these events as a trigger pattern because the floor lamp only accepts trigger patterns when the wall switch event is obtained first.

In some embodiments, multiple events may be reduced to a single event or a singlet. For example, the floor lamp may obtain two 'A' events at different times and then a 'B' event, which are stored in the lamp event buffer. The floor lamp may generate a pattern based on one 'A' event and one 'B' event, discarding the second 'A' event. Thus, a trigger pattern having two 'A' events and a 'B' event may be reduced to a trigger pattern having one 'A' event and one 'B' event. Since the 'A' event is repeated at a different time, the floor lamp may ignore the repeated event.

In some embodiments, the floor lamp may conduct a series of heuristic calculations to determine whether to disregard the event. Some of these heuristic calculations may simply include a counting mechanism. For example, the floor lamp may determine whether it has received the 'A' event three times (e.g., an 'on' event related to the wall switch), at which point the floor lamp may generate a corresponding pattern such as a trigger pattern based on a heuristic rule of receiving the three 'A' events equates to generating a trigger pattern.

In some embodiments, the floor lamp may disregard time when creating patterns from events. Disregarding time may coincide with the heuristic calculations. For example, if the floor lamp receives three 'A' events and one 'B' event in memory 138, the floor lamp may perform a series of heuristic calculations to determine whether to generate a pattern based on the events without a time window. Disregarding time may also include order-independence. For example, the floor lamp may create the same pattern regardless of whether it obtains an 'A' event followed by a 'B' event or a 'B' event followed by an 'A' event.

In determination block 1112, the floor lamp may determine whether to apply a pattern filter. This may be similar to the event filter described with reference to determination block 1104, which may include stored ignore patterns, time-based filters, device type filters, etc. The floor lamp may employ the pattern filter to remove a pattern from memory (e.g., a 32K memory, 64K memory, etc.) when the pattern falls below a threshold, such as a time threshold. In response to the floor lamp determining that a pattern filter applies (i.e., determination block 1112="Yes"), the floor lamp may discard the pattern and refrain from further processing of that pattern in block 1113. In some embodiments, the floor lamp may filter patterns generated for recently conducted actions. For example, when the floor lamp turns on, the floor lamp may generate an action pattern from an event. If the action pattern was not ignored for a period of time, the floor lamp may try to process the action pattern as a trigger pattern to another action (e.g., to turn on the stereo). To avoid the creation of a new trigger-action association, the floor lamp may create a temporary ignore pattern filter in which the floor lamp ignores generated action patterns for a short period of time. After the floor lamp discards the pattern, the floor lamp returns to obtaining new events in block 1102. In some embodiments, the floor lamp may constantly obtain events in block 1102.

In some embodiments, the floor lamp may apply pattern filters if a trigger weight of the pattern or the corresponding reflex is below a low threshold value. By applying a pattern filter, the floor lamp may be able to remove patterns from its memory when the threshold value of a particular reflex is below a certain set value. The floor lamp may reduce the trigger weight of a reflex through the correcting process described throughout the application. Removing patterns may allow the floor lamp to conserve resources (e.g., memory) for the creation of new reflexes. In some embodiments, the floor lamp may be configured to utilize a predetermined, limited number of reflexes (e.g., 2 reflexes per lamp) so that users are less likely to get confused regarding the floor lamp's learned capabilities at any given time, regardless of the available local storage. Such limits to stored reflexes may also have the added benefit of improving performance, such as by improving pattern matching speeds by decreasing the number of patterns that may need to be compared due to fewer stored reflexes and patterns.

Referring back to determination block 1112, in response to determining that a pattern filter does not apply (i.e., determination block 1112="No"), the floor lamp may determine whether the generated pattern matches a known pattern in determination block 1114. For example, the floor lamp may determine that the received event is within the time window of the time based filter. Thus, the floor lamp continues to process the event as a pattern. The floor lamp may determine whether the generated pattern is a known pattern of any type, such as a known trigger pattern, a known correction pattern, a known reward pattern, etc.

As an example, in determination block 1114, the floor lamp may determine whether a generated pattern corresponds to a known trigger pattern of a reflex, such trigger pattern 'MD2' for reflex 'ReflexF1' described above with reference to FIG. 6. In response to determining that the generated pattern matches a known pattern, (i.e., determination block 1114="Yes"), the floor lamp may perform the operations of determination block 1202 described below with reference to FIG. 12. For example, the floor lamp may enter a triggered mode related to a reflex when the at least one event corresponds to a trigger pattern associated with the reflex, and may conduct an action associated with the reflex.

However, in response to determining that the generated pattern does not match a known pattern (i.e., determination block 1114=No), the floor lamp may determine whether to create a new reflex in determination block 1116. For example, as described above in the scenario of FIG. 7, the generated pattern may be pattern 'MD1' that does not correspond to a known pattern (i.e., ReflexF2 has not yet been created), and so the floor lamp may determine whether it should create a new reflex having pattern MD1 as its new trigger pattern. The floor lamp may decide whether a new reflex should be created based on whether both an unknown pattern was detected and a reflex is in its triggered mode.

In response to the floor lamp deciding not to create a new reflex (i.e., determination block 1116="No"), the floor lamp may discard the generated pattern in block 1113 and begin to monitor for new events in block 1102. In some embodiments, the floor lamp may be switched to a non-learning mode in which the floor lamp cannot learn new associations, thereby disabling its ability to create new reflexes. For example, the floor lamp may have previously learned to turn its light on/off when wall switch sends an event report message associated with an on/off event. A user may be satisfied with this simple on/off association and may disable any additional learning by the floor lamp. Thus, the floor lamp may not learn additional associations with occurrences (e.g., power on, etc.) at the stereo or any other learning device. In other embodiments, the floor lamp may have other considerations (e.g., not enough memory, triggered mode timed out, etc.) to keep it from learning a new reflex.

In response to the floor lamp deciding to create a new reflex (i.e., determination block 1116="Yes"), the floor lamp may store the new pattern as a trigger pattern for a new reflex in block 1118. A new reflex may be created with a predetermined action pattern, reward pattern and a correction pattern. Thus, in block 1119, the floor lamp may copy to the new reflex the action pattern, reward pattern, and correction pattern from the reflex that is currently in its triggered mode. For example, as illustrated in FIG. 6 above, the floor lamp may create ReflexF2 containing a new pattern MD1 as the trigger pattern, and copy the action pattern, the reward pattern, and the correction pattern from the only other known ReflexF1. In an alternative example, the floor lamp may create a new reflex by taking patterns from any other stored reflex in its triggered mode.

As previously noted, the floor lamp may obtain additional events while in the triggered mode, and such additional events may be associated with or correlated to a different trigger. The floor lamp may attempt to identify or match patterns based on these additional events to patterns of reflexes stored in memory. However, the patterns based on these additional events may not correspond to a known pattern of a stored reflex, and the floor lamp may decide to create a new reflex. In other words, the floor lamp may create a second reflex with a trigger pattern, action pattern, correction pattern, and reward pattern when patterns based on the additional events do not correspond to at least one of the trigger pattern, action pattern, correction pattern, and reward pattern associated with a known reflex.

Figure 12:
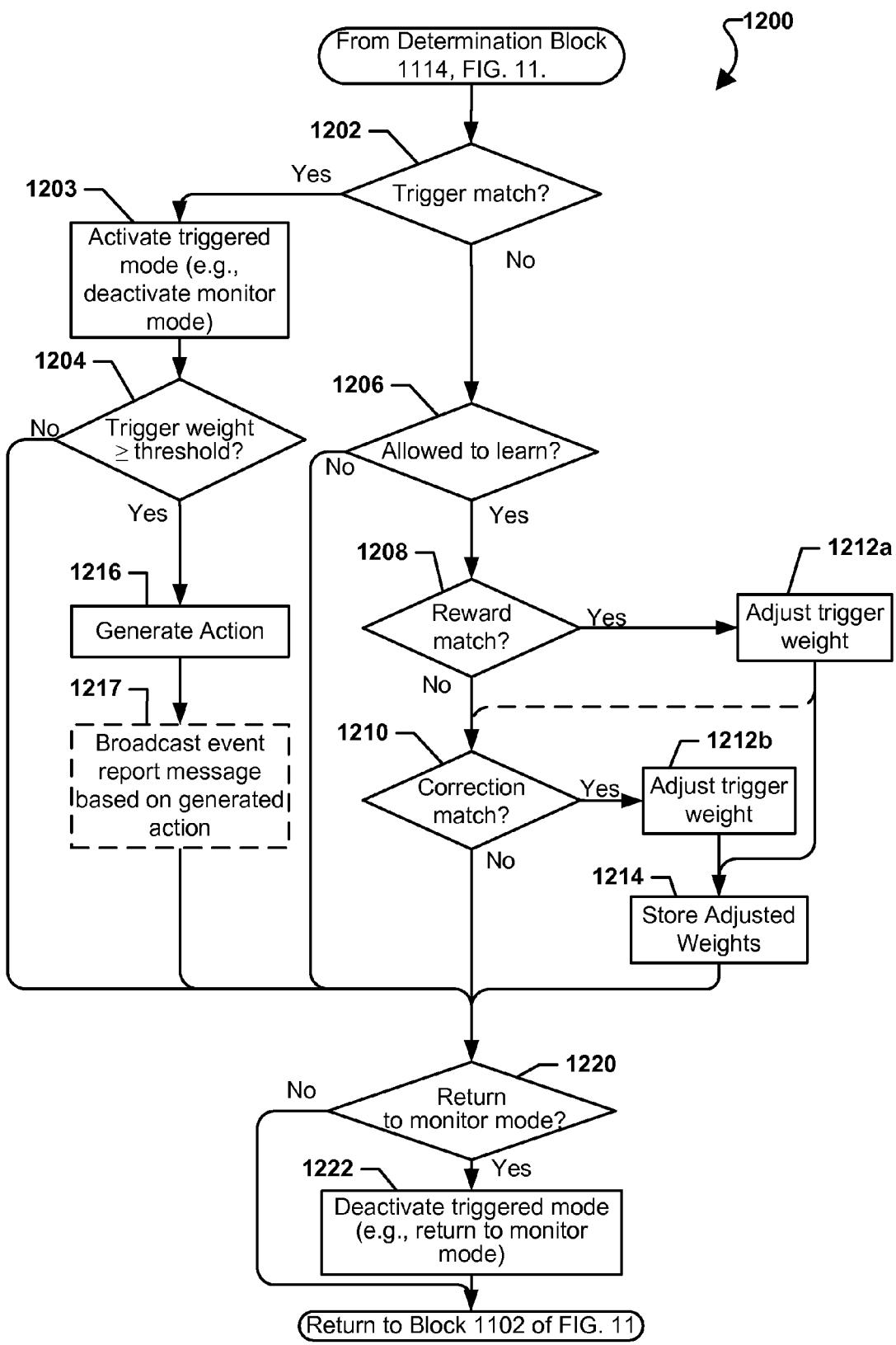
FIG. 12 is a process flow diagram illustrating an embodiment method for the adjustment of trigger weights for learning and unlearning.

FIG. 12 illustrates an embodiment method 1200 of continued processing of a matched pattern from FIG. 11. As described above, in response to determining that the generated pattern matches a known pattern, (i.e., determination block 1114 of FIG. 11="Yes"), the floor lamp may determine whether the generated pattern matches a known trigger pattern of a reflex in determination block 1202. For example, the floor lamp may determine whether the pattern generated based on a wall switch 'on' event matches a known trigger pattern of a stored reflex (e.g., pattern MD1 matches trigger pattern for ReflexF2 shown in FIG. 6). In response to the floor lamp determining that the generated pattern matches a known trigger pattern (i.e., determination block 1202="Yes"), the floor lamp may activate (or turn 'on') a triggered mode for the reflex associated with the known trigger pattern that matches the generated pattern in block 1203. Activating the triggered mode may de-activate the monitor mode associated with the reflex. It should be noted that the floor lamp may receive and identify additional events while in the triggered mode related to the reflex, such as other events that are associated with other reflexes, causing concurrently activated triggered modes.

The floor lamp may determine whether the trigger weight of the reflex of the matching pattern is equal to or above the trigger threshold in determination block 1204. Continuing with the example of FIG. 11, the floor lamp may determine that generated pattern MD1 matches a known trigger pattern of the recently created ReflexF2, and may compare the current stored trigger weight for the ReflexF2 to its respective trigger threshold. In determination block 1204, the floor lamp may determine whether the trigger weight is equal to or above the threshold. In response to determining that the trigger weight is equal to or above the threshold (i.e., determination block 1204="Yes"), the floor lamp may generate an action in block 1216, such as by using the reflex of the matching trigger pattern to generate a pattern or resulting event that causes the floor lamp to conduct or perform a predetermined action. For example, the floor lamp may turn on its light 124 if the trigger weight of ReflexF2 is above the trigger weight threshold 925 as illustrated in FIG. 9. In various embodiments, generating the action may include generating a pattern of events that may be further propagated externally or internally and that are used by a motor driver to drive an actuator.

In some embodiments, the floor lamp may be configured to generate a limited number of actions when in the triggered. For example, the floor lamp may only generate one action during any one triggered mode, regardless of the number of trigger patterns received during that triggered mode.

In optional block 1217, the floor lamp may broadcast an event report message based on the generated action, such as a broadcast message including occurrence data indicating the generated action (or its resulting event). In response to the floor lamp determining that the matched trigger weight is not greater than or equal to the trigger threshold for the reflex (i.e., determination block 1204="No"), or if the action is generated with the operations in block 1216 and a broadcast is made with the operations in optional block 1217, the floor lamp may perform the operations in determination block 1220 described below.

In response to the floor lamp determining that the generated pattern does not match a known trigger pattern (i.e., determination block 1202="No"), the floor lamp may determine whether the floor lamp is allowed to learn in determination block 1206. For example, the floor lamp may have previously processed the trigger pattern (e.g., MD1) and is currently monitoring for generated reward patterns and correction patterns while in a triggered mode. Thus, the floor lamp may obtain a reward event and generate the corresponding reward pattern (e.g., MD4) shortly after receiving the trigger pattern and entering the activated trigger mode for the associated reflex.

In response to determining that the floor lamp is not allowed to learn (i.e., determination block 1206="No"), the floor lamp may perform the operations in determination block 1220 described below. For example, the floor lamp may have a designated time window of five seconds after generating a trigger pattern to learn/unlearn a new action associated with the trigger pattern (e.g., MD1). As long as a reward pattern or correction pattern is generated within the five-second window, the floor lamp may learn/unlearn actions with the trigger pattern (e.g., MD1); however, the floor lamp may not learn new associations or unlearn old associations if the received reward/correction pattern is outside the five second time window. In another example, the floor lamp may not be able to learn simply because the associated reflex is in an unlearn state or the associated reflex is a static reflex which may not learn or unlearn.

However, if the floor lamp determines that it is allowed to learn regarding an action-trigger association of a reflex (i.e. determination block 1206="Yes"), in determination block 1208, the floor lamp may determine whether the generated pattern matches a reward pattern. In some embodiments, the floor lamp may receive or generate a reward pattern within a learning time window. For example, a user may press a reward button on the floor lamp within five seconds of switching on the wall switch and turning on the floor lamp. By pressing a reward button on the floor lamp, it may generate a reward pattern (e.g., pattern MD4 as illustrated in FIG. 7). In an alternative example, a user may turn on the lamp switch 126 attached to the floor lamp within five second of turning on the wall switch, causing the floor lamp to generate a reward pattern (e.g., MD4) when the lamp activates confirming that the floor lamp turned on.

In some embodiments, the floor lamp may be allowed to learn based on whether it is in the monitor mode or the trigger mode. For example, when in monitor mode for a particular reflex, the floor lamp is not allowed to learn regarding that reflex; however, learning may be allowed when in the triggered mode of the reflex. In some embodiments, one or more reflexes may be allowed to learn due to other factors, such as the overall state or configuration of the floor lamp. For example, the floor lamp may be configured to disallow any learning due to a system setting, such as an active debug mode during which various reflexes may be tested.

If the floor lamp determines that the generated pattern matches a reward pattern (i.e., determination block 1208="Yes"), in block 1212a the floor lamp may adjust the trigger weight of the associated reflex. In some embodiments, the floor lamp may adjust the trigger weight associated with the appropriate reflex by increasing the trigger weight. For example, if the floor lamp receives or generates a pattern (e.g., MD4) within a five-second learning time window of encountering a trigger pattern (e.g., MD1), the floor lamp may increase the trigger weight of the reflex of the trigger pattern. After the trigger weights are adjusted, in block 1214, the floor lamp may store the adjusted trigger weights in memory 138 and the floor lamp may perform the operations in determination block 1220 as described below.

In some embodiments, the floor lamp may optionally perform the operations in determination block 1210 after performing the operations in block 1212a. In other words, the floor lamp may be configured to evaluate both whether a reward pattern has been matched in determination block 1208 and whether a correction pattern has been matched in determination block 1210 in response to determining it is allowed to learn (i.e., determination block 1206="Yes"), regardless of the determinations of determination block 1208. In other words, reward and correction matches may be checked in parallel by the floor lamp.

If the floor lamp determines that the generated pattern does not match a known reward pattern (i.e., determination block 1208="No"), the floor lamp may check for a correction pattern match in determination block 1210. In some embodiments, the floor lamp may receive or generate a correction pattern within a learning time window. For example, a user may press a correction button on the floor lamp within five seconds of switching on the wall switch and turning on the floor lamp. By pressing the correction button, the floor lamp may generate a correction pattern (e.g., pattern MD5 as illustrated in FIG. 7). In an alternative example, a user may turn off the lamp switch 126 attached to the floor lamp within five-second of turning on the wall switch, causing the floor lamp to generate a correction pattern (e.g., MD4) when the floor lamp turns off its light 124.

If the floor lamp determines that the generated pattern matches a known correction pattern (i.e., determination block 1210="Yes"), the floor lamp may adjust the trigger weight in block 1212b. In some embodiments, the floor lamp may decrease the trigger weights after receiving a correction pattern within the learning time window. For example, the floor lamp may generate a correction pattern (e.g., pattern MD5) when a user turns the lamp switch 126 of the floor lamp to 'off' within five seconds of generating a trigger pattern (e.g., MD1) associated with an 'on' event of the wall switch. The floor lamp may match the generated pattern (MD5) as the correction pattern of ReflexF2 and reduce the trigger weight associated with ReflexF2. In block 1214, the floor lamp may store the adjusted weights in memory 138 and the floor lamp may perform the operations in determination block 1220 as described below. In other words, the floor lamp may adjust one or more trigger weights of the reflex when the at least one additional event corresponds to at least one of a correction pattern and a reward pattern associated with the reflex.

In response to the floor lamp determining that the generated pattern does not match a correction pattern (i.e., determination block 1210="No"), or in response to the floor lamp determining that the matched trigger weight is not greater than or equal to the trigger threshold (i.e., determination block 1204="No"), or in response to the floor lamp determining that is it not allowed to learn (i.e., determination block 1206="No"), or in response to the floor lamp performing the operations of blocks 1217 or 1214, the floor lamp may determine whether to return to a monitor mode in determination block 1220, such as based on an expired duration since entering the activated triggered mode with the operations in block 1203. De-activating the triggered mode may activate the monitor mode associated with the reflex. In response to the floor lamp determining that it should return to the monitor mode (i.e., determination block 1220="Yes"), the floor lamp may deactivate the triggered mode for the reflex in block 1222. In response to the floor lamp determining that it should not return to the monitor mode (i.e., determination block 1220="No") or when the operations of block 1222 have been performed, the floor lamp may continue obtaining events in block 1102 of method 1100 as described above with reference to FIG. 11.

As an illustration based on the scenario shown in FIG. 6, a wall switch may send a new event report message with new occurrence data that is received by the floor lamp (e.g., a wall switch 'on' event). The floor lamp may perform the operations of blocks 1102, 1104, 1108, and 1110 until it generates a first pattern (e.g., pattern MD1) associated with the event based on the received new event report message. Within the same time window, the floor lamp may generate a second pattern (e.g., pattern MD2) based on other occurrence data, and may process the second pattern with the operations in blocks 1102-114 as described above with reference to FIG. 11 and blocks 1202, 1203, 1204, 1216 as described above with reference to FIG. 12. The floor lamp may place a second reflex (e.g., ReflexF1) associated with the second pattern in a triggered mode based on these operations.

The floor lamp may then perform the operations in blocks 1102, 1104, 1108, and 1110 as described above with reference to FIG. 11 until it generates the first pattern (e.g., pattern MD1) associated with the event based on the received new event report message. The floor lamp may continue to process the new pattern by performing the operations of blocks 1112, 1114, 1116, 1118, 1119 as described above with reference to FIG. 11, creating a first reflex (e.g., ReflexF2) with the first pattern as its trigger pattern (e.g., pattern MD1) and copying its action, reward, and correction patterns from the second reflex (e.g., ReflexF1) as the second reflex is in its triggered mode.

If the floor lamp subsequently obtains the same event and generates the first pattern (e.g., pattern MD1) based on other data received from the wall switch, the floor lamp may process the first pattern with reference to the first reflex in the operations of blocks 1102, 1104, 1108, 1110, 1112, and 1114 as described above with reference to FIG. 11. In determination block 1114, the floor lamp may determine that the generated pattern (e.g., pattern MD1) associated with the wall switch matches a known pattern because the pattern associated with the wall switch is now known as a trigger pattern of the first reflex (e.g., ReflexF2) stored in memory. Thus, the floor lamp may continue to perform the operations described above with reference to FIG. 12 for continued processing of the generated pattern for the wall switch 'on' event.

Continuing with the illustration, the floor lamp may process the matched first pattern (MD1) from the new wall switch event and determine that the matched pattern is a trigger pattern match (i.e., determination block 1202="Yes") and may activate the triggered mode for the first reflex (e.g., ReflexF2). However, the trigger weight for the first reflex (e.g., ReflexF2) may be below its trigger threshold, in which case the floor lamp will not generate an action in block 1216 but instead may continue to monitor for other events/patterns. On the other hand, the floor lamp may encounter a different trigger event, such as an 'on' event from the lamp switch 126. The floor lamp may process the on-event from the lamp switch 126 through blocks 1102, 1104, 1108, and 1110 of method 1100 as described above with reference to FIG. 11, generating the second pattern (e.g., pattern MD2) associated with the on-event of the lamp switch 126. The floor lamp may continue processing the on-event pattern through the operations of blocks 1112, 1114 and 1202 as described above with reference to FIG. 11 and FIG. 12. In determination block 1202 of method 1200, the floor lamp may determine that the second patter (MD2) is a trigger pattern match for the second reflex (ReflexF1), and in determination block 1204 determine that the trigger weight for the second reflex is above a threshold value. In that case, based on the trigger weight of the second reflex, the floor lamp may generate an action pattern and associated action (e.g., turning on the light) in block 1216 as described above with reference to FIG. 12. By turning on the light, the floor lamp may generate a reward event and a subsequent reward pattern (e.g., pattern MD4) in block 1110 as described above with reference to FIG. 11. The floor lamp may process the reward pattern through methods 1100 and 1200 as described above until in determination block 1208 the floor lamp determines that the generated reward pattern (MD4) matches the reward pattern of the first reflex (ReflexF2). The floor lamp may adjust the weights associated with ReflexF2 by increasing its trigger weight and storing the adjustment in memory 138, thereby learning the association between the on-event at wall switch and the on-event at floor lamp. This process may be repeated by the floor lamp until the trigger weight of the first reflex (e.g., ReflexF2) is above the trigger threshold, such as shown in FIG. 9.

The embodiment methods described above with reference to FIGS. 11 and 12 may function as a type of recursive algorithm, since events are obtained and buffered for a time window, any number of events may be obtained during the time window, and processing of buffered events to identify matched patterns and learn new correlations or reflexes may encompass multiple events and combinations of events and reflexes. In order to further disclose how the embodiments may function to enable a user to train embodiment smart boxes and learning devices, the following example of user actions implementing such devices is provided. In this example, a user trains two learning devices, namely a wall switch and a floor lamp, that have not been previously associated with one another. For ease of description, the following references to the floor lamp or wall switch are meant to encompass their associated smart boxes.

In this example, each of the floor lamp and wall switch may have a predefined reflex stored in the memory of their associated smart box. For example, the wall switch may have a predefined reflex, ReflexW, stored in memory that may include a trigger pattern, 'WT', an action pattern, 'WA', a correction pattern, 'WC', and a reward pattern, 'WR'. The trigger pattern, WT, may correspond to a trigger event where a user toggles the wall switch from 'off' to 'on'. When the user toggles the wall switch from 'off' to 'on', the wall switch may generate an event as well as broadcast an event report message including occurrence data related to the 'on' event. From the generated event related to the wall switch's 'on' event, a smart box included within or coupled to the wall switch may generate the trigger pattern WT. Initially, the action pattern, WA, may not correspond to a real life action such as toggling a switch. Instead, WA may simply be computer code ready to be assigned to future reflexes.

The correction pattern WC may correspond to a button on the wall switch labeled "Correction." When a user presses the correction button, the wall switch may generate a correction event as well as broadcast another event report message with occurrence data indicating the correction event. From the generated correction event, the smart box associated with the wall switch may generate the correction pattern WC. The reward pattern, WR, may correspond to an event in which the user presses a reward button on the wall switch labeled "Reward." When the user presses the reward button, the wall switch may generate a reward event as well as broadcast another event report message with occurrence data indicating the reward event. From the generated reward event, the smart box associated with the wall switch may generate the reward pattern, WR.

Similarly, the floor lamp may have a predefined reflex, ReflexF2, stored in memory that may include a trigger pattern, MD1, an action pattern, MD3, a correction pattern, MD5, and a reward pattern, MD4. The trigger pattern, MD1, may correspond to a trigger event in which the user toggles a lamp switch of the floor lamp from off to on. When the user toggles the lamp switch from 'off' to 'on', the wall switch may generate a trigger event as well as broadcast an event report message with occurrence data indicating the lamp's 'on' event. From the generated trigger event, a smart box included within or coupled to the floor lamp may generate the trigger pattern MD1. The action pattern, MD3, may correspond to an event in which the floor lamp turns its light from 'off' to 'on'. The correction pattern, MD5, may correspond to an additional button on the floor lamp labeled "Correction" when the floor lamp is in a triggered mode. When a user presses the correction button, the lamp may generate a correction event as well as broadcast an event report message with occurrence data indicating the lamp's correction event. From the generated correction event, the smart box associated with the floor lamp may generate the correction pattern MD5. The reward pattern, MD4, corresponds to when the user turns on the floor lamp within the triggered mode, generating a reward event as well as broadcasting an event report message with occurrence data indicating the lamp's reward event. From the reward event, the smart box associated with the floor lamp may generate the reward pattern MD4.

With the wall switch and floor lamp initially configured in this manner, a user may train the floor lamp to turn on in response to the wall switch as follows. With the wall switch in the 'off' position and the floor lamp turned off, the user may turn on the wall switch and promptly turn on the floor lamp via manual operations (e.g., flipping switches on the devices). If the two actions are accomplished within a short time period (e.g., 5 to 10 seconds), the smart box associated with the floor lamp may begin to learn the turn-on action correlation by increasing a weight associated with the lamp-on reflex. Similarly, the user may teach the floor lamp to respond to the wall switch being turned off by turning off the wall switch and promptly turning off the floor lamp. Again, if the two actions are accomplished within a short time period (e.g., 5 to 10 seconds), the smart box associated with the floor lamp may begin to learn the turn-off action correlation by increasing a weight associated with the lamp-off reflex.

One such training cycle may not be enough (except in some embodiments in which a previously untrained smart box will learn a first reflex-event correlation in a single step), so the user may repeat the process of turning on the wall switch and promptly turning on the floor lamp, followed a while later by turning off the wall switch and promptly turning off the floor lamp. This series of steps may need to be repeated three or more times, depending upon the learning hysteresis configuration of the smart box associated with the floor lamp.

After two, three or more repetitions, the smart box associated with the floor lamp may have increased the weight associated with the lamp-on and lamp-off reflexes such that a subsequent toggle of the wall switch will cause the floor lamp to turn on or off accordingly. Thus, to train this desired correlation of the wall switch on/off events to the floor lamp on/off actions, the user may simply repeat the process until the floor lamp begins turning on in response to the user toggling the wall switch.

This series of actions by the user causes the following actions to occur within the smart boxes associated with the wall switch and the floor lamp. When the smart box associated with the wall switch senses the 'off' to 'on' toggle, the wall switch may generate a trigger event and associated occurrence data that may be broadcast in an event report message for all learning devices within its broadcast range (e.g., 100 feet) to receive. The smart box associated with the floor lamp, being within the broadcast range of the wall switch, may receive the event report message. Upon receipt, the floor lamp may generate a related event and determine whether an event filter stored in memory prevents further processing of the generated event. In a default state, the floor lamp may not apply a filter to the generated event, thus the floor lamp may store the generated event in a buffer. Based on the generated event, the floor lamp may generate the pattern MD2.

Initially, the floor lamp only has stored patterns associated with ReflexF2 in memory (e.g., MD1, MD3, MD5, and MD4). It is assumed for the purposes of this example that the floor lamp is already within a triggered mode for ReflexF2, such as in response to generating the trigger pattern for ReflexF2, pattern MD1, within the same time window as generating the pattern MD2. As the generated pattern MD2 does not match any pattern of the ReflexF2, the generated pattern MD2 may be considered an unknown pattern that may be used as a trigger pattern for a new reflex. The floor lamp may determine whether to create a new reflex with the unknown or unmatched pattern MD2. The floor lamp may have many different reasons to not create a new reflex. For example, the floor lamp may be in a learning prevention mode (e.g., a hold mode) or the floor lamp may be prohibited from creating reflexes from certain patterns associated with a particular device (e.g., the floor lamp will not create reflexes from patterns associated with the wall switch).

In this example the floor lamp is not prevented from creating a new reflex, so the floor lamp may create a new reflex, ReflexF1, with the unknown pattern, MD2, as its trigger pattern. The new reflex, ReflexF1, will include an action pattern, a correction pattern, and a reward pattern to be a complete reflex. Thus, the floor lamp may use patterns from the only known reflex in a triggered mode, ReflexF2, by copying the action, correction, and reward patterns that it has stored in memory (e.g., MD3, MD5, and MD4) and assign those patterns to the new ReflexF1 along with the new trigger pattern MD2. Depending on the settings of the floor lamp, the floor lamp may have just learned a new association between the trigger event related to the wall switch toggling on and the activation of the floor lamp's light. For example, the floor lamp may be in a critical learning period 801 (as shown in FIG. 8) in which the floor lamp learns new reflexes immediately (e.g., a single on/off sequence performed on the floor lamp). Thus, the floor lamp may activate its light once the wall switch toggles from 'off' to 'on'. However, for the purpose of this example, it is assumed that the floor lamp is not in a critical period and has yet to fully learn the association between the wall switch toggle from 'off' to 'on' and activating the light of the floor lamp.

When the user turns on the floor lamp shortly after toggling the wall switch, the smart box associated with the floor lamp may correlate that lamp-on event with the new reflex, ReflexF1, with the recently learned pattern, MD2, as its trigger pattern. The actions of the wall switch being turned off and the floor lamp being turned off soon thereafter may generate similar responses in the wall switch and floor lamp.

When the wall switch is toggled a second time from 'off' to 'on', the associated occurrence data of the on event may again be broadcast in an event report message and received by the floor lamp. Again the floor lamp may process the related event report message with the occurrence data, generating an event and eventually pattern MD2. However, this time the floor lamp matches generated pattern MD2 to the known pattern of ReflexF1. In response to this matching, the floor lamp may also determine that there is a match between pattern MD2 and the stored trigger pattern of ReflexF1 and may enter triggered mode with respect to ReflexF1. Further, the floor lamp may determine whether the trigger weight of ReflexF1 is equal to or above the trigger weight threshold. In this example after only one training cycle, the floor lamp may determine that the trigger weight of ReflexF1 is not equal to or above the trigger weight threshold because ReflexF1 is a new reflex. Thus, the floor lamp may continue to monitor for more events while in the triggered mode for ReflexF1.

When the user turns on the floor lamp within the 5-10 second time window, the floor lamp may generate a reward event which eventually causes the floor lamp to generate reward pattern MD4. The floor lamp processes MD4 and determines that there is a reward pattern match with ReflexF1. In response, the floor lamp, still in the triggered mode with respect to ReflexF1, may increase the trigger weight of ReflexF1. After adjusting the weights or after the 5-10 second time window, the floor lamp may exit the triggered mode with respect to ReflexF1 and enter a monitoring mode where the floor lamp monitors for more events.

Sometime later, the user may toggle the wall switch to on a third time again causing the wall switch to broadcast an event report message with occurrence data that is received by the floor lamp. Again, based on data in the received message, the floor lamp may generate a related event and then pattern MD2. The floor lamp may determine that there is a trigger match between generated pattern MD2 and the trigger pattern of ReflexF1 and may enter the triggered mode with respect to ReflexF1 for a third time. Once again, the floor lamp may determine whether the trigger weight of ReflexF1 is equal to or above the trigger weight threshold. For a third time, the floor lamp may determine that the trigger weight of ReflexF1 is not equal to or above the trigger weight threshold because ReflexF1 is a new reflex. Thus, the floor lamp continues to monitor for more events while in the triggered mode.

Still within the 5-10 second time window of the recent triggered mode of ReflexF1, the user may turn on the floor lamp for third time. In response the floor lamp generates the reward event which eventually causes the floor lamp to generate reward pattern MD4. The floor lamp may process pattern MD4 and determine that there is a reward pattern match with ReflexF1. The floor lamp still in the triggered mode with respect to ReflexF1 may increase the trigger weight of ReflexF1 above the trigger threshold.

Sometime later, when user toggles the wall switch from 'off' to 'on' for a fourth time the same sequence of events occurs, only this time the floor lamp may determine that the trigger weight of ReflexF1 is equal to or above its threshold and therefore it generates the action pattern MD3. In response to the action pattern MD3, the floor lamp may generate an associated action event that energizes a motor controller that turns on the light of the floor lamp. Thereafter, the floor lamp will be turned on in response to the user toggling the wall switch from 'off' to 'on'.

FIGS. 13A-13C, 14-16, and 17A illustrate embodiment methods for a teacher signaling device to broadcast signals that teach nearby learning devices (or smart boxes). As described above, the teacher signaling device may be a proxy device that enables a user to teach learning devices without actually having to physically interact with the learning devices. For example, instead of a user continually turning on a smart wall switch and then a smart lamp to teach the lamp to associate the wall switch with the lighting functionality, the user may simply allow the teacher signaling device to emulate these interactions by transmitting signals that indicate the smart wall switch and smart lamp have turned on without any physical action actually occurring.

Figure 13A:
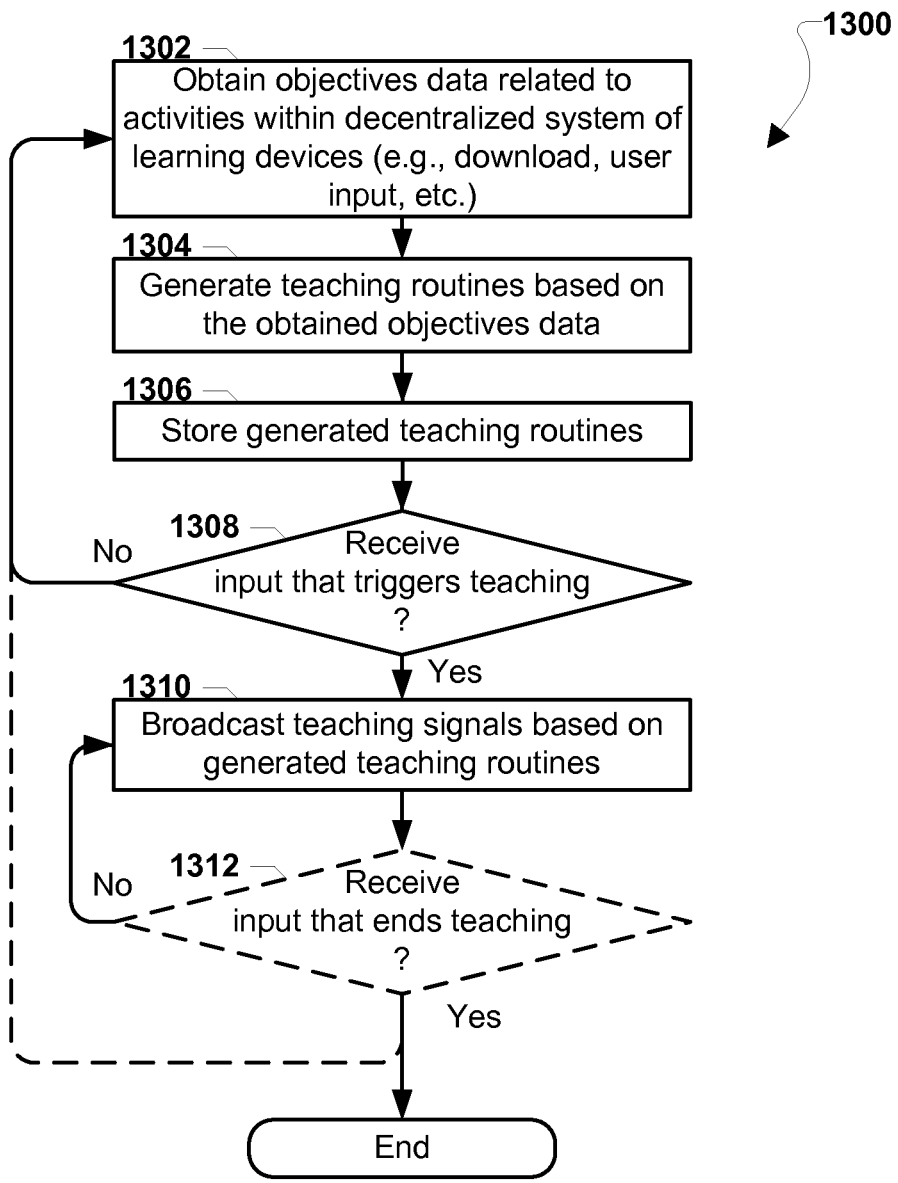
FIGS. 13A-13C are process flow diagrams illustrating embodiment methods for a teacher signaling device to broadcast signals based on teaching routines generated from obtained objectives data.
Figure 13B:
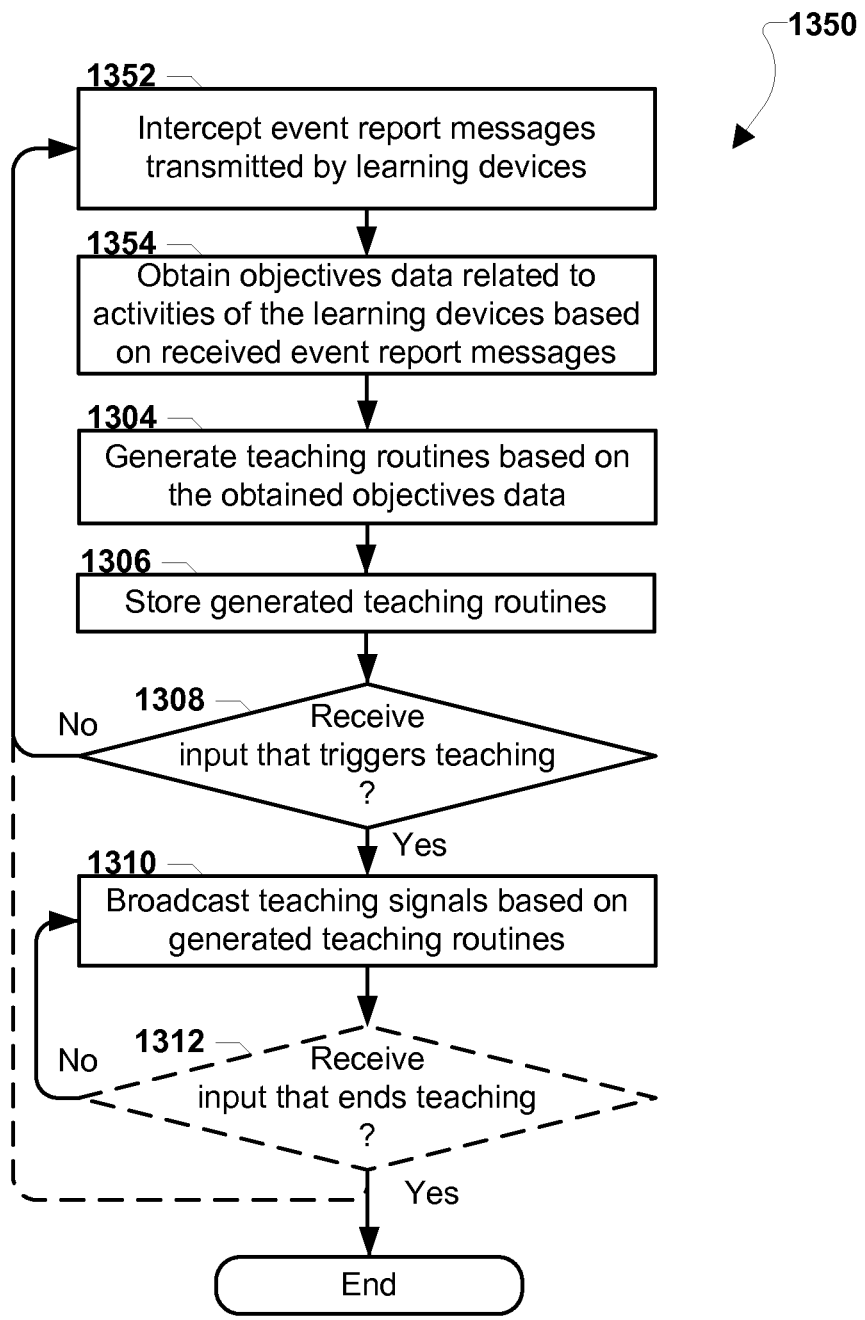
Figure 13C:
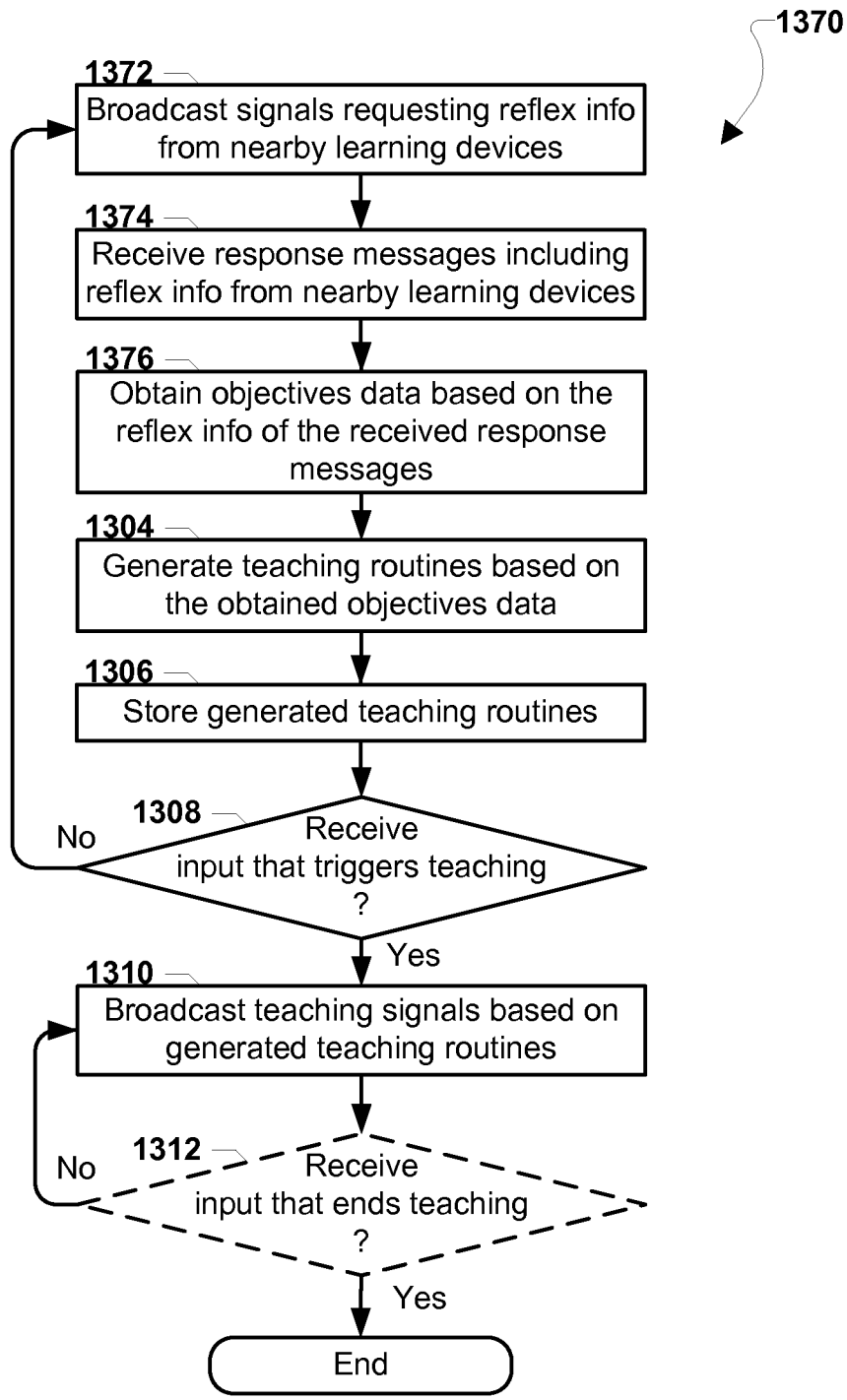

In order to conduct such proxy teaching operations, the teacher signaling device may need to be programmed with objectives, conditions, goals, or other scenarios a user desires to be accomplished by learning devices in a location. For example, the user may want smart devices in a smart house to operate in an energy efficient manner to save power, a smart lamp to turn on whenever he/she enters a room, smart blinds to close based on different temperatures during various seasons, and other behaviors the user desires. FIGS. 13A-13C illustrate various embodiments for the teacher signaling device to obtain such data (i.e., objectives data) and generate routines to teach learning devices to accomplish objectives (i.e., teaching routines).

With reference to FIG. 13A, in block 1302, the processor of the teacher signaling device may obtain data related to the activities of one or more learning devices within a decentralized system. For example, the teacher signaling device may download expert lighting specifications from a remote source (e.g., a web server). As another example, the teacher signaling device may receive objectives data via user button presses on a user interface that indicate the user's desire for a certain behavior of smart blinds to be achieved in a room. Objectives data may be obtained in various other manners, such as further described below with reference to FIGS. 13B-13C.

Objectives data may include scripts, commands, specifications, device relationships, directions, instructions, user preferences or settings, operating parameters, general goal statements, and other information that describes how the user may desire the system of learning devices to behave. For example, objectives data may include a list of suggested light intensities in relation to times of day, seasons, user moods, user horoscope, and age. As another example, objectives may include a user preference that indicates the user likes to hear rock music in the morning when he/she gets ready for work but classical music when he/she returns home from work. In some embodiments, objectives data may include explicit actions for devices, and further may also include explicit triggers for device actions. For example, a script may include instructions for a smart stereo to turn to Channel 'A'. As another example, a user-defined script may indicate that the smart stereo should turn to Channel 'A' whenever it is after 5:00 PM and the user opens the front door. Such explicit objectives data may or may not include device identifiers (e.g., "John's Stereo," a device serial number, etc.), and further may or may not include device class identifiers (e.g., a generic smart stereo device, a generic smart lamp, etc.). In some embodiments, objectives data may include data describing reflexes for learning devices and/or individual patterns/events (e.g., trigger pattern, action pattern, correction pattern, and reward patterns).

In block 1304, the processor of the teacher signaling device may generate teaching routines based on the obtained objectives data. The teacher signaling device may analyze, process, and otherwise evaluate the various objectives data to determine the behaviors or goals desired by the user as well as how to transmit teaching signals to cause learning devices in the system to accomplish these goals. For example, based on security goals of the user, the teacher signaling device may generate teaching routines for teaching smart blinds to learn to close after a certain hour of the day when the user is at home. As another example, based on expert lighting information, the teacher signaling device may generate teaching routines for teaching smart lamps within a living room to dim or intensify their light output at certain times of the day. In some embodiments, the teacher signaling device may be configured to perform various processing operations on the obtained objectives data when generating teaching routines, such as natural language processing and/or speech-to-text processing. In other embodiments, goals of the user may be explicitly indicated by codes or other indicators in the objectives data. For example, a downloaded script may include a code known to indicate that any lights should be turned off after a certain time of day.

In some embodiments, the teacher signaling device may be configured with data indicating the type or class of learning device that is suitable for achieving various types of objectives or goals, as well as the predefined actions or functionalities that are capable of being performed by various learning devices. For example, the teacher signaling device may store a data table that associates types of device classes, device specifications, manufacturers, and/or brands of learning devices to various topics or goals (e.g., lighting, heating, entertainment, etc.). With such data, the teacher signaling device may determine what learning devices and their functions to be taught to achieve goals indicated in the obtained objectives data. For example, to achieve a security objective, the teacher signaling device may determine that a smart blind that is known to be able to learn to open/close should be taught via recurrent, timed broadcast signals.

Teaching routines may be instruction sets that may be performed by the teaching signaling device to accomplish the goals indicated by the obtained objectives data. In particular, teaching routines may include detailed instructions for how and when the teacher signaling device may transmit teaching signals to be received by learning devices. Teaching routines may indicate the time of day, the signal strength, the broadcast frequency, the included data (e.g., codes, packets, identifiers, etc.), the formatting, and other specific information about teaching signals related to the obtained objectives data. For example, the generated teaching routines may indicate that the teacher signaling device should broadcast a first teaching signal that includes data (i.e., occurrence data) that indicates a smart lamp has turned on and a second teaching signal that a smart wall switch has been flipped on.

In various embodiments, generated teaching routines may include schedules and instructions for the teacher signaling device to transmit teaching signals that are similar to event report messages as described above. In other words, teaching routines may instruct the teacher signaling device how and when to transmit event report messages without any actual occurrences. For example, although a smart wall switch is not physically flipped on by a user, based on the generated teaching routine, the teacher signaling device may be instructed to transmit a teaching signal that is formatted as an event report message reporting that the smart wall switch has been flipped on.

The generated teaching routines may include instructions for the teacher signaling device to perform periodically. In other words, teaching routines may include "teaching sessions." Accordingly, the generated teaching routines may indicate the number of repetitions and time interval between repetitions for the teacher signaling device to transmit teaching signals. For example, the generated teaching routines may instruct the teacher signaling device to broadcast a teaching signal once every minute for an hour each day. As another example, the generated teaching routines may instruct that a teaching signal indicating a stereo-class smart device has been turned on should be broadcast every hour on the hour. In block 1306, the processor of the teacher signaling device may store the generated teaching routines, such as in a database within non-volatile storage or memory.

In some embodiments, obtained objectives data may include pre-existing teaching routines, such as a schedule of particular teaching signals to be transmitted for a known system of learning devices. For example, the user may utilize an application that receives user preference data and information indicating the type of learning devices available in the system to generate a teaching routine that may be downloaded into the teacher signaling device. In such a case, the teacher signaling device may or may not need to process or otherwise analyze the obtained objectives data in order to determine how and when to transmit teaching signals.

In determination block 1308, the processor of the teacher signaling device may determine whether an input is received that triggers teaching operations by the teacher signaling device. In other words, the teacher signaling device may determine whether it may begin executing instructions, such as transmitting teaching signals, as indicated by the generated teaching routines. The input may be a predefined signal that is received at the teacher signaling device. For example, the teacher signaling device may monitor for a predefined wireless signal (e.g., a "start" signal received via a Bluetooth connection, etc.). In some embodiments, the input may be an event report message from a nearby learning device. Alternatively, the input may be a user input, such as a press on a button or other element of a user interface coupled to the teacher signaling device (e.g., a graphical user interface button press on a touch screen connected to the teacher signaling device, a tactile button press on the housing of the teacher signaling device, etc.). In other embodiments, the teacher signaling device may receive a message via Internet protocols that triggers teaching operations. For example, the teaching operations may be initiated based on a received message received from a communications server (e.g., a server related to a web site or portal) over the Internet.

In response to the teacher signaling device determining it has not received an input that triggers the teaching operations (i.e., determination block 1308="No"), the teacher signaling device may continue with the operations in block 1302 for obtaining additional objectives data that may be used to generate teaching routines. However, in response to the teacher signaling device determining it has received an input that triggers the teaching operations (i.e., determination block 1308="Yes"), in block 1310, the processor of the teacher signaling device may broadcast teaching signals configured to teach one or more of the learning devices based on the generated teaching routines. For example, using time intervals described by the teaching routines, the teacher signaling device may transmit teaching signals that indicate a smart wall switch has been flipped on and/or that a smart lamp has been turned on.

In optional determination block 1312, the processor of the teacher signaling device may determine whether another input is received that ends the teaching operations by the teacher signaling device. The other input may be similar to the input described above with reference to the operations in determination block 1308, except that the another input may indicate the teacher signaling device may end teaching operations. For example, a user may press a "Stop" button on the teacher signaling device or the teacher signaling device may receive a wireless signal that is predetermined to mean teaching signals may no longer be broadcast. The operations in optional determination block 1312 may be optional as the generated teaching routines may indicate the exact time or condition with which the teacher signaling device may end its teaching. For example, no input may be needed to stop the teacher signaling device when a teaching routine instructs the transmission of a set number of teaching signals to be broadcast only one time. In response to the teacher signaling device determining it has not received an input that ends the teaching operations (i.e., optional determination block 1312="No"), the teacher signaling device may continue with the operations in block 1310 for broadcasting teaching signals based on the generated teaching routines. In other words, when the teacher signaling device has not been instructed or otherwise identified that broadcasting teaching signals should be stopped, the teacher signaling device may continue performing the operations in block 1310 as successive teaching sessions. For example, the teacher signaling device may broadcast the teaching signals at a later time of day or alternatively in a continuous manner. In response to the teacher signaling device determining it has received an input that ends the teaching operations (i.e., optional determination block 1312="Yes"), then the method 1300 may end. In other embodiments, the teacher signaling device may continue with the operations in block 1302 regardless of whether it receives an input that ends the teaching operations (i.e., optional determination block="No" or "Yes").

FIG. 13B illustrates an embodiment method 1350 for a teacher signaling device to broadcast signals based on teaching routines generated with data obtained from intercepted signals. The method 1350 may include operations similar to those described above with reference to the method 1300 of FIG. 13A, except that method 1350 may further include operations for obtaining data for generating teaching routines by observing (or intercepting) event report messages in real-time. In other words, the teacher signaling device may be configured to observe how the learning devices in a location actually respond to triggers, such as user interactions, and generate teaching routines based on these observations. For example, objectives data may be obtained from the two event report messages that are broadcast when a user flips a smart wall switch to 'on' and turns on a smart lamp. This scheme may be valuable for replicating the user's interactions with learning devices when the learning devices require multiple repetitions before actually learning the act but the user is unavailable to repeatedly perform his/her interactions.

In block 1352, the processor of the teacher signaling device may intercept event report messages transmitted by learning devices. For example, the teacher signaling device may be configured to continually monitor for wireless signals (e.g., Bluetooth, WiFi, RF, etc.) that utilize a code or other information indicating they include information about recent occurrences at the learning devices (e.g., state changes, inputs received, actions performed, etc.). In block 1354, the processor of the teacher signaling device may obtain objectives data related to the activities of the learning devices based on the received event report messages. The teacher signaling device may utilize a time window to group or otherwise associate event report messages that are related to a trigger-action relationship intended to be taught by a user's interactions. Such a time window may be similar to that used by learning devices (or smart boxes) as described above. For example, the teacher signaling device may group event report messages received within a window of 5-10 seconds. In this way, the teacher signaling device may determine the objectives of a user (e.g., teach a smart lamp to turn on when a wall switch is flipped, teach smart blinds to close when it is above a certain temperature outside, etc.) based on what actually transpired as reported in event report messages. In other embodiments, the teacher signaling device may not be configured to process or group event report messages, but instead may simply record the exact time and type of messages received to generate a script for replicating the received event report messages. For example, the teaching routines based on the received event report messages may essentially be a log of the various event report messages received over a period of time.

The teacher signaling device may continue with the operations in blocks 1304-1312 as described above with reference to FIG. 13A, and may optionally continue with the operations in block 1352 when an input is received that ends teaching operations (i.e., optional determination block 1312="Yes"). However, unlike as described above with reference to FIG. 13A, the teacher signaling device may continue with the operations in block 1352 when the teacher signaling device determines that no input is received that triggers teaching (i.e., determination block 1308="No").

FIG. 13C illustrates an embodiment method 1370 for a teacher signaling device to broadcast signals based on teaching routines generated with data received from learning devices. The method 1370 may include operations similar to those described above with reference to the method 1300 of FIG. 13A, except that method 1370 may further include operations for obtaining reflex information from nearby learning devices (e.g., smart boxes) in a system. In other words, the teacher signaling device may be configured to download or otherwise receive the trigger-action associations (as well as trigger weights) from each of the nearby learning devices. By obtaining already existing learned associations, the teacher signaling device may generate teaching routines for teaching other learning devices in other locations those same associations. For example, the teacher signaling device may duplicate the learned behaviors of a first set of smart blinds in one room in order to teach the same behaviors to a second set of smart blinds in another room.

In block 1372, the processor of the teacher signaling device may broadcast signals requesting reflex information from nearby learning devices. Such signals may include codes or other information (e.g., header information, etc.) that may be processed and identified by the nearby learning devices as requests to package and transmit data indicating their respective stored reflexes. In block 1374, the processor of the teacher signaling device may receive response messages including reflex information from the nearby learning devices. The reflex information may include data that indicates various trigger patterns, action patterns, reward patterns, and correction patterns used by the nearby learning devices. The reflex information may also include trigger weights and/or gain values associated with various patterns.

In block 1376, the processor of the teacher signaling device may obtain objectives data related to the reflexes of the learning devices based on the reflex information from the received response messages. In particular, the objectives data may be the associations between trigger patterns and action patterns defined within the reflex information received from the nearby learning devices. For example, based on received reflex information that indicates a smart lamp is configured to turn on in response to detecting a wall switch 'on' trigger pattern, the teacher signaling device may store the lamp's action in relation to the wall switch 'on' trigger pattern. The teacher signaling device may generate teaching routines that may be used to replicate the received reflex information in other locations, or alternatively to progress on-going learning with the responding learning devices. For example, the teacher signaling device may generate teaching routines based on the received reflex information that cause teaching signals to be broadcast that help the responding learning devices increase or decrease the trigger weights of their respective reflexes.

The teacher signaling device may continue with the operations in blocks 1304-1312 as described above with reference to FIG. 13A, and may optionally continue with the operations in block 1372 when the teacher signaling device determines an input is received that ends the teaching operations (i.e., optional determination block 1312="Yes"). However, unlike as described above with reference to FIG. 13A, the teacher signaling device may continue with the operations in block 1372 when it determines that no input is received that triggers teaching (i.e., determination block 1308="No").

Figure 14:
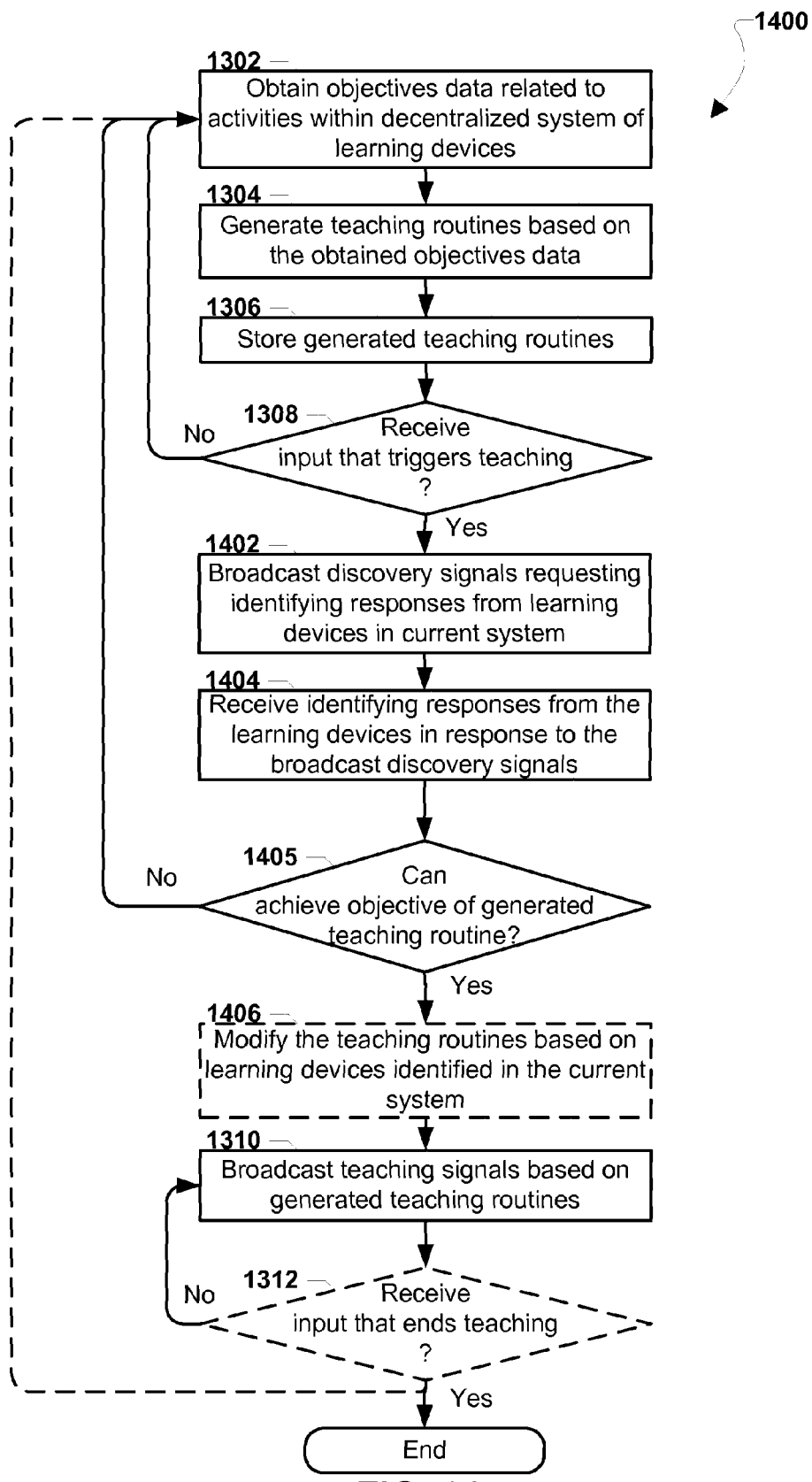
FIG. 14 is a process flow diagram illustrating an embodiment method for a teacher signaling device to discover nearby learning devices that may be targeted by teaching routines.

FIG. 14 illustrates an embodiment method 1400 for a teacher signaling device to discover nearby learning devices that may be targeted by teaching routines. Obtained objectives data may often describe goals or target conditions a user desires to be achieved in a location (e.g., a smart home), such as music the user wants to play when he/she comes home, or lighting schemes an expert recommends to reduce stress, etc. However, as learning devices in the location may be removed, added, or otherwise have their functionality changed (e.g., learning modes disabled, etc.), a teacher signaling device may need to survey the learning devices within the location prior to broadcasting teaching signals in order to best accomplish the objectives of a teaching routine. Accordingly, the operations of method 1400 are similar to those of the method 1300 described above, except that the method 1400 may include operations for the teacher signaling device to evaluate the nearby learning devices and determine whether learning routines can be modified to accomplish objectives.

The operations in blocks 1302-1308 may be as described above with reference to FIG. 13A. In block 1402, the processor of the teacher signaling device may broadcast discovery signals requesting identifying responses from the learning devices in current system. For example, the teacher signaling device may broadcast a signal that includes a script, code, or other indicator configured to cause receiving learning devices to transmit responsive messages that include their device identifier and/or an indicator of their device type or class type. In some embodiments, the discovery signals may also be configured to cause receiving learning devices to transmit information indicating whether they are currently in a learning mode, whether they are capable of being in a learning mode, as well as other data related to the learning devices' ability to generate new associations. For example, the discovery signal may include a code that when processed by a nearby smart lamp may cause the smart lamp to transmit a return message that includes a class identifier (e.g., smart lamp) and a code that indicates the smart lamp has only static reflexes incapable of being adjusted through teaching routines.

In block 1404, the processor of the teacher signaling device may receive the identifying responses from the learning devices in response to the broadcast discovery signals. One or more responses may be received that include device identifiers, device type (or class type) indicators, and other information indicating the functionalities and availability of nearby smart devices. For example, an identifying response may be received that indicates a smart lamp is present as well as that the smart lamp is capable of performing an "on" action, an "off" action, an "increase brightness" action, and a "decrease brightness" action. In some embodiments, the received responses may be transmitted by learning devices using the same format and/or signaling medium as the teacher signaling device utilizes for broadcasting the discovery signals (e.g., Bluetooth, etc.).

In determination block 1405, the processor of the teacher signaling device may determine whether the objective of the generated teaching routine can be achieved with the learning devices identified with the received responses to the discovery signals. In other words, the teacher signaling device may compare the type, number, and availability (or ability to be taught) of nearby learning devices to the generated teaching routine to determine whether there are sufficient capabilities in the current location for teaching a certain learned behavior. For example, the teacher signaling device may compare device types, brands, firmware versions, and other specific information within the generated teaching routine to specific information of nearby learning devices to determine whether an expert lighting, comfort mode, or eco-friendly environment may be achieved. As an example, when the generated teaching routine indicates teaching signals are to be sent to teach smart blinds to close in response to a high temperature reading in a room and, based on the received identifying responses, there are no smart blinds in the room, the teacher signaling device may determine whether there are other smart devices in the room that can be taught to cool the room in other ways (e.g., smart sky light cover closing, smart ceiling fan turning on, etc.). As another example, when the generated teaching routine indicates teaching signals are to be sent to teach smart blinds to close in response to a high temperature reading in a room, the teacher signaling device may determine that the teaching routine cannot be achieved when there are no smart devices in the room.

In response to the teacher signaling device determining the objective of the generated teaching routine cannot be achieve based on the received responses identifying the nearby learning devices (i.e., determination block 1405="No"), the teacher signaling device may continue with the operations in block 1302 for obtaining additional objectives data. In other embodiments, the teacher signaling device may end the method 1400 and/or transmit a message to a user device indicating the teaching routine may not be performed due to insufficient learning devices.

In response to the teacher signaling device determining the objective of the generated teaching routine can be achieved based on the received responses identifying the nearby learning devices (i.e., determination block 1405="Yes"), in optional block 1406, the processor of the teacher signaling device may modify the teaching routines based on the learning devices identified in the current system. In particular, the teacher signaling device may compare the type, number, and availability (or ability to be taught) of nearby learning devices to the generated teaching routine to determine whether adjustments are needed in order to accomplish the objective of the teaching routine. Such adjustments may include changing or translating codes within teaching signals to affect different types of learning devices than were originally indicated in the generated teaching routine. For example, the teacher signaling device may translate codes to be broadcast within teaching signals to include codes recognized by devices of a certain manufacturer or class of device (e.g., a Bluetooth device class, etc.). As a non-limiting example, a teaching routine may originally indicate that to get the temperature in a room cooler, teaching signals may need to be broadcast to teach smart blinds to close when a temperature sensor broadcasts a value above a predefined threshold. However, when smart blinds are not present in the current room, the teacher signaling device may change the teaching routine to include teaching signals for teaching smart lamps to dim their lights when the temperate exceeds a predefined value. In other words, the teacher signaling device may identify alternative learning devices to teach to achieve the same or similar objective of a pre-existing teaching routine. The teacher signaling device may continue with the operations in blocks 1310-1312 as described above with reference to FIG. 13A.

Figure 15:
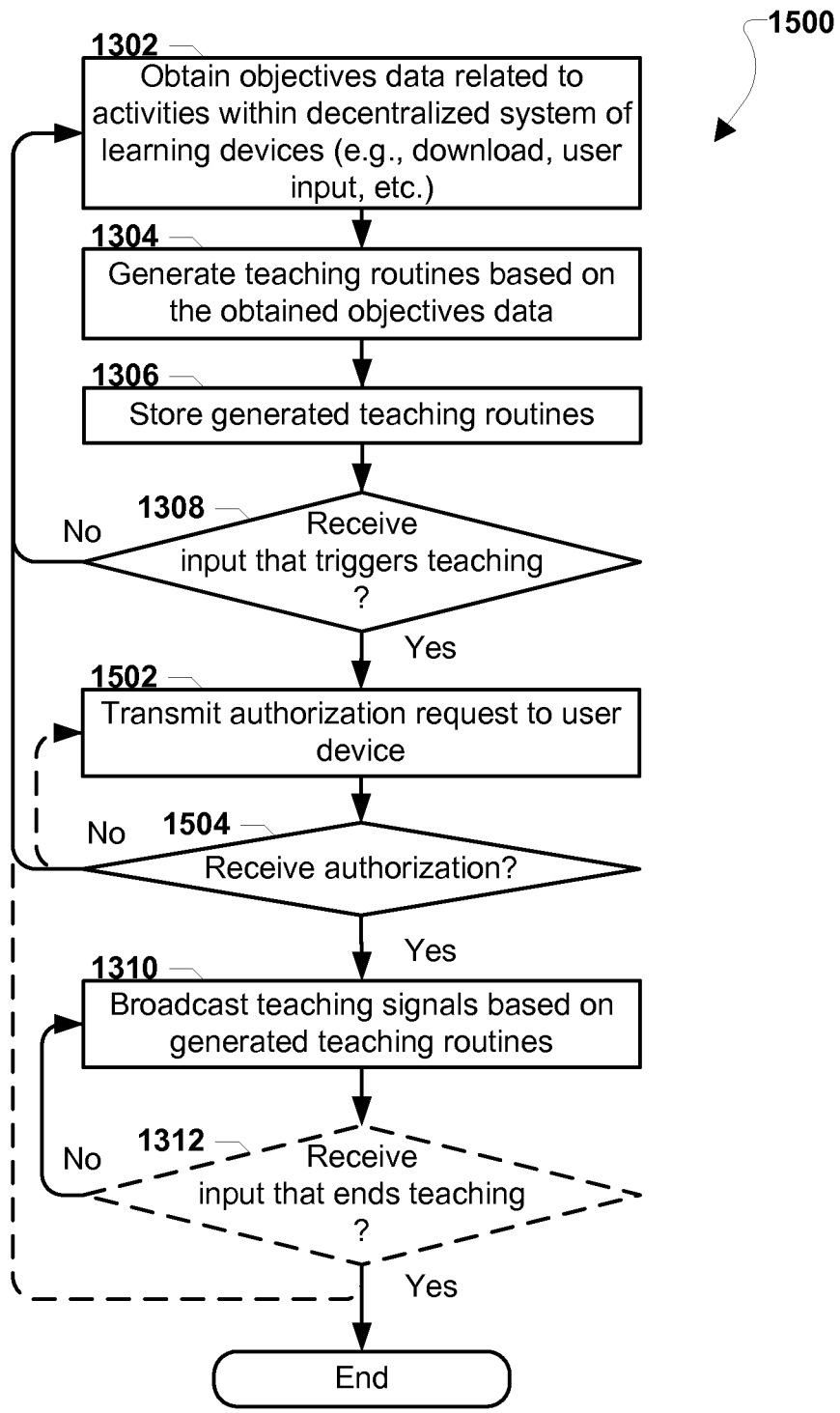
FIG. 15 is a process flow diagram illustrating an embodiment method for a teacher signaling device to request authorization from a user prior to broadcasting teaching signals based on teaching routines.

FIG. 15 illustrates an embodiment method 1500 for a teacher signaling device to request authorization from a user prior to broadcasting teaching signals. In many cases, a teacher signaling device may be configured to automatically perform teaching operations. For example, when sunlight shines into a house as detected by a light sensor and the temperature outside the house is reported by a heat sensor to be above a threshold value, an active teacher signaling device may teach smart blinds to close. However, users may desire to control when the teacher signaling device actively teaches learning devices in a location. For example, when the inside temperature of a house is above a predefined threshold value but there is no person in the house, a user may want to choose whether the teacher signaling device teaches smart windows to open. Accordingly, the operations of method 1500 are similar to those of the method 1300 described above, except that the method 1500 may include operations for the teacher signaling device to confirm with a user that teaching may be performed in a system. For example, in order to avoid unnecessary or unwanted teaching that may override actions personally performed by the user, the teacher signaling device may be configured to transmit a communication (e.g., email, text, automated audio call, etc.) to a device of the user (e.g., smartphone, laptop, etc.) that requests a confirmation response before proceeding with the teaching of learning devices.

The operations in blocks 1302-1308 may be as described above with reference to FIG. 13A. In response to the teacher signaling device determining that an input is received that triggers teaching (i.e., determination block 1308="Yes"), in block 1502, the processor of the teacher signaling device may transmit an authorization request to a user device. For example, the teacher signaling device may transmit a message that asks for permission to conduct teaching via a generated teaching routine related to the lights and/or heating/cooling of a house. As noted above, authorization requests may be any form of communication or messaging that may be transmitted by the teacher signaling device for receipt by user devices. For example, authorization requests may be emails, SMS/MMS text messages, application notifications, automated phone calls, and/or other communications delivered over a communication network (e.g., cellular network, WiFi local area network, etc.). The teacher signaling device may transmit the authorization request to pre-defined destination addresses (e.g., phone numbers, email addresses, etc.) that are locally stored within memory. In some embodiments, the teacher signaling device may be configured to render the authorization request, such as sounds or visuals emitted via speakers and/or screens coupled to the teacher signaling device. For example, a smartphone configured to operate as a teacher signaling device (e.g., via a teaching app) may render a pop-up window in an interface that requests the user to confirm a teaching procedure by pressing either a "Yes" or a "No" graphical user interface button.

In some embodiments, more than one authorization request may be transmitted to one or more users at a given time. For example, the teacher signaling device may transmit a first authorization request email to a first user (e.g., a wife homeowner) regarding teaching smart blinds in a television room and may transmit a second authorization request text message to a second user (e.g., a husband homeowner) regarding teaching smart blinds in the kitchen. Further, the teacher signaling device may be configured to include identifying information within such authorization requests, such as unique codes or keys, that may be locally stored at the device and used to evaluate subsequently received messages. For example, the teacher signaling device may compare a stored code to a code within header information of a received incoming message to determine whether the incoming message is a valid authorization response message. As another example, the teacher signaling device may match a first stored code to information in a first received authorization response message to determine that a first teaching routine may be performed (e.g., authorized to teach smart blinds when it's hot weather, etc.), and may match a second stored code to information in a second received authorization response message to determine that a second teaching routine may not be performed (e.g., not authorized to teach smart lights to dim when a television is turned on, etc.).

In various embodiments, the teacher signaling device may transmit authorization requests before transmitting teaching signals of a newly generated teaching routine. For example, after generating a new teaching routine based on a downloaded expert lighting guide from the Internet, the teacher signaling device may request authorization from the user that the new routine may be performed (e.g., the authorization request may be the message, "I'm about to teach the lights to dim when it gets hot based on a new teaching routine, may I go ahead?"). Alternatively, the teacher signaling device may transmit an authorization request prior to individual teaching sessions related to a teaching routine. For example, each day, the teacher signaling device may transmit an authorization request prior to broadcasting teaching signals related to the same teaching routine (e.g., the authorization request may be the message, "This is the second day of teaching the blinds to close when it gets hot, may I go ahead with this teaching session?").

In determination block 1504, the processor of the teacher signaling device may determine whether an authorization is received in response to transmitting the authorization request to the user device. The teacher signaling device may monitor an incoming message buffer to detect messages (i.e., authorization response messages) that include authorizing information from users. For example, the teacher signaling device may receive an authorization response message that includes a flag or bit that indicates an acceptance or rejection of a teaching routine. The teacher signaling device may compare locally stored information to data (e.g., header information) within incoming messages or signals to determine whether the incoming messages are both related to transmitted authorization requests and include acceptances or rejections. For example, the teacher signaling device may match a stored code associated with the transmitted authorization request to a code within a received incoming message (e.g., a request number, a device identifier, a teaching routine index, etc.). In some embodiments, the teacher signaling device may also evaluate other information within receiving message to detect keys, secret words, passwords, or other authenticating information that may be needed in order to verify an authorization response message. For example, a received authorization response message may be processed to determine whether it includes a password known only to the teacher signaling device and the user.

In response to the teacher signaling device determining that no authorization message is received (i.e., determination block 1504="No"), the teacher signaling device may continue with the operations for obtaining data in block 1302 as described above. In an optional embodiment, the teacher signaling device may be configured to continually transmit the authorization request to the user device and/or to other devices that are known to be associated with the user of the decentralized system of learning devices. For example, the teacher signaling device may store alternate cell numbers or email addresses for contacting the owner of a home including the learning devices to be taught by the teacher signaling device. However, in response to the teacher signaling device determining that an authorization message is received (i.e., determination block 1504="Yes"), the teacher signaling device may continue with the operations in blocks 1310-1312 (e.g., broadcasting teaching signals based on teaching routines, etc.) as described above with reference to FIG. 13A.

Figure 16:
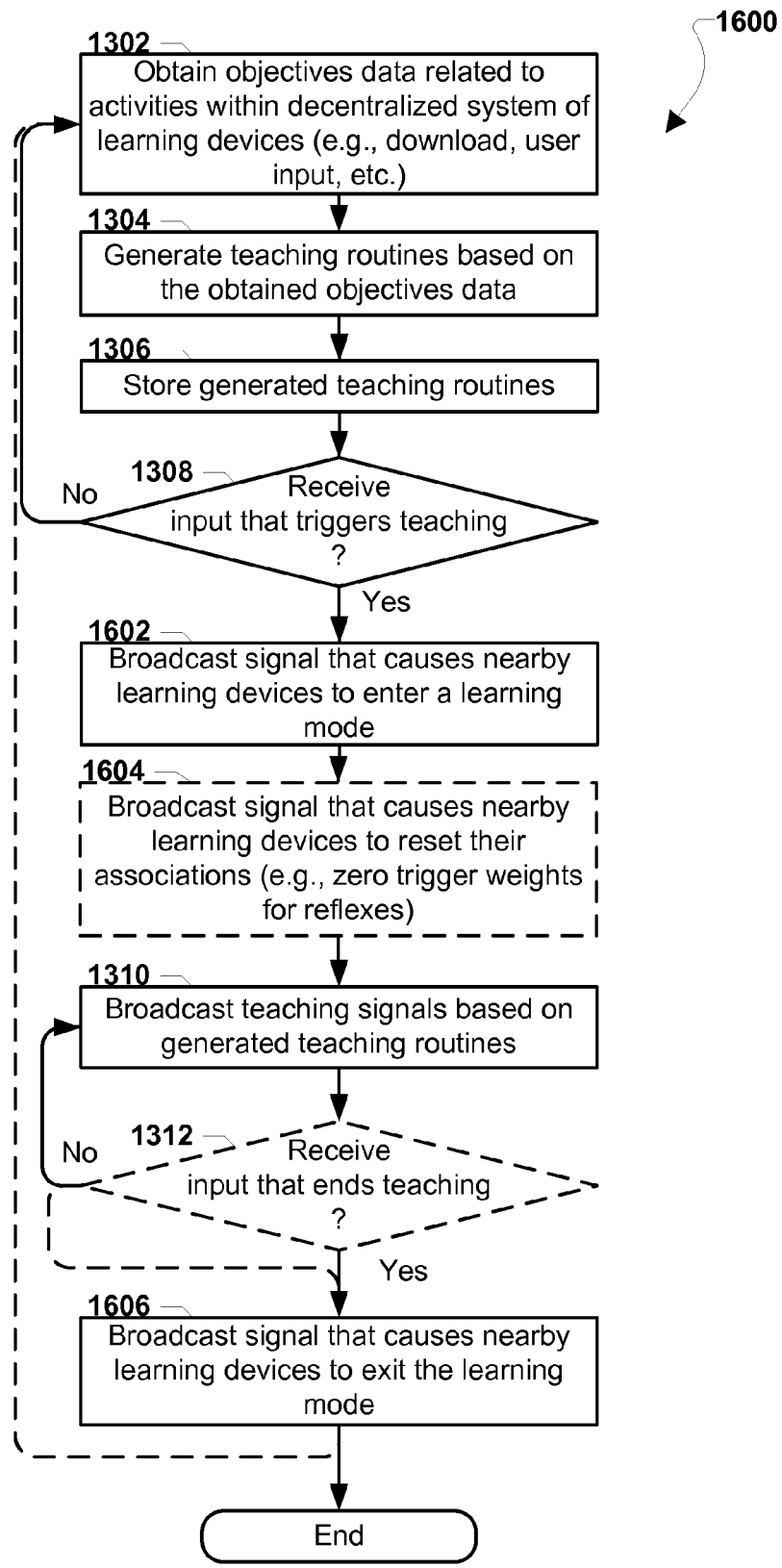
FIG. 16 is a process flow diagram illustrating an embodiment method for a teacher signaling device to broadcast signals that cause nearby learning devices to configure learning modes.

FIG. 16 illustrates an embodiment method 1600 for a teacher signaling device to broadcast signals that cause nearby learning devices to configure learning modes. In many cases, learning devices may be configured to utilize static or dynamic reflexes that define associations between triggers and their respective predefined actions. Such learning devices may also be configured to be in various modes of states of learning, such as critical and steady state learning periods as described above. In other to accomplish teaching with such learning devices, a teacher signaling device may be configured to transmit signals that modify the learning modes or capabilities of learning devices and their reflexes. Accordingly, the operations of method 1600 are similar to those of the method 1300 described above, except that the method 1600 may include operations for the teacher signaling device to directly control a setting or mode within nearby learning devices that enables their ability to generate reflexes and/or modify trigger weights based on teaching signals. In some embodiments, the teacher signaling device may utilize an auxiliary channel (or AUX channel) for transmitting signals that cause learning devices to activate (or deactivate) a learning mode and/or reset previously learned information (e.g., trigger weights).

The operations in blocks 1302-1308 may be as described above with reference to FIG. 13A. In response to the teacher signaling device determining that an input is received that triggers teaching (i.e., determination block 1308="Yes"), in block 1602, the processor of the teacher signaling device may broadcast a signal that causes nearby learning devices to enter a learning mode. For example, the signal may indicate a code or be in a format that receiving learning devices may identify as a command to activate or otherwise enter the learning mode.

In optional block 1604, the processor of the teacher signaling device may broadcast a signal (i.e., a reset signal) that causes the nearby learning devices to reset their associations (e.g., zero trigger weights for reflexes). For example, the signal may indicate a code or be in a format that receiving learning devices may identify as a command to rewind, delete, or nullify recent learned trigger weights such that the learning devices return to a previous state of operation. In some embodiments, learning devices may only reset learned behaviors (i.e., increased or decreased trigger weights for reflexes) that have been taught based on teaching signals from the teacher signaling device. In other words, the reset signal from the teacher signaling device may only be used to negate the effect of previous teaching signals but not any learning based on direct user interactions with the learning devices of a system. In some embodiments, the reset signal may include specific device types or device identifiers that may be commanded to reset learned information. For example, a reset signal may indicate that only smart blinds and not smart lamps should negate recent increases/decreases to their trigger weights. In various embodiments, such reset signals may indicate a particular time period of learning that should be negated in learning devices, such as by including data that indicates learning devices must remove all trigger weight adjustments to any reflexes affected within the last hour, day, week, etc. In some embodiments, the reset signal may cause learning devices to revert trigger weights to a factory default.

The teacher signaling device may broadcast teaching signals based on the generated teaching routines in block 1310 as described above, and in optional determination block 1312 may determine whether an input that ends the teaching has been received. The operations in optional determination block 1312 may be optional, as the teacher signaling device may be configured to perform operations associated with teaching for a predefined time period or number of iterations, and thus may not require an input indicating a time or condition for ceasing the teaching. In response to the teacher signaling device determining that no input is received that ends the teaching (i.e., optional determination block 1312="No"), the teacher signaling device may continue with the operations in block 1310 or alternatively may continue with the operations in block 1606.

In response to the teacher signaling device determining that an input is received that ends the teaching (i.e., optional determination block 1312="Yes"), in block 1606 the processor of the teacher signaling device may broadcast a signal that causes the nearby learning devices to exit the learning mode. For example, the signal may indicate a code or be in a format that receiving learning devices may identify as a command to de-activate or otherwise exit the learning mode. The teacher signaling device may then end the method 1600 or alternatively may continue with the operations in block 1302.

Figure 17A:
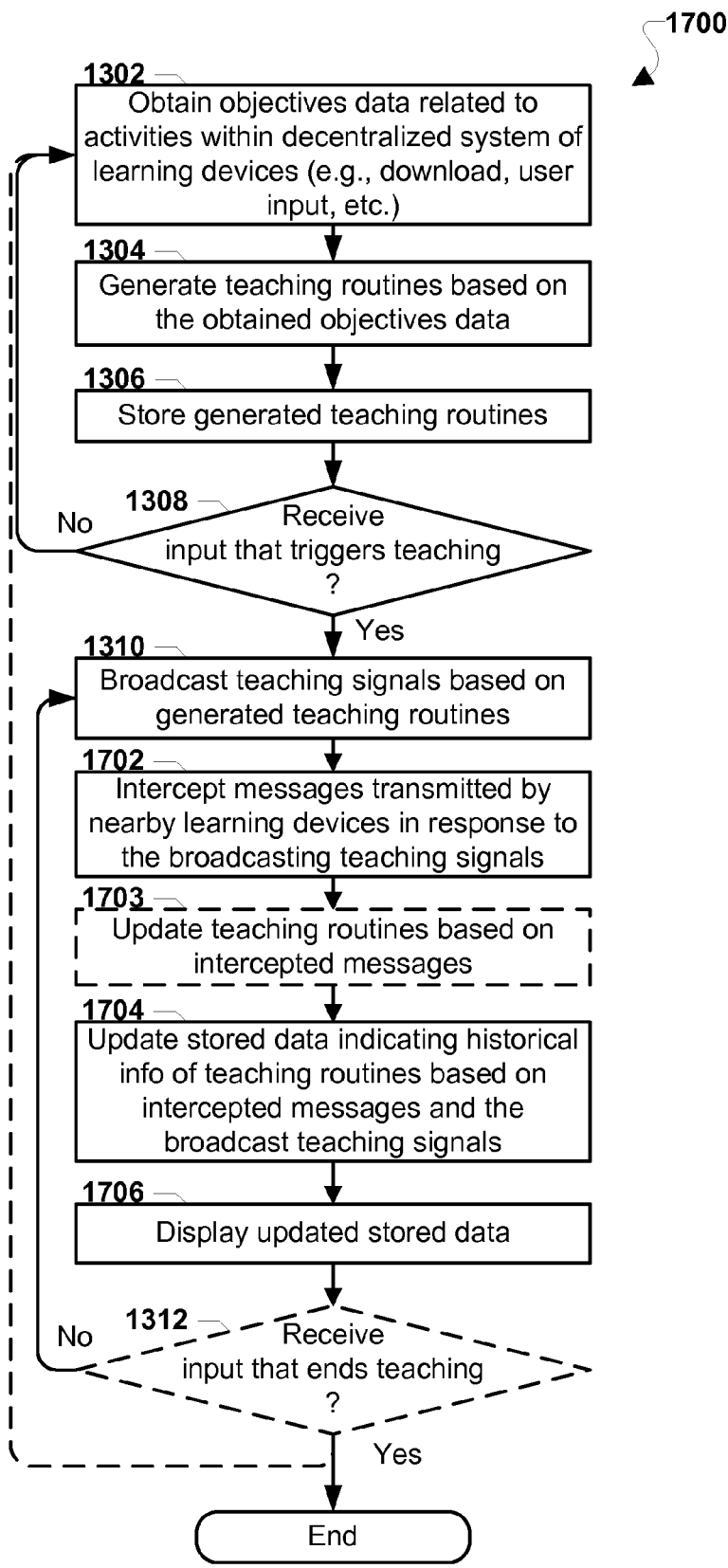
FIG. 17A is a process flow diagram illustrating an embodiment method for a teacher signaling device to intercept event report messages for updating information indicating the use of the teaching routines.

FIG. 17A illustrates an embodiment method 1700 for a teacher signaling device to intercept event report messages for updating information related to the use of the teaching routines. When deploying a teacher signaling device to teach learning devices in a system, the learning devices may change their behaviors over time. For example, after a certain number of received teaching signals, a smart lamp may learn to turn on in response to door opening or other occurrence within a location. Users may benefit from data indicating the results of teaching as well as the actions conducted by the teacher signaling device. For example, users may review historical information that shows energy saving statistics updating over time, enabling a comparison of energy use by learning devices before and after teaching signals are transmitted by the teacher signaling device. Accordingly, the operations of method 1700 are similar to those of the method 1300 described above, except that the method 1700 may include operations for the teacher signaling device receiving and managing stored information that reflects the affects of teaching routines in a location.

The operations in blocks 1302-1310 may be as described above with reference to FIG. 13A. In block 1702, the processor of the teacher signaling device may intercept messages transmitted by nearby learning devices in response to broadcasting the teaching signals based on the generated teaching routines. Such intercepted messages may include event report messages that learning devices broadcast after performing actions or otherwise detecting the occurrence of predefined conditions, actions, or circumstances. The intercepted messages may include messages may include signals received from learning devices that are targeted by the generated teaching routines and teaching signals as well as other devices. For example, the intercepted signals may include periodic broadcasts of the time or temperature from sensor devices that may not be capable of learning. In some embodiments, the messages may include data indicating various operating conditions of learning devices. For example, intercepted messages may indicate the current battery power, power usage within a time period, state information (e.g., activated learning mode, etc.), and trigger weights for reflexes of a nearby smart lamp.

In some embodiments, a user may be present to correct the teaching of the teacher signaling device in real-time. For example, in response to smart blinds closing based on received teaching signals, a user not wanting the blinds closed may immediately go and open the smart blinds, causing the smart blinds to transmit event report messages indicating they are open. Such counter-teaching actions of the user may be identified by the teacher signaling device and used to adjust teaching routines in order to avoid propagating teaching contrary to the user's desires. Accordingly, in optional block 1703, the processor of the teacher signaling device may update the teaching routines based on the intercepted messages. When the intercepted messages are event report messages indicating learning devices have changed their states in ways contrary to the teaching routines, the teacher signaling device may compare the states to the intended states of the teaching routines to detect differences. In response to determining contradictory states are being enacted and reported by the learning devices, the teacher signaling device may interpret such activity as the result of actions by the user and may adjust the teaching routines generated in block 1304 to include instructions the user is determined to desire and/or remove instructions that the user is determined to not desire. For example, the teacher signaling device may remove instructions from the teaching routines that correspond to sending teaching signals to cause smart blinds to close when the user has immediately opened the smart blinds.

In block 1704, the processor of the teacher signaling device may update stored data indicating historical information related to the teaching routines based on the intercepted messages and the broadcast teaching signals. In particular, the teacher signaling device may record the time, type, and manner of broadcast for various teaching signals within a teaching session. For example, the updated stored data may indicate how many Bluetooth broadcast signals were broadcast in a morning teaching session in order to teach behaviors for accomplishing an objective (e.g., eco-friendly home, preferred lighting schemes, etc.). Further, the teacher signaling device may process the data from the intercepted messages in order to generate information showing the progress of various learning devices with respect to teaching routines. For example, the updated stored data may show trigger weights for certain reflexes of a smart lamp over time. The updated stored data may include statistics, such as success rates of teaching routines, as well as other environmental conditions encountered in relation to teaching, such as temperature sensor data broadcast by a thermistor device during a teaching session. The operations in block 1704 may include various aggregation, compiling, and analyzing instructions, routines, and/or actions performed by the teacher signaling device to generate useful data that may be examined by a user at a future time.

Figure 17B:
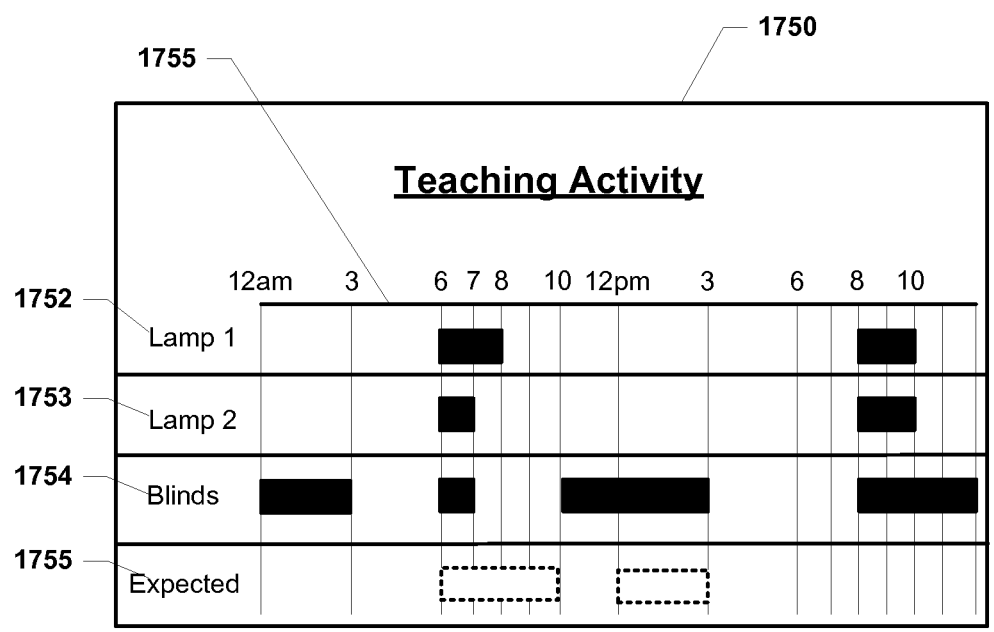
FIG. 17B is an exemplary display of information related to teaching routines in a system suitable for use with various embodiments.

In block 1706, the processor of the teacher signaling device may display the updated stored data, such as by rendering data on a touch screen of a smartphone or another screen coupled to the teacher signaling device. FIG. 17B described below illustrates an exemplary display of such stored data. The teacher signaling device may continue with the operations in optional determination block 1312 as described above with reference to FIG. 13A.

FIG. 17B illustrates an exemplary display 1750 of information related to teaching routines in a system. The display 1750 may be a rendering on a display unit of a teacher signaling device, such as an LED screen coupled to the teacher signaling device (e.g., a dedicated teacher unit or a smartphone configured with a teacher application, etc.). The display 1750 may show the teaching activity over a timeline 1755 (e.g., a 24-hour period) for various smart devices in the system. For example, the display 1750 may include graphical information 1752 of the teaching times for a first smart lamp, graphical information 1753 of the teaching times for a second smart lamp, and graphical information 1754 of the teaching times for smart blinds. For example, the exemplary display 1750 may show that on a particular day, the teacher signaling device was teaching the first smart lamp ("Lamp 1") from 6 AM to 8 AM and from 8 PM to 10 PM, the second smart lamp ("Lamp 2") from 6 AM to 7 AM and from 8 PM to 10 PM, and smart blinds ("Blinds") from 12 AM to 3 AM, 6 AM to 8 AM, 10 µm to 3 PM, and 8 PM to 10 PM.

In some embodiments, the teacher signaling device may be configured to display expected future actions of the teacher signaling device. For example, the exemplary display 1750 may include graphical information 1755 that indicates the teacher signaling device expects to turn on between 6 AM and 10 AM and expects to turn off between 10 AM and 11 AM before turning on again from 12 PM to 3 PM. Such expected future actions of the teacher signaling device may be based on previous teaching activities or trends and/or obtained teaching routines to be executed in the future, such as a teaching routine to be executed at a future time inputted via user inputs or downloaded from a remote source. The expected future actions may be displayed differently than other graphical information 1752-1754 of past activity to differentiate between estimates and facts (or actually recorded activity).

Figure 18:
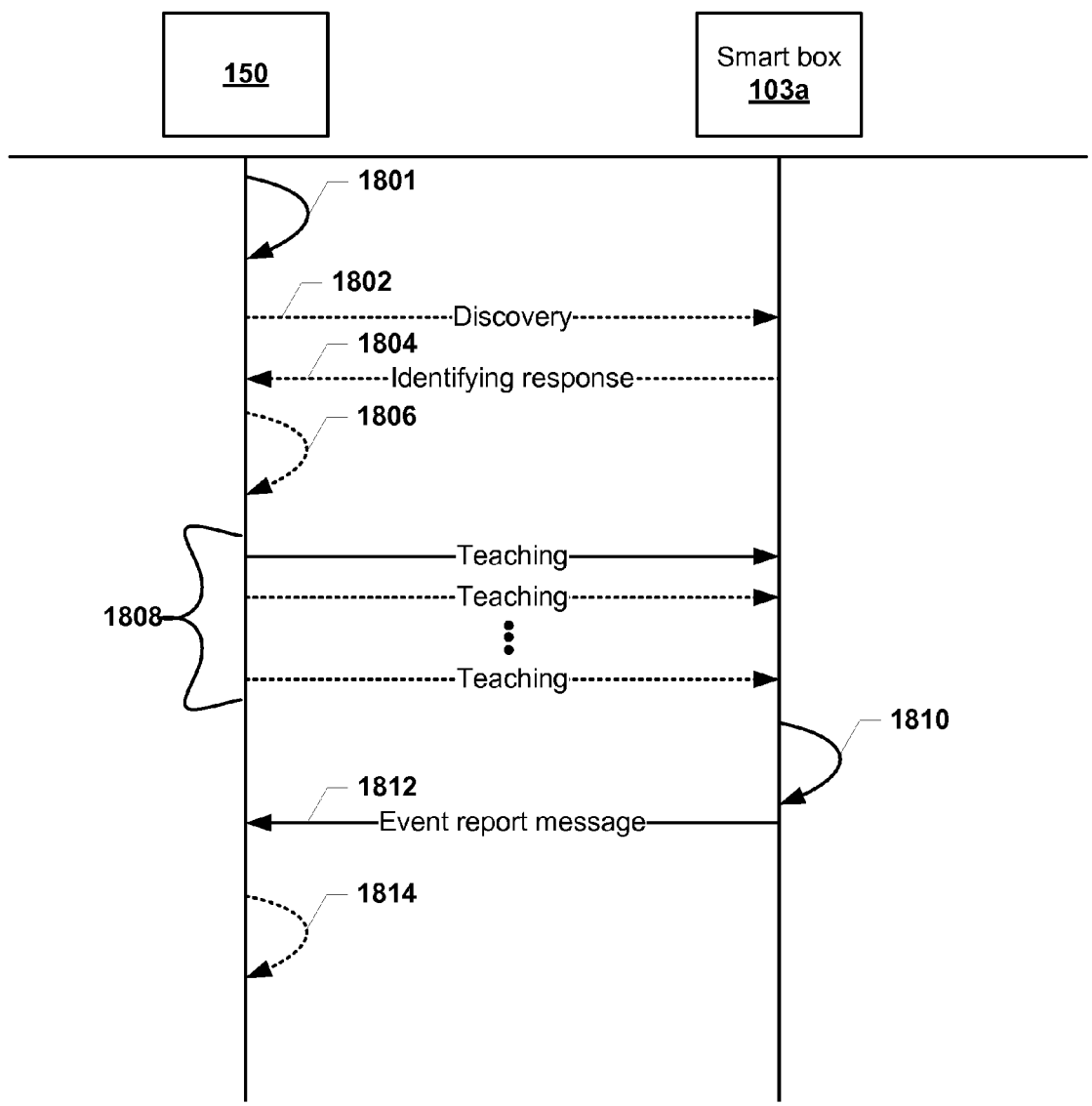
FIGS. 18 and 19 are call signal diagrams illustrating exemplary signaling between a teacher signaling device and learning devices suitable for use with various embodiments.
Figure 19:
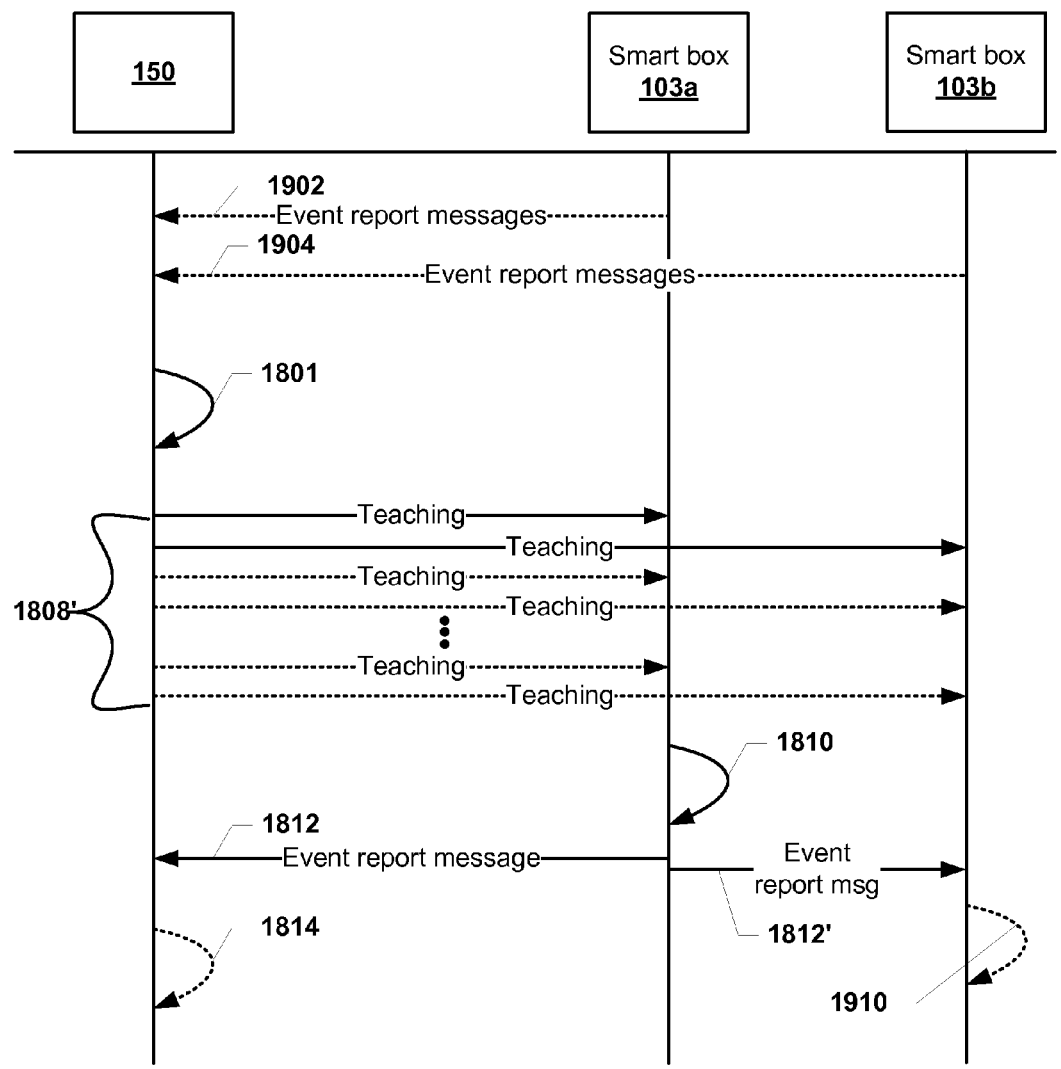

FIGS. 18-19 illustrate exemplary signaling between an embodiment teacher signaling device 150 and various learning devices within a location. The signaling described below may be any means of communication that allows information to be delivered between devices. For example, signals may be analog signals on a physical medium (e.g., wire, beam, RF, etc.) or binary messages in a computer communications network.

In FIG. 18, the teacher signaling device 150 may perform operations 1801 to generate teaching routines for learning devices as described above, such as by generating a schedule for broadcasting signals that emulate a user's interaction with the devices throughout a period of time. The teacher signaling device 150 may optionally transmit a discovery signal 1802 that may be received by a first smart box 103*a*, such as a smart box coupled to or within a lamp (e.g., a smart lamp). The first smart box 103*a* may transmit an optional identifying response signal 1804 that indicates the identity and other descriptive information about the first smart box 103*a* (e.g., device ID, device class or purpose, status information, etc.). In response to receiving the identifying response signal 1804, the teacher signaling device 150 may perform optional operations 1806 for modifying the teaching routines based on the identifying information. For example, the teacher signaling device may convert, translate, delete, or add teaching signals and/or the time they may be broadcast based on the type of devices that respond to the discovery signal 1802 and therefore may be determined to be within the current location.

Based on the teaching routines, the teacher signaling device 150 may transmit one or more teaching signals 1808 that may be received by learning devices within broadcast range. For example, the teaching signals 1808 may be messages with structures identical to event report messages and that include occurrence data based on the teaching routines for a period of time and/or the class of smart devices that are determined to be within the location. Each of the possible teaching signals 1808 may be the same, or alternatively may be slightly different dependent upon the teaching routines generated by the teacher signaling device 150. Further, the teaching signals 1808 may be event report messages that are configured to train different learning devices. For example, one or more of the teaching signals 1808 may be used by a first smart box 103*a* (e.g., a smart lamp) to generate events and a trigger pattern and one or more of the teaching signals 1808 may be used by a second smart box (e.g., smart wall switch) to generate events and a correction pattern or a reward pattern.

In response to receiving the teaching signals 1808, the first smart box 103*a* may perform operations to process the data within the signals 1808, such as by generating events and patterns. For example, the first smart box 103*a* may detect a correction, reward, or trigger pattern within events generated based on the received teaching signals 1808, and may generate resulting events and patterns. The first smart box 103*a* may then broadcast one or more event report messages 1812 based on the operations 1810, such as an event report message indicating the first smart box 103*a* performed an action (e.g., turned a light on, flipped a switch, etc.). The teacher signaling device 150 may optionally perform operations 1814 to process the information in the event report messages 1812 from the first smart box 103*a*, such as aggregating historical data, statistics, and other informative information that may be used to adjust future teaching operations and/or be displayed to users.

FIG. 19 illustrates similar signaling as shown above in FIG. 18, except that multiple smart boxes are shown to broadcast and receive signals within a location along with the teacher signaling device 150. In particular, a first smart box 103*a* (e.g., a smart lamp) and a second smart box 103*b* (e.g., a smart wall switch) may broadcast event report messages 1902 and 1904 respectively, such as in response to performing actions (e.g., turning on a light, flipping a switch, etc.). The teacher signaling device 150 may receive these event report messages 1902, 1904 and generate teaching routines over time with the operations 1801. For example, the teacher signaling device 150 may be configured to intercept event report messages 1902, 1904 over time to record and replicate the activities of a user in the location. The teaching signals 1808' broadcast from the teacher signaling device may be similar to those described above, except that they may be received by either smart box 103*a*, 130*b* within the location and broadcast reception range. In response to receiving the teaching signals 1808', the first smart box 103*a* may perform operations to process the data within the signals 1808, such as by generating events and patterns. The first smart box 103*a* may then broadcast one or more event report messages 1812 based on the operations 1810, such as an event report message indicating the first smart box 103*a* performed an action. The event report message 1812' received by the second smart box 103*b* may be the same as the event report message 1812 received by the teacher signaling device 150. The second smart box 103*b* may optionally perform operations 1910 in response to receiving the event report message 1812', such as generating an event or pattern that may trigger an action or reinforce a trigger (e.g., correct, reward) at the second smart box 103*b*.

Figure 20:
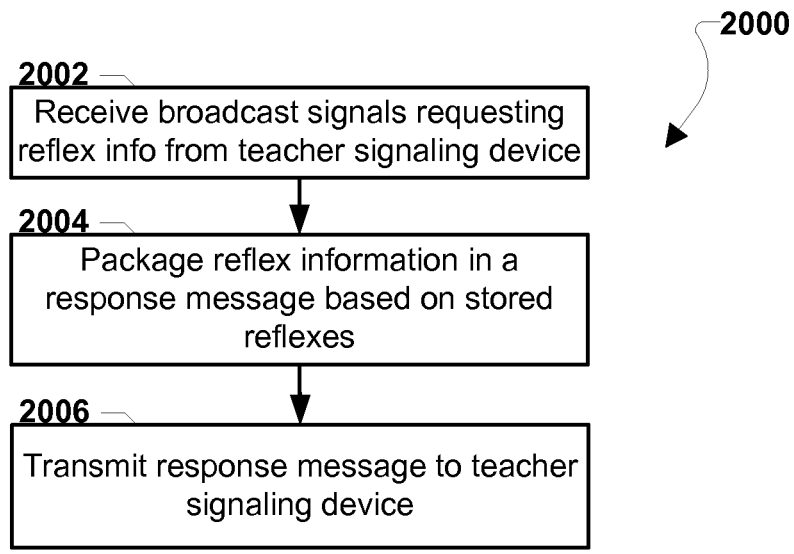
FIGS. 20 and 21 are process flow diagrams illustrating embodiment methods for a learning device to transmit information in response to requests from a teacher signaling device.

FIG. 20 illustrates an embodiment method 2000 for a learning device to transmit reflex information in response to a request from a teacher signaling device. The method 2000 may be performed by the learning device in combination with the teacher signaling device performing the method 1370 described above. In some embodiments, the method 2000 may be performed by the learning device as part of the methods 1100, 1200 described above, or alternatively, as an independent and concurrent process.

In block 2002, the processor of the learning device may receive broadcast signals requesting reflex information from the teacher signaling device. In block 2004, the processor of the learning device may package the reflex information in a response message based on stored reflexes. For example, the learning device may convert, encode, or otherwise format data stored in local memory that define trigger patterns, action patterns, reward patterns, correction patterns, and trigger weights. The response message may also include header information that includes the device identifier, device class/type, and other identifying information about the learning device. In block 2006, the processor of the learning device may transmit the response message to the teacher signaling device. In some embodiments, such a transmission may be a wireless broadcast, such as a Bluetooth broadcast, a paired communication (e.g., when the learning device and teacher signaling device are paired via Bluetooth, etc.), and/or a wired communication.

Figure 21:
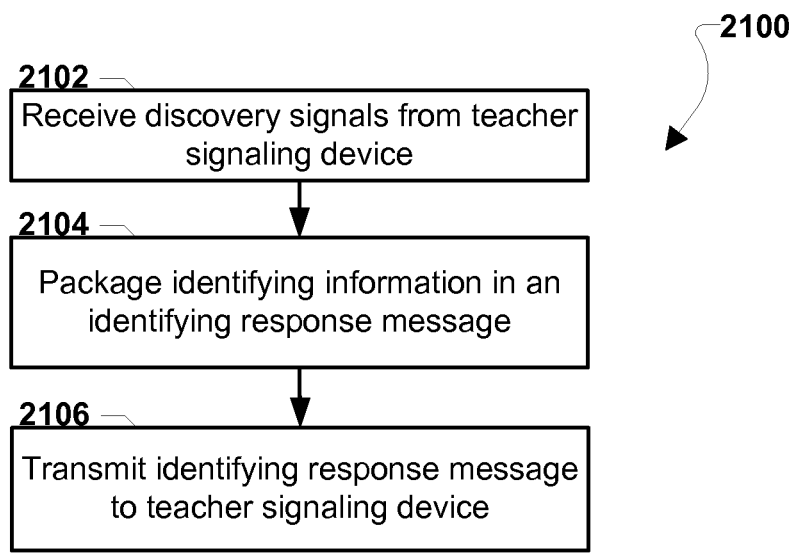

FIG. 21 illustrates an embodiment method 2100 for a learning device to transmit identifying information in response to a request from a teacher signaling device. The method 2100 may be performed by the learning device in combination with the teacher signaling device performing the method 1400 described above. In some embodiments, the method 2100 may be performed by the learning device as part of the methods 1100, 1200 described above, or alternatively, as an independent and concurrent process.

In block 2102, the processor of the learning device may receive discovery signals requesting identifying information from the teacher signaling device. In block 2104, the processor of the learning device may package the identifying information in an identifying response message based on data stored locally at the learning device. For example, the learning device may convert, encode, or otherwise format data stored in local memory that define the learning device's unique device identifier, a class/type code, and a current state of a learning mode corresponding to reflexes at the learning device. In some embodiments, the identifying response message may be similar to the response message described above with reference to FIG. 20. In block 2106, the processor of the learning device may transmit the identifying response message to the teacher signaling device. In some embodiments, such a transmission may be a wireless broadcast, such as a Bluetooth broadcast, a paired communication (e.g., when the learning device and teacher signaling device are paired via Bluetooth, etc.), and/or a wired communication.

Figure 22:
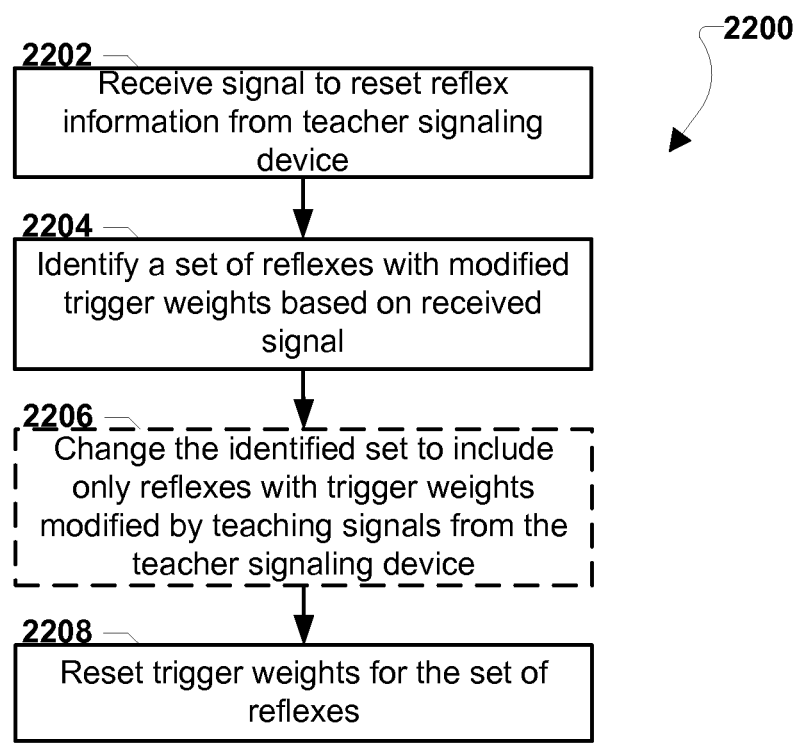
FIG. 22 is a process flow diagram illustrating an embodiment method for a learning device to reset trigger weights of reflexes in response to receiving signals from a teacher signaling device.

FIG. 22 illustrates an embodiment method 2200 for a learning device to reset trigger weights in response to a reset signal from a teacher signaling device. The method 2200 may be performed by the learning device in combination with the teacher signaling device performing the method 1600 described above. In some embodiments, the method 2200 may be performed by the learning device as part of the methods 1100, 1200 described above, or alternatively, as an independent and concurrent process.

In block 2202, the processor of the learning device may receive from the teacher signaling device a signal instructing the learning device to reset reflex information (i.e., a reset signal). In various embodiments, the reset signal may indicate changes should be applied to particular reflexes and/or corresponding to a particular period of time. Further the reset signal may indicate an amount of change that should be made to trigger weights (e.g., a percentage of trigger weight to negate, reset, zero, etc.). For example, the reset signal may indicate that only reflexes that have a certain trigger pattern (e.g., wall witch 'on') or action pattern (e.g., light 'on') should be reset. In block 2204, the processor of the learning device may identify a set of reflexes with modified trigger weights based on the received signal. In other words, the learning device may identify all the reflexes stored locally with trigger weights that have been changed from their default based on received event report messages and/or teaching signals. Further, the identified set may be based on any other parameters in the reset signal, such as those with a particular action pattern.

In optional block 2206, the processor of the learning device may change the identified set to include only reflexes with trigger weights modified by teaching signals from the teacher signaling device. In other words, in some embodiments, such reset signals may only be applied with regards to trigger weights that were previously changed due to teaching signals from the teacher signaling device, and thus any trigger weights that were previously changed by direct interactions with the user may not be reset.

In block 2208, the processor of the learning device may reset the trigger weights for the set of reflexes based on the received reset signal. For example, the learning device may invalidate or reset any trigger weight changes made in the last minute, hour, day based on the parameters indicated in the reset signal.

FIGS. 23A-24B illustrate graphical user interface (GUI) techniques implemented at a teacher signaling device. In the following descriptions, the term "triggering learning device" may be used to refer to the learning device that transmits an event report message that causes a second learning device to act based on a reflex.

Users of such decentralized systems of learning devices may benefit from easy, intuitive ways of identifying causal relationships between learning devices within a smart environment (e.g., a smart house). Users may also benefit from easy ways of controlling such learning devices based on the identified relationships, such as by triggering learned behaviors from remote locations (e.g., outside of a smart house, etc.). Accordingly, in some embodiments, a teacher signal-ing device (or other mobile device used by a user within the smart environment) may be configured to enable users to view and manipulate trigger-action relationships (or "causal relationships") of learning devices in the smart environment. In general, using a wireless transceiver (e.g., Bluetooth, WiFi, etc.) a teacher signaling device (e.g., a smartphone or tablet device configured to execute software for operating as a teacher signaling device) may be configured to intercept and record event report messages transmitted by learning devices in the smart environment. The teacher signaling device may associate the intercepted event report messages with segments of an image of the smart environment. For example, the teacher signaling device may automatically identify image segments of a digital photo that are related to particular learning devices (or device types) based on image processing routines, based on data within the signals (e.g., device type codes, etc.), and/or based on manual inputs by a user. Further, causal relationships may be automatically identified by the teacher signaling device by recognizing changes in images (e.g., a lamp turning on or off) and evaluating the occurrence of intercepted signals within a predefined time window of observed changes, or alternatively may be manually identified by a user.

The teacher signaling device may also render information on the image to visually illustrate the various causal relationships of learning devices in the environment. For example, information may be rendered that indicates that an event report message from one device causes a particular action at another device. This may be a valuable visual aid when there are many learning devices and associations in the smart environment.

A user may use a graphical user interface (GUI) of the teacher signaling device to control (e.g., trigger/replay, change, etc.) actions associated with the causal relationships of learning devices in the smart environment. For example, the user may press a GUI button to replicate or re-broadcast a signal previously intercepted in order to trigger a correlated action by a learning device. As another example, the user may use the GUI to teach a first learning device to cease performing an action (e.g., turning 'on') in response to an event report message from a second learning device (e.g., a wall switch 'on' event report message). In this way, a user may not only see the learned behaviors that exist in the smart environment, but may also manipulate the behaviors of learning devices by transmitting event report messages previously intercepted and associated with actions by learning devices visible within the image. In various embodiments, the user may be able to remotely cause actions to occur via the GUI (e.g., clicking a soft GUI button to trigger an action of a learning device located in a different room). In some embodiments, the teacher signaling device may only be capable of transmitting intercepted event report messages to control learning devices when within proximity.

In some embodiments, the teacher signaling device may be used to record video data or audio data that may be analyzed by a processor of the device to discover learning device event-action associations "on-the-fly." For example, a smartphone may record video of a scene in which a user flips a smart wall switch and a smart lamp turns on or turns off, while intercepting event report message including the report messages transmitted by the smart wall switch and the smart lamp. By processing the images in such video in combination with contemporaneously intercepted event report messages from the smart wall switch and the smart lamp, the teacher device may discover the trigger-action association between the devices, as well as identify within the images the learning devices issuing the event report messages. For example, by correlating images of the smart wall switch being flipped to reception of event report messages from the smart wall switch the teaching signaling device can correlate the image of the switch with its event report messages. Similarly, by recognizing from a sequence of images when a smart lamp turns on or turns off, the teaching signaling device can correlate the "turn-on" or "turn-off" event report messages from the smart lamp with the image of the lamp. As described above, by correlating the event report messages from the smart wall switch with the "turn-on" or "turn-off" event report messages from the smart lamp the teaching signaling device can discover the event-action correlation. A GUI display of the correlation (e.g., an arrow) can then be presented on GUI image that includes both the smart light switch and the smart lamp.

In various embodiments, the teaching signaling device may be configured to utilize various image recognition algorithms and/or routines to identify known learning devices within the smart environment so that real-time augmented reality displays may be rendered on streaming video. For example, based on previous stored identifications of attributes of a particular smart lamp by a user on a still image, a smartphone configured with a teaching signaling device application may be capable of automatically displaying trigger-action associations for the smart lamp in real-time video when the smart lamp is recognized.

In some embodiments, a teaching signaling device may be configured to render or otherwise present to users a list view and/or an icon view of learning devices within an environment. For example, the teaching signaling device may display a tree structure or other list structure of all of the recognized learning devices within an environment (e.g., smart house, etc.) such that organization of the structure indicates the relationships between the different devices. In this way, users may be presented with easy to understand associations between devices. Further, such a listing functionality may be used to show various devices discovered over time, regardless of whether the teacher signaling device is currently within a particular associated environment. For example, the teacher signaling device may be configured to render a list structure of all devices within a first smart house despite the teacher signaling device being located within a second smart house, enabling users of the teacher signaling device to view associations at a glance and without physically moving the teacher signaling device into another environment.

In some embodiments, the teacher signaling device may be configured to load and render stored images based on identifiers of messages intercepted within an environment. For example, the teacher signaling device may load an image of a smart living room in response to receiving a short-range wireless signal (e.g., event report message) that includes a code or other data indicating an identifier of the smart living room and/or a learning device associated with the smart living room. In some embodiments, the teacher signaling device may index stored images based on GPS coordinates and may load and render images when the teacher signaling device determines it has entered a predefined location.

In some embodiments, the teacher signaling device may discover a correlation between a particular trigger pattern and an action pattern of a learning device based on event report messages intercepted over a period of time, such as an observation period of minutes, hours, days, etc. For example, the teacher signaling device may be left in a particular place (e.g., a living room) so that a connected microphone or camera can pick up audible actions (e.g., a smart stereo turning on, etc.) and its connected camera can recognize changes linked to actions (e.g., lamps coming on based on changes in ambient light, etc.). Alternatively, the teacher signaling device may be pre-programmed to recognize certain received event report messages as indicating that an action of a learning device has been triggered, such as by intercepting and identifying signals sent by a smart lamp when it turns on or off and/or identifying signals sent by a smart stereo when it has turned on or off.

The following is a non-limiting illustration of such a GUI technique using a teacher signaling device. A user smartphone executing teaching signaling device software (e.g., a teacher app, etc.) may capture an image (e.g., picture, video, etc.) that includes representations of a smart wall switch and a smart lamp within a living room. The smart lamp may already have learned a reflex that causes the smart lamp to turn on in response to receiving an event signal related to the smart wall switch being flipped on. Via a GUI, the user may define segments of the captured image that are associated with the learning devices, such as by using a stylus to circle (or place a box around) the smart lamp and the smart wall switch. The smartphone may monitor for signals (e.g., event report messages) from the smart lamp and smart wall switch (e.g., by using a Bluetooth radio) and may intercept a signal indicating a smart wall switch 'on' event and another signal indicating a smart lamp 'on' event. The smartphone may display information of the intercepted signals (e.g., sender device ID, message contents, etc.) and enable the user to associate the signals with the segments of the captured image. For example, the user may use the GUI to match the smart wall switch 'on' event signal with the smart wall switch image segment and the intercepted smart lamp 'on' event signal with the smart lamp image segment. The user may use the GUI to set relationships between the image segments and associated intercepted signals of the smart lamp and smart wall switch, such as by dragging an arrow graphical element from the smart wall switch image segment to the smart lamp image segment to indicate that the smart wall switch 'on' event signal triggers an action of the smart lamp that generates the smart lamp 'on' event signal. After this association, the user may control the smart lamp via the GUI without having to rely on the physical smart wall switch, tapping a GUI element (or button) associated with the smart wall switch image segment to cause the smartphone to transmit the smart wall switch 'on' event signal and thus cause the smart lamp to turn on.

Figure 23A:
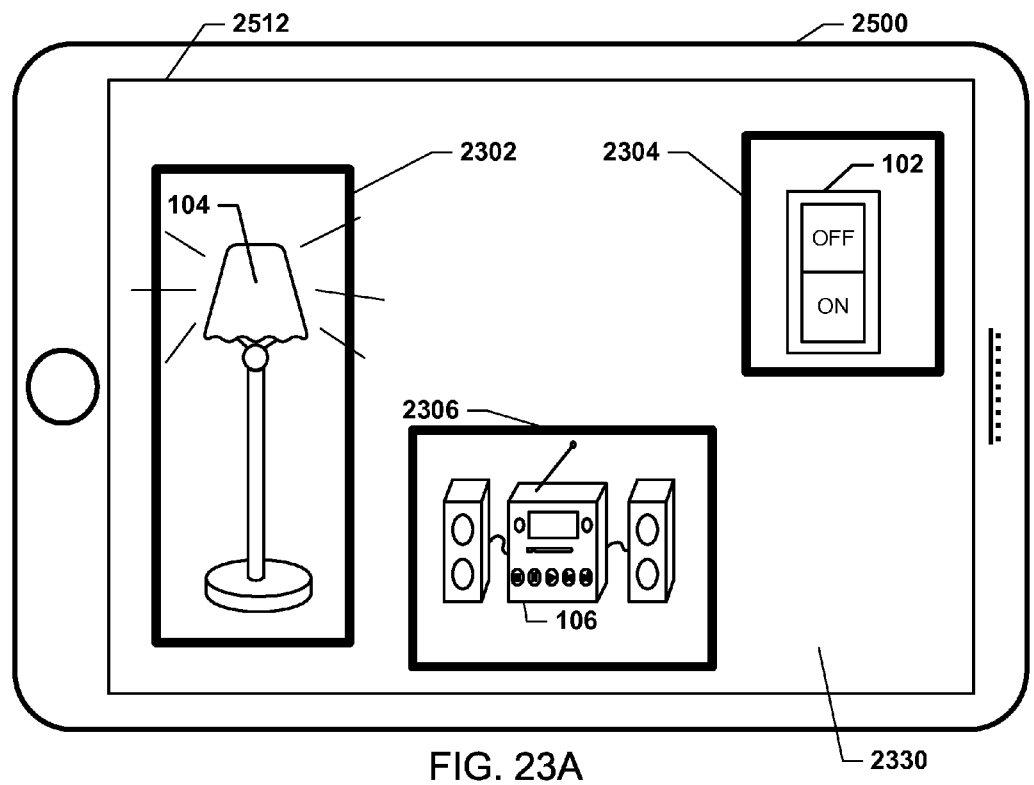
FIGS. 23A-D are diagrams illustrating an exemplary graphical user interface on a mobile device configured to operate as a teacher signaling device.
Figure 23B:
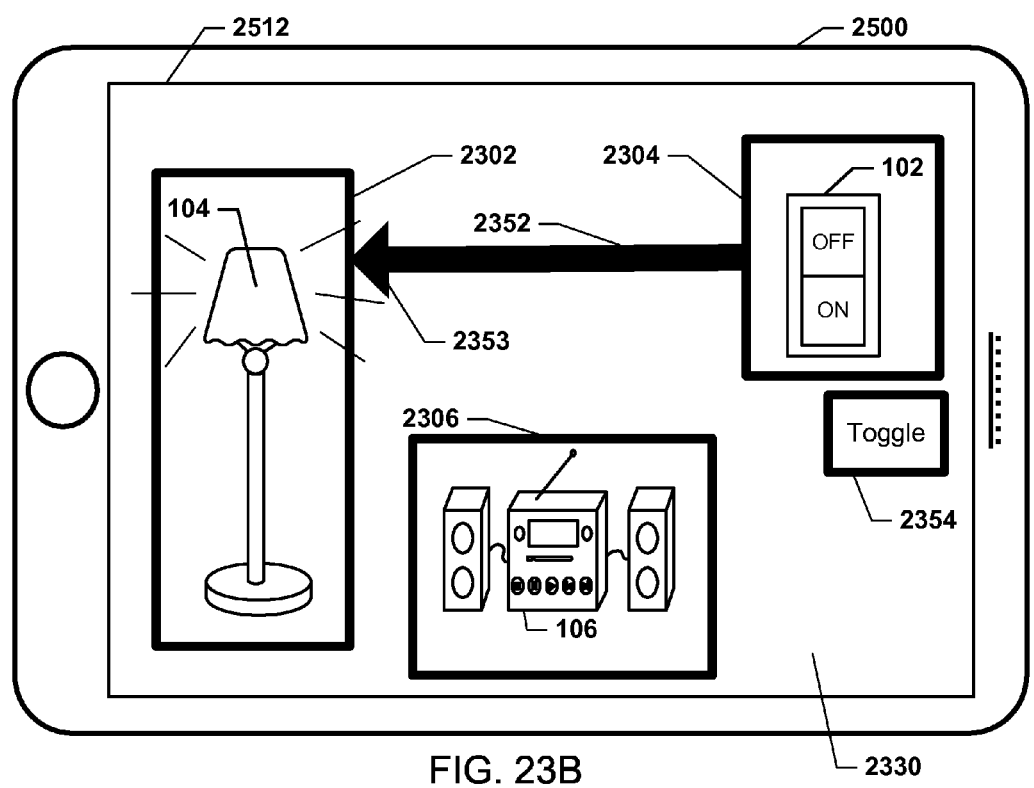

FIGS. 23A-23B illustrates an exemplary graphical user interface (GUI) on a mobile device 2500 configured to operate as a teacher signaling device. The GUI may include graphical elements related to various learning devices 104, 102, 106 within an environment (e.g., a living room, etc.). In particular, in FIG. 23A, the mobile device 2500 may display on its screen 2512 (e.g., an LED touch screen of a smartphone, etc.) an image 2330, such as a video, a photograph, etc., taken by the mobile device 2500 via a camera unit (not shown) coupled to the mobile device 2500. The mobile device 2500 may render segment graphical elements 2302, 2304, 2306 corresponding with learning devices 104, 102, 106 within the environment. For example, a first segment graphical element 2302 may correspond to a smart floor lamp 104, a second segment graphical element 2304 may correspond to a smart wall switch 102, and a third segment graphical element 2306 may correspond to a smart stereo 106. The segment graphical elements 2302, 2304, 2306 may be identified by the mobile device 2500 based on image recognition algorithms and/or other software processing of the image 2330, and/or based on manual inputs by a user, such as with stylus or finger inputs on the screen 2512. In some embodiments, the mobile device 2500 may be configured to identify the devices transmitting the intercepted signals and correlate those identified devices to the segment graphical elements 2302, 2304, 2306 of the image 2330 based on intercepted signals from the devices 102, 104, 106. In some embodiments, the mobile device 2500 may render graphical elements associated with the devices in different ways (e.g., colors, sizes, shapes, etc.) to indicate different functionalities of the devices. For example, the mobile device 2500 may render a segment graphical element of a reporter device (not shown) that only transmits event report messages (i.e., does not receive or learn) in a conspicuous, colorful, or otherwise different way than the segment graphical elements 2304, 2302, 2306 of smart devices 102, 104, 106.

The mobile device 2500 may identify causal relationships between the intercepted signals and the various learning devices 102, 104, 106 in the environment. For example, based on user inputs or data from signals (e.g., timestamps of received event report messages), the mobile device 2500 may identify that a first signal from the smart wall switch 102 (e.g., a first 'on' event report message) is a trigger for the smart floor lamp 104 to turn on and broadcast a second signal (e.g., a second 'on event report message). As shown in FIG. 23B, the mobile device 2500 may render a relationship graphical element 2352 (e.g., an arrow) that indicates relationships between the functions of various devices in the environment. For example, the relationship graphical element 2352 may be rendered to indicate that the smart wall switch 102 turning on causes the smart floor lamp 104 to turn on its light.

The mobile device 2500 may render a soft button, icon, picture, or other interactive graphical element 2354 (e.g., a "toggle" button) configured to cause the mobile device 2500 to broadcast signals related to the relationship graphical element 2352. For example, the interactive graphical element 2354 may be configured to cause the mobile device 2500 to transmit a wall switch 'on' event report message via a Bluetooth radio in response to the user touching the area of the screen 2512 corresponding to the interactive graphical element 2354. Such a triggered event report message may cause the smart floor lamp 104 to turn on in accordance with the relationship shown by the relationship graphical element 2352.

Figure 23C:
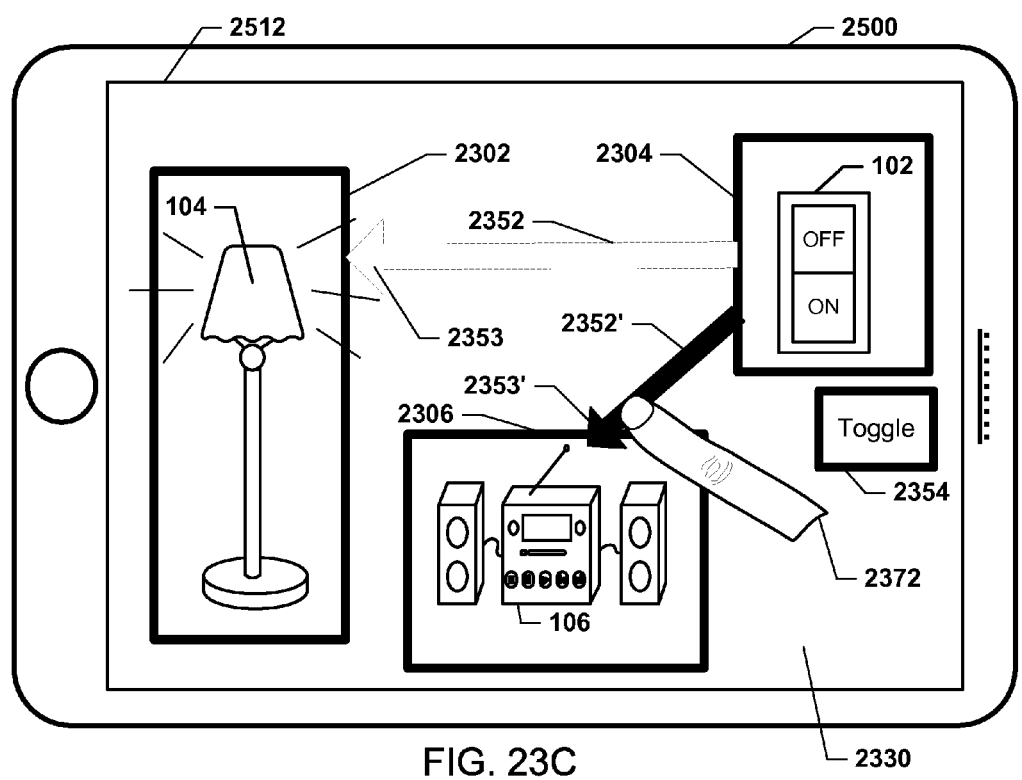

FIG. 23C illustrates an adjustment of the relationship graphical element 2352 to cause new teaching by the mobile device 2500 configured as a teaching signaling device. In some embodiments, relationship graphical elements rendered by the mobile device 2500 may be adjusted so that the user may change how signals are transmitted by the mobile device 2500 in response to the user interacting with the interactive graphical element 2354. In other words, the mobile device 2500 configured as a teaching signaling device may enable the user to re-connect the relationship graphical element 2352 in order to cause the learning devices to learn new responses to event report messages. For example, the user may move the endpoint 2353 of the relationship graphical element 2352 so that the endpoint 2353 is no longer touching the first segment graphical element 2302. Such a disconnection adjustment may send a correction message or sequence of messages to the smart lamp 104 causing it to unlearn the event-action association between the smart wall switch 102 and an action to turn on or off. Thus, after a user performs this input on the relationship graphical element 2352 the smart floor lamp 104 may no longer turn on or off in response to receiving an event report message from the smart wall switch 102.

As another example, the user may move the endpoint 2353 of the relationship graphical element 2352 so that the new endpoint 2353' of the adjusted relationship graphical element 2352' is touching the third segment graphical element 2304 corresponding to the smart stereo 106. Such user input may cause the teaching signaling device to broadcast teaching messages that cause the stereo 106 to learn an action (e.g., to turn on) in response to an event report message from the smart wall switch 102. In other words, the user adjusting the relationship graphical element 2352 may cause the mobile device 2500 configured as a teaching signaling device to learn a new teaching routine and cause signals (e.g., teaching signals) to be sent until the smart stereo 106 has learned to act in response to receiving the event report message associated with the smart wall switch 102. For example, the mobile device 2500 configured as a teaching signaling device may transmit reward signals that cause the smart stereo 106 to activate a new learned behavior (e.g., turn on in response to a wall switch event signal) or nullify another behavior (e.g., turn on in response to a lamp 'on' event signal).

In another embodiment, the mobile device 2500 configured as a teaching signaling device may transmit teaching signals (e.g., correction signals) to remove an event-action association learned by the smart floor lamp 104 in response to the user disconnecting the relationship graphical element 2352. For example, along with transmitting teaching signals to cause the smart stereo 106 to turn on in response to subsequent event report messages that indicate the smart wall switch 102 has been turned on, the mobile device 2500 may also transmit teaching signals to cause the smart floor lamp 104 to lower a trigger weight for a reflex that causes the smart floor lamp 104 to turn on in response to the event report messages such that the smart floor lamp 104 no longer turns on when the smart wall switch 102 has been turned on.

Figure 23D:
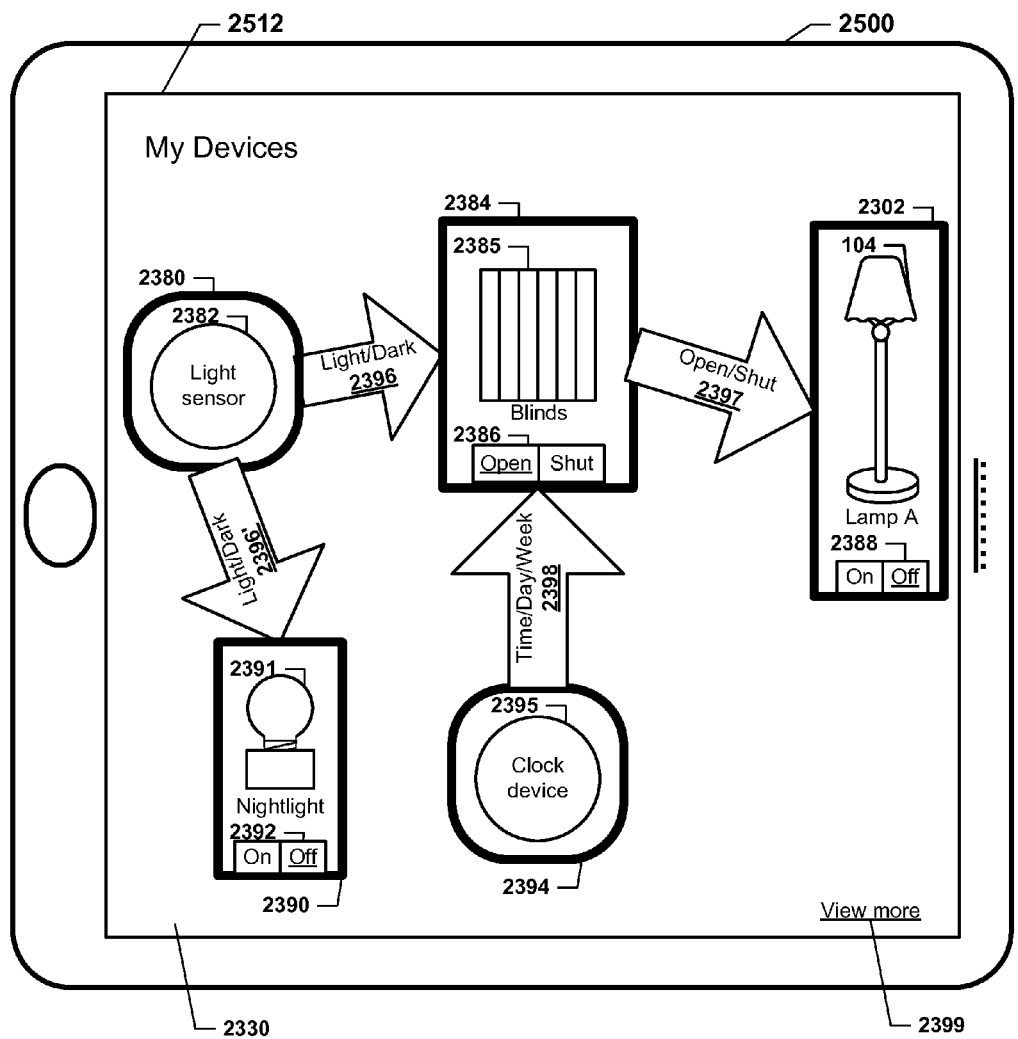

FIG. 23D illustrates an exemplary display of relationships between learning devices displayed on a screen 2512 via a graphical user interface on a mobile device 2500 configured to operate as a teacher signaling device. Similar to as described above, the mobile device 2500 may be configured to capture an image 2330 of an environment, such as a living room, that includes a plurality of devices configured to transmit event report messages. For example, the image 2330 may include representations of a light sensor 2382, smart blinds 2385, a smart floor lamp 104, a smart nightlight 2391, and a clock device 2395 (or a clock/calendar device). The light sensor 2382 may be configured to transmit event report messages that indicate whether the ambient light in the environment has exceeded a light threshold (e.g., is it light or dark in the room). The clock device 2395 may be configured to periodically transmit event report messages that indicate the current time of day, day of week, month, season, etc. The smart blinds 2385 may be configured with a first reflex that causes the smart blinds 2385 to open in response to receiving an event report message from the light sensor 2382 indicating it is light in the room and a second reflex that causes the smart blinds 2385 to close in response to receiving an event report message from the light sensor 2382 indicating it is dark in the room. The first and second reflexes of the smart blinds 2385 may also utilize the event report messages from the clock device 2395 to trigger the opening or shutting of the smart blinds 2385 (e.g., shut when it is dark and nighttime, shut when it is bright and summer, open when it is a weekday, etc.). The smart blinds 2385 may also be configured to transmit event report messages indicating whether it has been opened or shut.

The smart floor lamp 104 may be configured with a first reflex that causes the smart floor lamp 104 to turn on in response to receiving an event report message from the smart blinds 2385 indicating they are closed and a second reflex that causes the smart floor lamp 104 to turn off in response to receiving an event report message from the smart blinds 2385 indicating they are open. In various embodiments, the reflexes of the smart floor lamp 104 may also utilize other data, such as data from the clock device 2395 event report messages. For example, the smart floor lamp 104 may be configured to turn off on weekdays based on event report messages from the clock device 2395.

The smart nightlight 2391 may be configured with a first reflex that causes the smart nightlight 2391 to turn on in response to receiving an event report message from the light sensor 2382 indicating it is dark in the room and a second reflex that causes the smart nightlight 2391 to turn off in response to receiving an event report message from the light sensor 2382 indicating it is bright in the room. The first and second reflexes of the smart nightlight 2391 may also utilize the event report messages from the clock device 2395 to trigger its actions.

As described above, the mobile device 2500 may be configured to identify the representations of the devices on the image 2330, and accordingly may render segment graphical elements 2302, 2380, 2384, 2390, 2394 corresponding with learning devices 104, 2382, 2385, 2391, 2395 within the environment. In some embodiments, certain devices or device types may be rendered on by the mobile device 2500 in different ways in order to show differences in their capabilities. For example, to show that the light sensor 2382 and the clock device 2395 are configured to report events via event report messages but not configured to learn (i.e., not smart devices capable of learning new behaviors via reflexes, etc.), the mobile device 2500 may render the light sensor segment graphical element 2380 and the clock device segment graphical element 2394 as rounded, colored, or labeled in a particular way that is unlike the segment graphical elements 2384, 2302, 2390 of the learning devices 104, 2385, 2391 in the environment.

Further, the mobile device 2500 may render graphical elements corresponding to the status of operating conditions of certain devices. For example, the mobile device 2500 may render an open/shut graphical element 2386 in association with the representation of the smart blinds 2385 to indicate whether they are open or shut at a given time, an on/off graphical element 2388 in association with the representation of the smart floor lamp 104 to indicate whether it is on or off at a given time, and an on/off graphical element 2392 in association with the representation of the smart nightlight 2391 to indicate whether it is on or off at a given time. In some embodiments, the graphical elements 2386, 2388, 2392 may be configured to cause the associated devices 2385, 104, 2391 to trigger actions in accordance with the graphical elements 2386, 2388, 2392, such as by causing the smart lamp 104 to turn on or off. In some embodiments, the graphical elements 2386, 2388, 2392 may be similar to the interactive graphical element 2354 described above with reference to FIG. 23B and thus may be configured to cause their associated devices 2384, 104, 2391 to transmit event report messages.

Further, based on evaluating intercepted event report messages, the mobile device 2500 may render relationship graphical elements 2396, 2396', 2397, 2398 that show the causal relationships between the various devices in the environment. For example, the mobile device 2500 may render a first relationship graphical element 2396 from the light sensor segment graphical element 2380 to the smart blinds segment graphical element 2384 that shows the light sensor information in event report messages from the light sensor 2385 may cause the smart blinds 2385 to shut or open, a second relationship graphical element 2396' from the light sensor segment graphical element 2380 to the smart nightlight segment graphical element 2390 that shows the light sensor information in event report messages from the light sensor 2385 may cause the smart nightlight 2391 to turn on or off, a third relationship graphical element 2397 from the smart blinds segment graphical element 2384 to the smart floor lamp segment graphical element 2302 that shows the open or shut status information in event report messages from the smart blinds 2385 may cause the smart floor lamp 104 to turn on or off, and a fourth relationship graphical element 2398 from the clock device segment graphical element 2394 to the smart blinds segment graphical element 2384 that shows the time/day/week information in event report messages from the clock device 2395 may cause the smart blinds 2385 to shut or open. Similar to as described above with reference to FIGS. 23A-C, the relationship graphical elements 2396, 2396', 2397, 2398 may or may not be interactive such that a user may supply an input (e.g., press, tap, etc.) to each element in order to cause an event report message to be transmitted to cause a response action at another device.

In some embodiments, the mobile device 2500 may also render a link graphical element 2399 (e.g., a "view more" or "show more" link, etc.) configured to cause another display to be rendered, such as a previously captured image of another environment and its learning devices so that a user may remotely trigger relationships of the another environment using GUI elements (e.g., soft buttons, arrows, etc.). Further, proximity may be evaluated such that the other displays that may be rendered on the mobile device 2500 may be relevant to the current location of the mobile device 2500. For example, based on the distance between the current location of the mobile device 2500 (e.g., GPS coordinates) and a predefined location or coordinates of a smart house, the mobile device 2500 may enable a user to click on the link graphical element 2399 to view the devices within the whole smart house (or even a larger area around the smart house, such as a neighborhood, etc.) as opposed to just a room in the smart house.

Figure 24A:
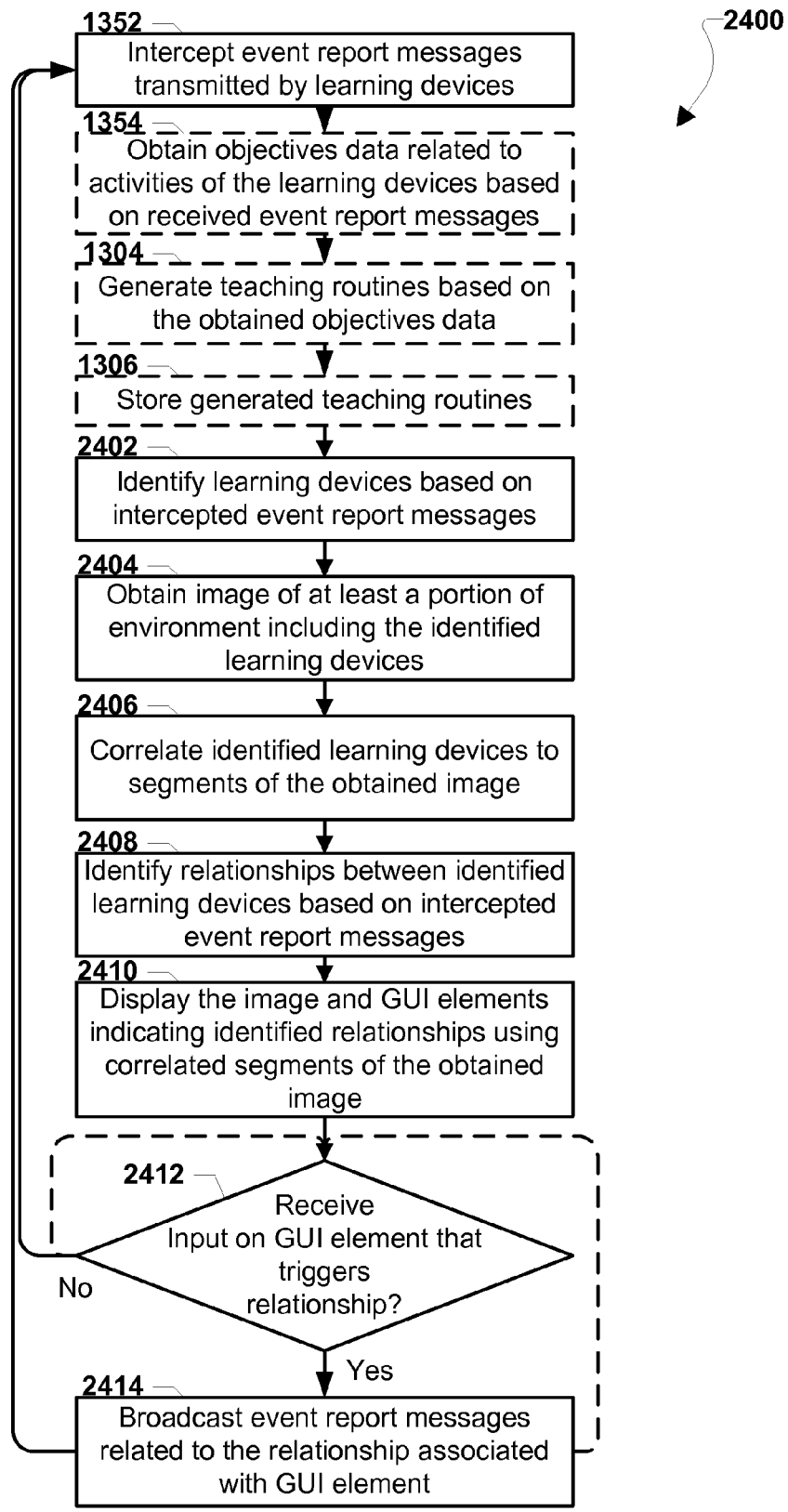
FIGS. 24A and 24B are process flow diagrams illustrating embodiment methods for a teacher signaling device to transmit signals based on a user's interaction with a graphical user interface (GUI).

FIG. 24A illustrates an embodiment method 2400 for a teacher signaling device to transmit signals based on a user's interaction with a graphical user interface (GUI). The method 2400 may be similar to the methods 1300 or 1350 described above, except that the method 2400 may include operations for obtaining and using imagery of an environment to enable users to easily trigger the transmission of event report messages that are identified as triggers for behaviors at various learning devices within the environment. For example, using a GUI as described above with reference to FIGS. 23A-C, the teacher signaling device may be configured to transmit event report messages that cause a smart floor lamp to turn on in response to a user pressing a soft button rendered on the display of the teacher signaling device associated with a smart wall switch.

The operations in blocks 1352-1306 may similar to operations for like numbered blocks described above with reference to FIG. 13B. The operations in optional blocks 1354-1306 may be optional as the teacher signaling device may be selectively configured to generate new teaching routines, and instead may simply be configured to perform operations for enabling the functionalities of the GUI. In block 2402, the processor of the teacher signaling device may identify learning devices based on intercepted event report messages. For example, the teacher signaling device may parse a received message to identify a device identifier indicating the learning device that transmitted the received message. In block 2404, the processor of the teacher signaling device may obtain an image of at least a portion of environment including the identified learning devices. For example, the teacher signaling device may utilize a coupled or connected video or still-imagery camera to capture imagery of a living room, office space, hotel room, or other place that includes a number of smart devices. In block 2406, the processor of the teacher signaling device may correlate the identified learning devices to segments of the obtained image, such as by matching representations of the image with device identifiers identified from intercepted signals. In some embodiments, the teacher signaling device may receive user inputs that associate the various learning devices to segments of the image, such as user inputs that draw boxes or selections around segments the user identifies as representing particular identified learning devices. In some embodiments, the teacher signaling device may perform various processing routines, such as image processing and pattern matching routines, to determine most likely matches between the identified learning devices and segments of the image. For example, based on a first identified learning device being of a floor lamp device type, the teacher signaling device may identify a segment of the image that includes imagery that is of a certain height, shape, and/or characteristic (e.g., light emanating from a bulb-shaped element, etc.) that is predetermined as likely corresponding to floor lamps. As another example, the teacher signaling device may identify learning devices within images by recognizing a change in state from one image to the next, such as a light turning on or off, a wall switch changing positions, etc.

In block 2408, the processor of the teacher signaling device may identify relationships between the identified learning devices based on the intercepted event report messages. The teacher signaling device may evaluate the intercepted messages to detect possible causal relationships, such as event report messages that cause learning devices to perform actions based on trigger-action patterns defined in their respective reflexes. As described above, the teacher signaling device may evaluate event report messages received within a certain time window to determine whether a first received event report message may be a trigger causing an action related to a second received event report message. For example, when a first event report message for a smart wall switch 'on' event occurs within a predefined number of milliseconds or seconds from a second event report message for a smart floor lamp turning on, the teacher signaling device may identify a causal relationship between the two intercepted messages. In some embodiments, the relationships may be identified based on user inputs, such as by a user drawing an arrow in between a first image segment for a first learning device and a second image segment of a second learning device to indicate the event report message of the first learning device triggers an action of the second learning device.

In block 2410, the processor of the teacher signaling device may display the image and GUI elements indicating the identified relationships using correlated segments of the obtained image. In other words, the teacher signaling device may render various graphical elements (e.g., selections, colorations, boxes, etc.) to visually indicate the presence of identified learning devices, as well as rendering other graphical elements to show the interconnectivity (i.e., event-action associations) of the identified learning devices (e.g., such as graphical arrows or conduits). Thus, the teacher signaling device may use graphical elements to represent the causal relationships that it discovers based on intercepted event report messages. The GUI elements may be associated with data, such as identifiers for the corresponding learning devices, as well as codes or other information representing the intercepted event report messages related to the GUI elements. In particular, the teacher signaling device may associate relationship graphical elements (e.g., arrows in between segments of the image) with instructions for the teacher signaling device to broadcast particular intercepted event report messages related to the causal relationships (i.e., event-action associations). In some embodiments, the GUI elements may include soft buttons (e.g., 'toggle' buttons, etc.) that are associated with causal relationships that may be used to trigger the transmission of event report messages by the teacher signaling device. In other embodiments, the relationship graphical elements associated with causal relationships may be configured to cause the transmission of event report messages (e.g., arrows in between image segments of identified learning devices may be interactive buttons).

In determination block 2412, the processor of the teacher signaling device may determine whether an input on a graphical user interface (GUI) element (e.g., a soft button) that triggers a relationship has been received via the GUI. For example, the teacher signaling device may determine whether a touch input on a touch screen has been received that corresponds to a graphical element configured to cause the teacher signaling device to re-broadcast an intercepted event report message that causes a learning device to perform an action. In response to determining the input is not received (i.e., determination block 2412="No"), the teacher signaling device may continue intercepting additional event report messages in block 1352, and monitoring for user inputs in determination block 2412.

In response to determining that an input is received (i.e., determination block 2412="Yes"), the processor of the teacher signaling device may broadcast event report messages corresponding to the relationship associated with the GUI element in block 2414. In other words, the teacher signaling device may replicate or rebroadcast an intercepted event report message the teacher signaling device has identified as a trigger to cause a learning device to perform an action defined in a reflex. The teacher signaling device may continue intercepting additional event report messages in block 1352, and monitoring for user inputs in determination block 2412.

Figure 24B:
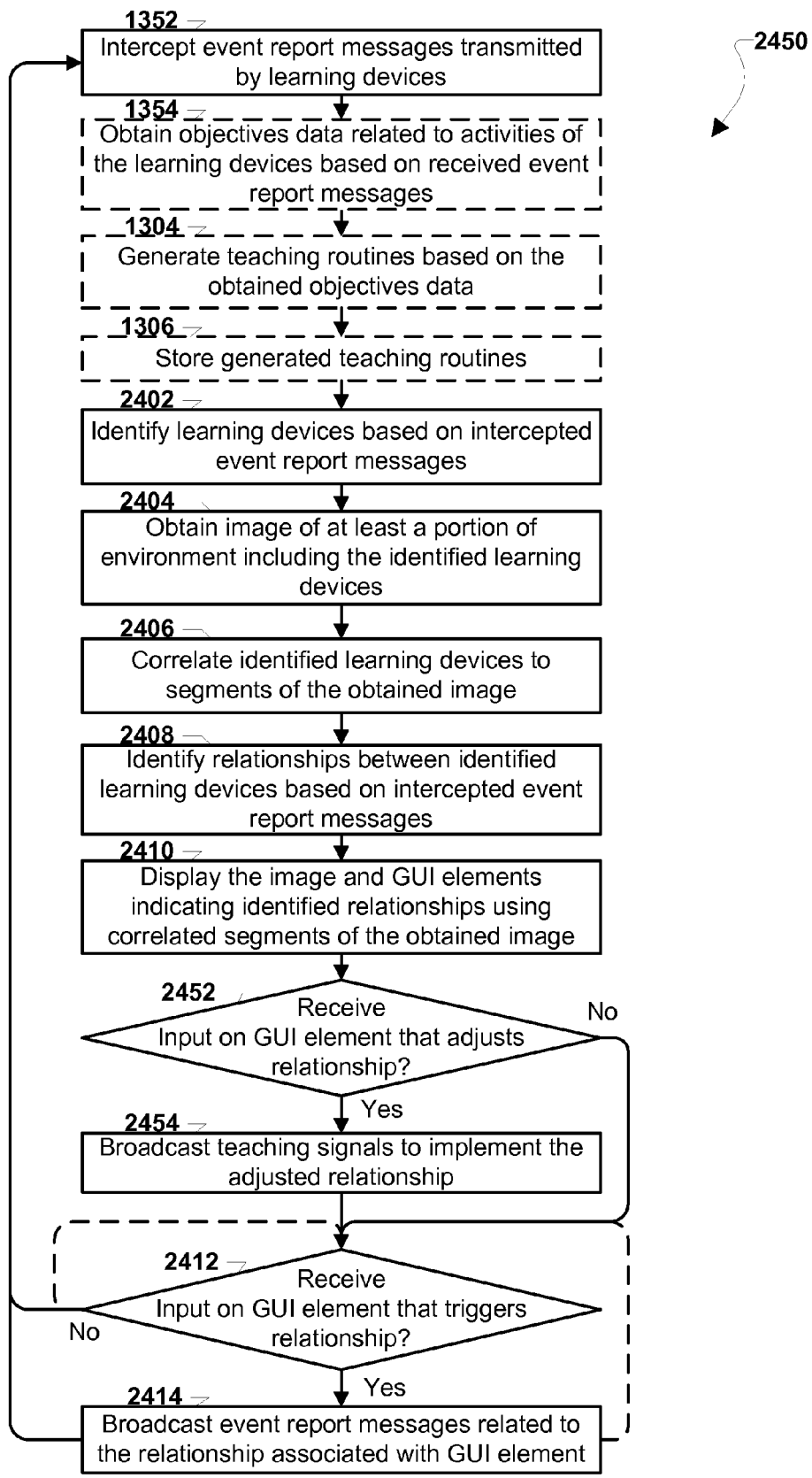

FIG. 24B illustrates an embodiment method 2450 for a teacher signaling device to transmit signals based on a user's interaction with a graphical user interface (GUI). The method 2450 may be similar to the method 2400 described above, except that the method 2450 may include operations for transmitting teaching signals to change the trigger weights of learning devices based on a user's inputs on the GUI to adjust relationships between the learning devices of an environment. For example, in response to a user disconnecting a graphical element (e.g., an arrow) from a first segment of an image associated with a smart floor lamp as illustrated in FIG. 23C, the teacher signaling device may transmit teaching signals (e.g., "correction signals") to cause the smart floor lamp to lower the trigger weight of a related reflex so that the smart floor lamp may no longer react to a certain event report message (e.g., a smart wall switch 'on' event report message). As another example, in response to the user re-connecting the graphical element to a second segment of an image associated with a smart stereo, the teacher signaling device may transmit teaching signals (e.g., "reward signals") to cause the smart stereo to raise the trigger weight of a related reflex so that the smart stereo may begin to react to the event report message.

The operations in blocks 1352-1306 may similar to the operations of like number blocks described above with reference to FIG. 13B. The operations in blocks 2402-2410 may be the operations of like number blocks described above with reference to FIG. 24A. In determination block 2452, the processor of the teacher signaling device may determine whether it has received an input on a graphical user interface element within the GUI that is configured to adjust a relationship between learning devices in the environment. For example, the teacher signaling device may determine whether the end point of a relationship graphical element has been moved via user inputs (e.g., sliding touch inputs on a touch screen, etc.) from connecting to a first segment of the image displayed on the touch screen of the teacher signaling device to a second segment of the image. In some embodiments, the user may remove (or delete) a graphical user interface element, such as by using a touch screen gesture to slide a relationship graphical element into a virtual trash bin.

In response to determining that an input on the graphical user interface element within the GUI has been received (i.e., determination block 2452="Yes"), the processor of the teacher signaling device may broadcast teaching signals to cause learning devices to learn the event-action association of the adjusted relationship in block 2454. As described above, the teacher signaling device may implement teaching routines to transmit teaching signals that cause the trigger weights for reflexes of learning devices to be modified as described above. In particular, the teacher signaling device may identify any learning devices correlated to segments of the displayed image that have been disconnected from a relationship with a triggering device, and transmit teaching signals to cause those learning devices to lower their related reflex trigger weights (e.g., correct) below predefined trigger thresholds so the action patterns of the reflexes are not longer generated in response to trigger event report messages of the relationship.

Further, the teacher signaling device may identify any learning devices correlated to segments of the displayed image that have been connected to a relationship, and transmit teaching signals to cause those learning devices to raise their related reflex trigger weights (e.g., reward) above predefined trigger thresholds so the action patterns of the reflexes are generated in response to the subsequent trigger event report messages of the relationship. For example, in response to the user using the GUI to re-direct an arrow graphical element away from a first segment associated with a first learning device (e.g., smart floor lamp) so that the arrow instead connects a triggering learning device (e.g., a smart wall switch) with a second learning device (e.g., smart stereo), the teacher signaling device may broadcast teaching signals that cause the second learning device to learn to turn on in response to the triggering learning device sending an event report message (e.g., switch on event report message) and/or teaching signals that cause the first learning device to learn to no longer turn on in response to the triggering learning device sending the event report message. In some embodiments, in response to determining the user has deleted or removed a relationship graphical element, the teacher signaling device may only broadcast teaching signals that cause corrections to reflexes of learning devices (e.g., trigger weights are lowered so that actions are not performed in response to the event report message from the triggering learning device).

In response to determining that no input on the graphical user interface element within the GUI has been received (i.e., determination block 2452="No"), or in response to the teacher signaling device performing the operations in block 2454, the teacher signaling device may continue with the operations in determination block 2412 as described above with reference to FIG. 24A.

Figure 25:
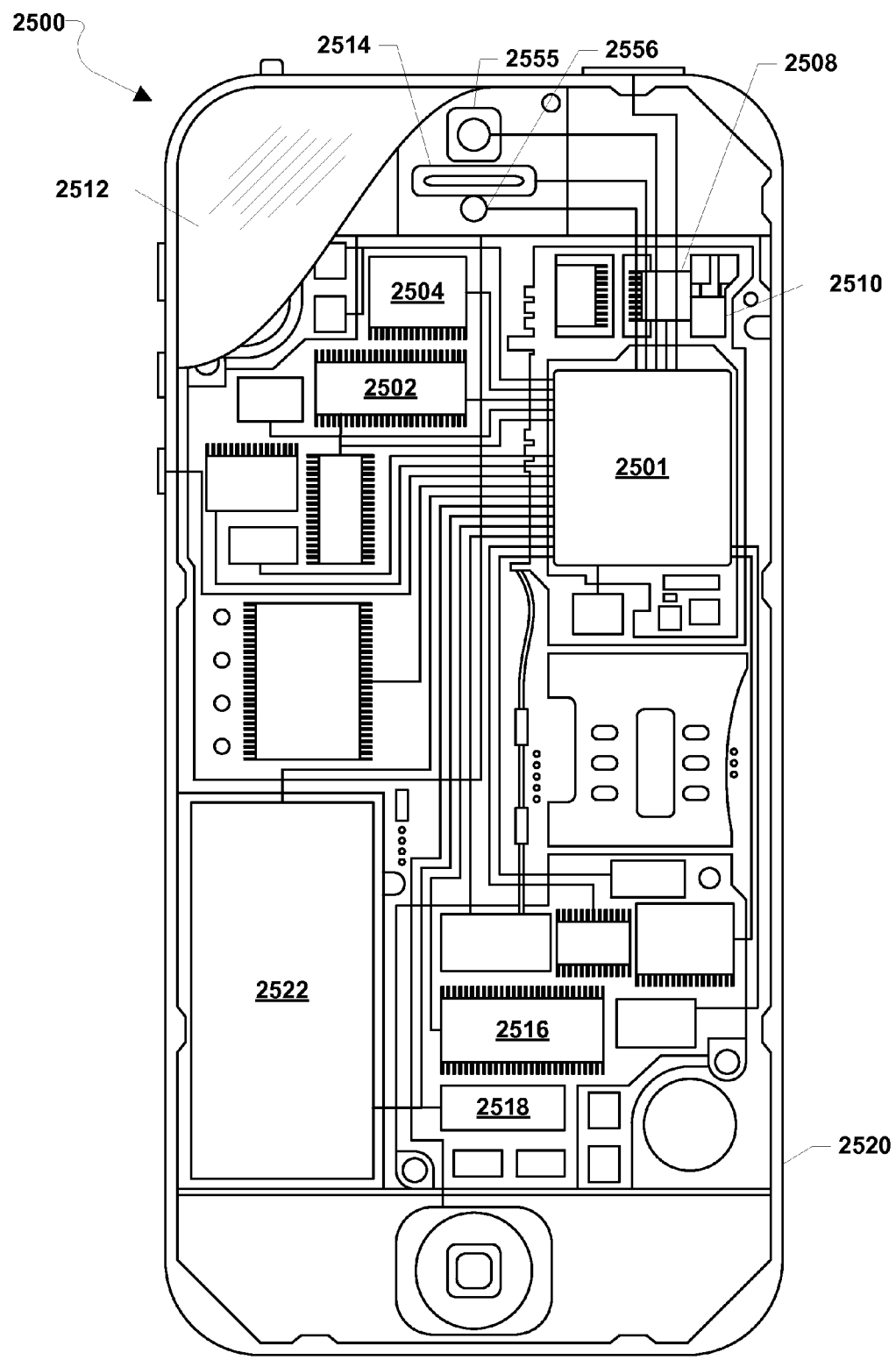
FIG. 25 is a component block diagram of an exemplary smartphone-type mobile device suitable for use in various embodiments.

FIG. 25 illustrates an exemplary mobile device 2500 (e.g., a smartphone mobile device, etc.) suitable for use in various embodiments. The mobile device 2500 may include a processor 2501 coupled to a touch screen controller 2504 and an internal memory 2502. The processor 2501 may be one or more multicore integrated circuits designated for general or specific processing tasks. The internal memory 2502 may be volatile or non-volatile memory, and may also be secure and/or encrypted memory, or unsecure and/or unencrypted memory, or any combination thereof. The touch screen controller 2504 and the processor 2501 may also be coupled to a touch screen panel 2512, such as a resistive-sensing touch screen, capacitive-sensing touch screen, infrared sensing touch screen, etc. The mobile device 2500 may have one or more radio signal transceivers 2508 (e.g., Peanut®, Bluetooth®, Zigbee®, Wi-Fi, RF radio) and antennae 2510, for sending and receiving, coupled to each other and/or to the processor 2501. The transceivers 2508 and antennae 2510 may be used with the above-mentioned circuitry to implement the various wireless transmission protocol stacks and interfaces. The mobile device 2500 may include a cellular network wireless modem chip 2516 that enables communication via a cellular network and is coupled to the processor. The mobile device 2500 may include a peripheral device connection interface 2518 coupled to the processor 2501. The peripheral device connection interface 2518 may be singularly configured to accept one type of connection, or multiply configured to accept various types of physical and communication connections, common or proprietary, such as USB, FireWire, Thunderbolt, or PCIe. The peripheral device connection interface 2518 may also be coupled to a similarly configured peripheral device connection port (not shown). The mobile device 2500 may also include speakers 2514 for providing audio outputs. The mobile device 2500 may also include a housing 2520, constructed of a plastic, metal, or a combination of materials, for containing all or some of the components discussed herein. The mobile device 2500 may include a power source 2522 coupled to the processor 2501, such as a disposable or rechargeable battery. The rechargeable battery may also be coupled to the peripheral device connection port to receive a charging current from a source external to the mobile device 2500. Additionally, the mobile device 2500 may include various sensors coupled to the processor 2501, such as a camera 2555 and a microphone 2556.

The processor 2501 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 2502 before they are accessed and loaded into the processor 2501. The processor 2501 may include internal memory sufficient to store the application software instructions. In many devices the internal memory may be a volatile or nonvolatile memory, such as flash memory, or a mixture of both. For the purposes of this description, a general reference to memory refers to memory accessible by the processor 2501 including internal memory or removable memory plugged into the various devices and memory within the processor 2501.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware, such as smart box 103, is used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer readable storage medium, non-transitory computer-readable medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a teacher signaling device to conduct proxy teaching for learning devices within a decentralized system, comprising:
    obtaining, by the teacher signaling device, objectives data related to activities of one or more of the learning devices;
    generating, by the teacher signaling device, teaching routines based on an evaluation of the obtained objectives data that indicates desired behaviors of the learning devices and an identification of commands for causing the one or more of the learning devices to perform the desired behaviors;
    determining, by the teacher signaling device, whether objectives of the generated teaching routines can be achieved at a given time by available learning devices nearby the teacher signaling device based on capabilities of the available learning devices;
    identifying, by the teacher signaling device, adjustments to the teaching routines for achieving the objectives at the given time with the capabilities of the available learning devices in response to determining the objectives of the generated teaching routines can be achieved by the available learning devices at the given time;
    modifying, by the teacher signaling device, the generated teaching routines in response to identifying the adjustments; and
    broadcasting, by the teacher signaling device, teaching signals configured to teach one or more of the available learning devices based on the generated teaching routines by providing event information that adjusts data for controlling behaviors that is stored locally at the one or more of the available learning devices.

2. The method of claim 1, wherein obtaining, by the teacher signaling device, objectives data related to activities of one or more of the learning devices comprises:

broadcasting, by the teacher signaling device, signals requesting information from stored data indicating learned behaviors of the one or more of the learning devices;

receiving, by the teacher signaling device, response messages including the information from the stored data indicating learned behaviors of the one or more of the learning devices; and obtaining, by the teacher signaling device, the objectives data from the information from the received response messages.

3. The method of claim 1, wherein obtaining, by the teacher signaling device, objectives data related to activities of one or more of the learning devices comprises:

intercepting, by the teacher signaling device, event report messages transmitted by the one or more of the learning devices; and obtaining, by the teacher signaling device, the objectives data based on the intercepted event report messages.

4. The method of claim 1, wherein determining, by the teacher signaling device, whether objectives of the generated teaching routines can be achieved at a given time by available learning devices nearby the teacher signaling device based on capabilities of the available learning devices comprises:

broadcasting, by the teacher signaling device, discovery signals requesting identifying responses from the available learning devices that indicate at least a device type for each of the available learning devices;

receiving, by the teacher signaling device, the identifying responses from the available learning devices in response to the broadcast discovery signals; and determining, by the teacher signaling device, whether the objectives of the generated teaching routines can be achieved based on the received identifying responses.

5. The method of claim 1, further comprising:

transmitting, by the teacher signaling device, an authorization request to a user device; and determining, by the teacher signaling device, whether an authorization is received from the user device in response to the transmitted authorization request, wherein broadcasting, by the teacher signaling device, the teaching signals comprises broadcasting, by the teacher signaling device, the teaching signals in response to determining that the authorization is received from the user device.

6. The method of claim 1, further comprising:

broadcasting, by the teacher signaling device, a first signal that causes the available learning devices to enter a learning mode; and broadcasting, by the teacher signaling device, a second signal that causes the available learning devices to exit the learning mode.

7. The method of claim 1, further comprising broadcasting, by the teacher signaling device, a signal that causes the available learning devices to reset a trigger weight for a reflex.

8. The method of claim 1, further comprising:

intercepting, by the teacher signaling device, event report messages transmitted by the available learning devices in response to the broadcast teaching signals;

updating, by the teacher signaling device, stored data indicating historical information associated with the generated teaching routines based on the intercepted event report messages and the broadcast teaching signals; and displaying, by the teacher signaling device, the updated stored data.

9. The method of claim 1, further comprising:

intercepting, by the teacher signaling device, event report messages transmitted by the learning devices;

obtaining, by the teacher signaling device, an image of at least a portion of an environment including the learning devices;

correlating, by the teacher signaling device, the learning devices to segments of the obtained image;

identifying, by the teacher signaling device, a relationship between the learning devices based on the intercepted event report messages;

displaying, by the teacher signaling device, graphical user interface elements indicating the identified relationship on the obtained image; and broadcasting, by the teacher signaling device, an event report message in response to receiving a first user input on a graphical user interface element related to the identified relationship.

10. The method of claim 9, further comprising:

receiving a second user input that adjusts the graphical user interface element related to the identified relationship, wherein broadcasting, by the teacher signaling device, the teaching signals comprises broadcasting, by the teacher signaling device, the teaching signals based on the received second user input adjusting the graphical user interface element.

11. A computing device, comprising:

a wireless receiver and transmitter; and a processor coupled to the wireless receiver and transmitter and configured with processor-executable instructions for performing operations comprising:

obtaining objectives data related to activities of learning devices within a decentralized system;

generating teaching routines based on an evaluation of the obtained objectives data that indicates desired behaviors of the learning devices and an identification of commands for causing the learning devices to perform the desired behaviors;

determining whether objectives of the generated teaching routines can be achieved at a given time by available learning devices nearby the computing device based on capabilities of the available learning devices;

identifying adjustments to the teaching routines for achieving the objectives at the given time with the capabilities of the available learning devices in response to determining the objectives of the generated teaching routines can be achieved by the available learning devices at the given time;

modifying the generated teaching routines in response to identifying the adjustments; and broadcasting teaching signals configured to teach one or more of the available learning devices based on the generated teaching routines by providing event information that adjusts data for controlling behaviors that is stored locally at the one or more of the available learning devices.

12. The computing device of claim 11, wherein the processor is configured with processor-executable instructions to perform operations such that obtaining objectives data related to activities the learning devices comprises:

broadcasting signals requesting information from stored data indicating learned behaviors of the learning devices;

receiving response messages including the information from the stored data indicating learned behaviors of the learning devices; and obtaining the objectives data from the information from the received response messages.

13. The computing device of claim 11, wherein the processor is configured with processor-executable instructions to perform operations such that obtaining objectives data related to activities of the learning devices comprises:

intercepting event report messages transmitted by the learning devices; and obtaining the objectives data based on the intercepted event report messages.

14. The computing device of claim 11, wherein the processor is configured with processor-executable instructions to perform operations such that determining whether objectives of the generated teaching routines can be achieved at a given time based on capabilities of available learning devices comprises:

broadcasting discovery signals requesting identifying responses from the available learning devices that indicate at least a device type for each of the available learning devices;

receiving the identifying responses from the available learning devices in response to the broadcast discovery signals; and determining whether the objectives of the generated teaching routines can be achieved based on the received identifying responses.

15. The computing device of claim 11, wherein the processor is configured with processor-executable instructions to perform operations further comprising:

transmitting an authorization request to a user device; and determining whether an authorization is received from the user device in response to the transmitted authorization request, wherein the processor is configured with processor-executable instructions to perform operations such that broadcasting the teaching signals comprises broadcasting the teaching signals in response to determining that the authorization is received from the user device.

16. The computing device of claim 11, wherein the processor is configured with processor-executable instructions to perform operations further comprising:

broadcasting a first signal that causes the one or more of the available learning devices to enter a learning mode; and broadcasting a second signal that causes the one or more of the available learning devices to exit the learning mode.

17. The computing device of claim 11, wherein the processor is configured with processor-executable instructions to perform operations further comprising broadcasting a signal that causes the one or more of the available learning devices to reset a trigger weight for a reflex.

18. The computing device of claim 11, wherein the processor is configured with processor-executable instructions to perform operations further comprising:

intercepting event report messages transmitted by the one or more of the available learning devices in response to the broadcast teaching signals;

updating stored data indicating historical information associated with the generated teaching routines based on the intercepted event report messages and the broadcast teaching signals; and displaying the updated stored data.

19. The computing device of claim 11, further comprising:

a display; and a camera, wherein the processor is coupled to the display and the camera, and configured with processor-executable instructions to perform operations further comprising:

intercepting event report messages transmitted by the learning devices;

obtaining an image of at least a portion of an environment including the learning devices;

correlating the learning devices to segments of the obtained image;

identifying a relationship between the learning devices based on the intercepted event report messages;

presenting on the display graphical user interface elements indicating the identified relationship on the obtained image; and broadcasting an event report message in response to receiving a first user input on a graphical user interface element related to the identified relationship.

20. The computing device of claim 19, wherein the processor is configured with processor-executable instructions to perform operations further comprising:

receiving a second user input that adjusts the graphical user interface element related to the identified relationship, wherein the processor is configured with processor-executable instructions to perform operations such that broadcasting, the teaching signals comprises broadcasting the teaching signals based on the received second user input adjusting the graphical user interface element.

21. A computing device, comprising:

means for obtaining objectives data related to activities of learning devices within a decentralized system;

means for generating teaching routines based on an evaluation of the obtained objectives data that indicates desired behaviors of the learning devices and an identification of commands for causing the learning devices to perform the desired behaviors;

means for determining whether objectives of the generated teaching routines can be achieved at a given time by available learning devices nearby the computing device based on capabilities of the available learning devices;

means for identifying adjustments to the teaching routines for achieving the objectives at the given time with the capabilities of the available learning devices in response to determining the objectives of the generated teaching routines can be achieved by the available learning devices at the given time;

means for modifying the generated teaching routines in response to identifying the adjustments; and means for broadcasting teaching signals configured to teach one or more of the available learning devices based on the generated teaching routines by providing event information that adjusts data for controlling behaviors that is stored locally at the one or more of the available learning devices.

22. The computing device of claim 21, wherein means for obtaining objectives data related to activities of the learning devices comprises:

means for broadcasting signals requesting information from stored data indicating learned behaviors of the learning devices;

means for receiving response messages including the information from the stored data indicating learned behaviors of the learning devices; and means for obtaining the objectives data from the information from the received response messages.

23. The computing device of claim 21, wherein means for obtaining objectives data related to activities of the learning devices comprises:

means for intercepting event report messages transmitted by the learning devices; and means for obtaining the objectives data based on the intercepted event report messages.

24. The computing device of claim 21, wherein determining whether objectives of the generated teaching routines can be achieved at a given time based on capabilities of available learning devices comprises:

means for broadcasting discovery signals requesting identifying responses from the available learning devices that indicate at least a device type for each of the learning devices;

means for receiving the identifying responses from the available learning devices in response to the broadcast discovery signals; and means for determining whether the objectives of the generated teaching routines can be achieved based on the received identifying responses.

25. The computing device of claim 23, further comprising:

means for transmitting an authorization request to a user device; and means for determining whether an authorization is received from the user device in response to the transmitted authorization request, and wherein means for broadcasting the teaching signals comprises means for broadcasting the teaching signals in response to determining that the authorization is received from the user device.

26. The computing device of claim 23, further comprising:

means for broadcasting a first signal that causes the available learning devices to enter a learning mode; and means for broadcasting a second signal that causes the available learning devices to exit the learning mode.

27. The computing device of claim 23, further comprising means for broadcasting a signal that causes the one or more of the available learning devices to reset a trigger weight for a reflex.

28. The computing device of claim 23, further comprising:

means for intercepting event report messages transmitted by the one or more of the available learning devices in response to the broadcast teaching signals;

means for updating stored data indicating historical information associated with the generated teaching routines based on the intercepted event report messages and the broadcast teaching signals; and means for displaying the updated stored data.

29. A non-transitory processor-readable storage medium having stored thereon processor-executable instructions configured to cause a processor of a computing device to perform operations comprising:

obtaining objectives data related to activities of learning devices within a decentralized system;

generating teaching routines based on an evaluation of the obtained objectives data that indicates desired behaviors of the learning devices and an identification of commands for causing the learning devices to perform the desired behaviors;

determining whether objectives of the generated teaching routines can be achieved at a given time by available learning devices nearby the computing device based on capabilities of the available learning devices;

identifying adjustments to the teaching routines for achieving the objectives at the given time with the capabilities of the available learning devices in response to determining the objectives of the generated teaching routines can be achieved by the available learning devices at the given time;

modifying the generated teaching routines in response to identifying the adjustments; and broadcasting teaching signals configured to teach one or more of the available learning devices based on the generated teaching routines by providing event information that adjusts data for controlling behaviors that is stored locally at the one or more of the available learning devices.

30. The non-transitory processor-readable storage medium of claim 29, wherein the stored processor-executable instructions are configured to cause the processor of the computing device to perform operations such that obtaining objectives data related to activities of one or more of the learning devices comprises:

broadcasting signals requesting information from stored data indicating learned behaviors of the learning devices;

receiving response messages including the information from the stored data indicating learned behaviors of the learning devices; and obtaining the objectives data from the information from the received response messages.

* * * * *